United States Patent [19]
Jack et al.

[11] 3,880,635
[45] Apr. 29, 1975

[54] METHOD AND APPARATUS FOR PRESS BENDING GLASS SHEETS

[75] Inventors: Harry Ross Scarlett Jack, Tanworth-in-Arden; Peter Henry Richards, Kenilworth, both of England

[73] Assignee: Triplex Safety Glass Company Limited, London, England

[22] Filed: Mar. 12, 1974

[21] Appl. No.: 450,459

[30] Foreign Application Priority Data
July 20, 1973 United Kingdom............... 34703/73
July 20, 1973 United Kingdom............... 34704/73

[52] U.S. Cl. ...................... 65/106; 65/104; 65/273; 65/275
[51] Int. Cl. ...................... C03b 23/02; C03b 27/00
[58] Field of Search ............ 65/104, 106, 114, 116, 65/273, 275

[56] References Cited
UNITED STATES PATENTS
| | | | |
|---|---|---|---|
| 2,442,242 | 5/1948 | Lewis................................ | 65/104 X |
| 3,630,706 | 12/1971 | Carson et al......................... | 65/104 |
| 3,701,266 | 10/1972 | Chisholm.......................... | 65/104 X |
| 3,782,916 | 1/1974 | Powell et al. ........................ | 65/104 |

*Primary Examiner*—Arthur O. Kellogg
*Attorney, Agent, or Firm*—Burns, Doane, Swecker & Mathis

[57] ABSTRACT

A glass sheet is bent by heating the sheet while supported on its lower edge in a near-vertical disposition, closing dies on to the hot sheet at a bending station, and then tilting the dies to bring the sheet to a vertical position before the dies are opened and the sheet is removed vertically for subsequent annealing or toughening, for example by quenching the hot bent glass sheet in a chilling liquid.

57 Claims, 65 Drawing Figures

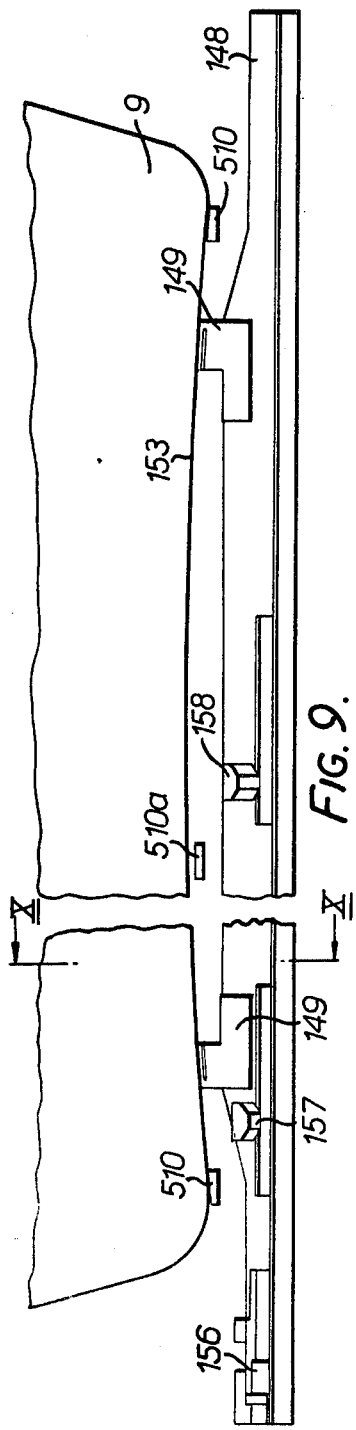
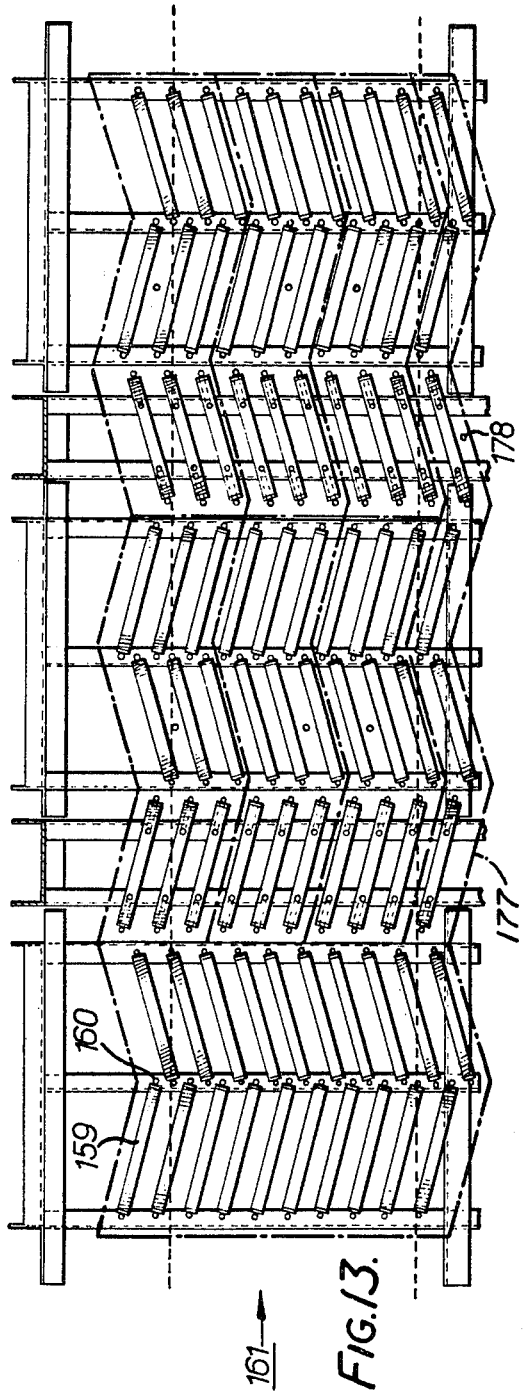

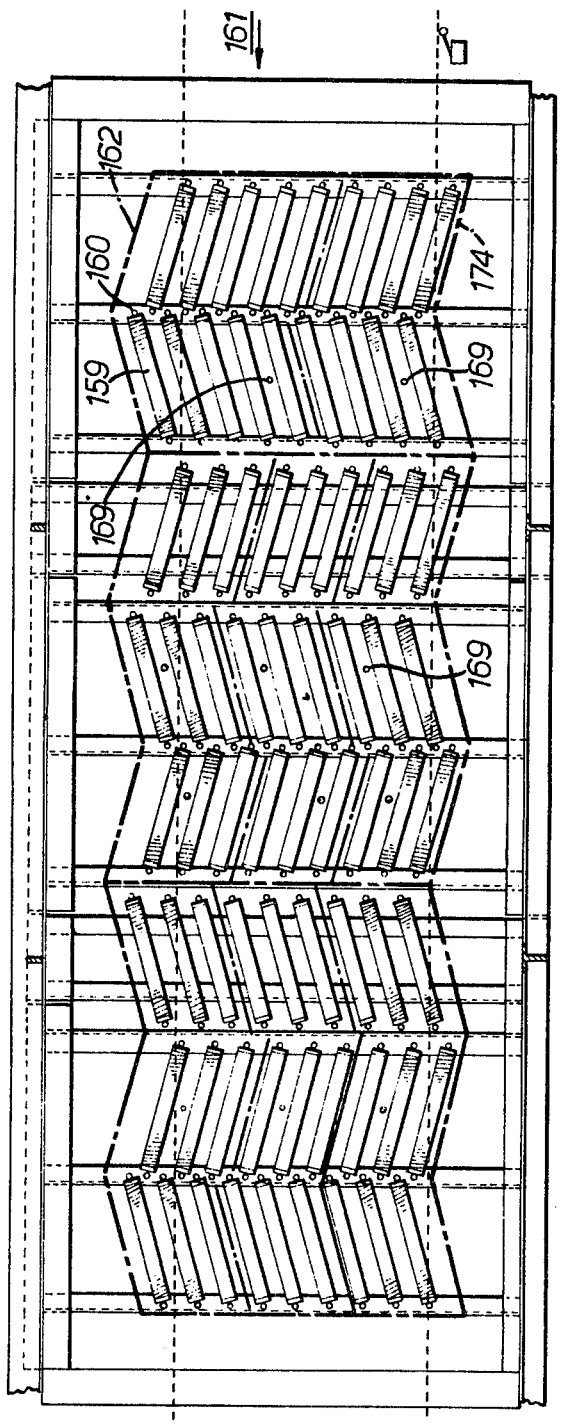
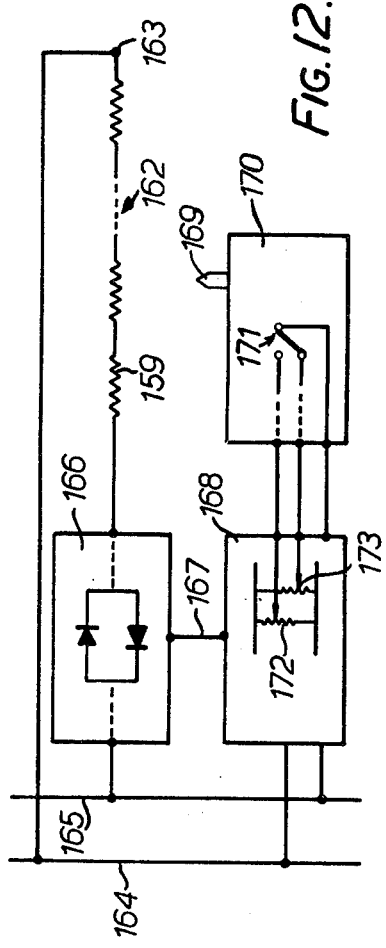
FIG.11.
FIG.12.

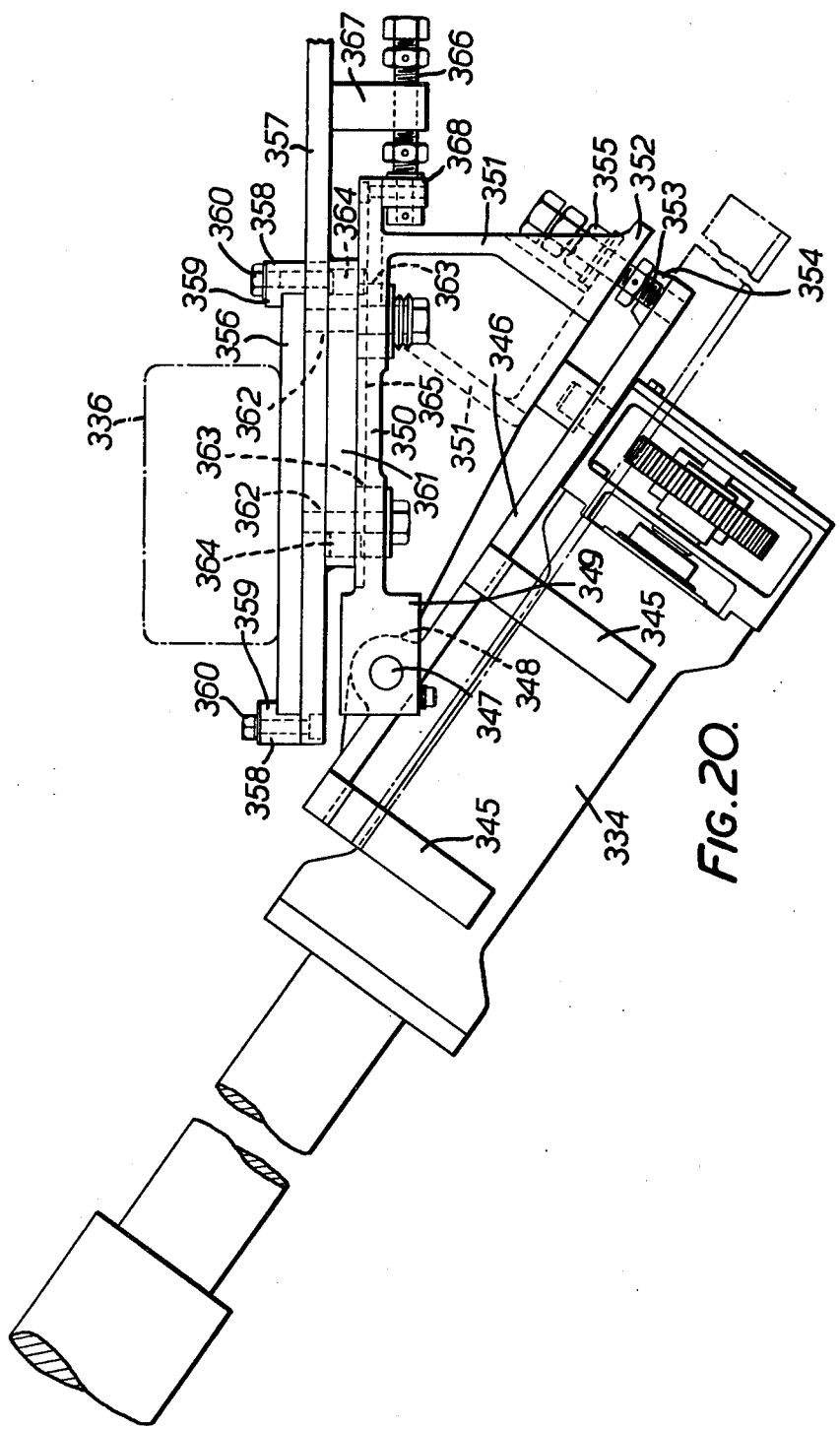

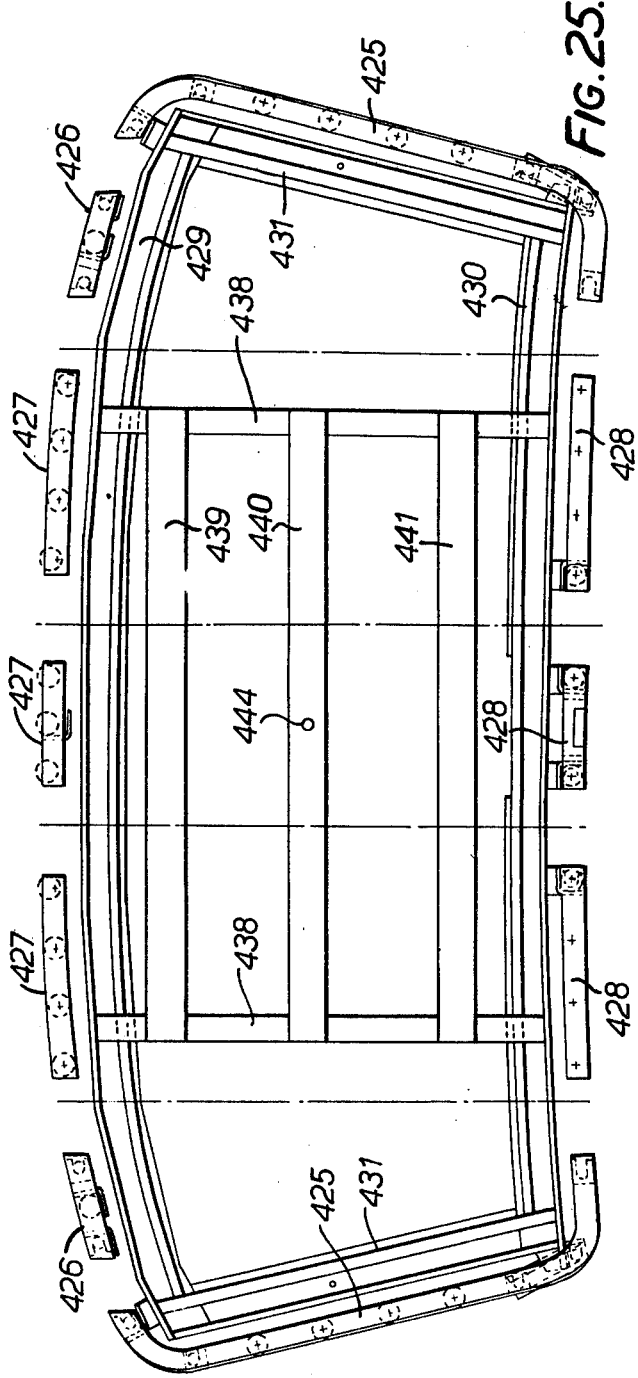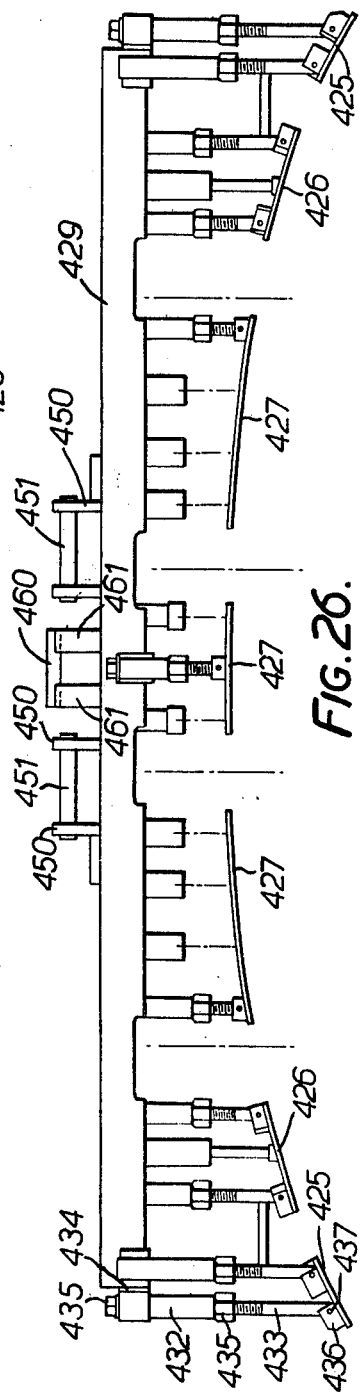

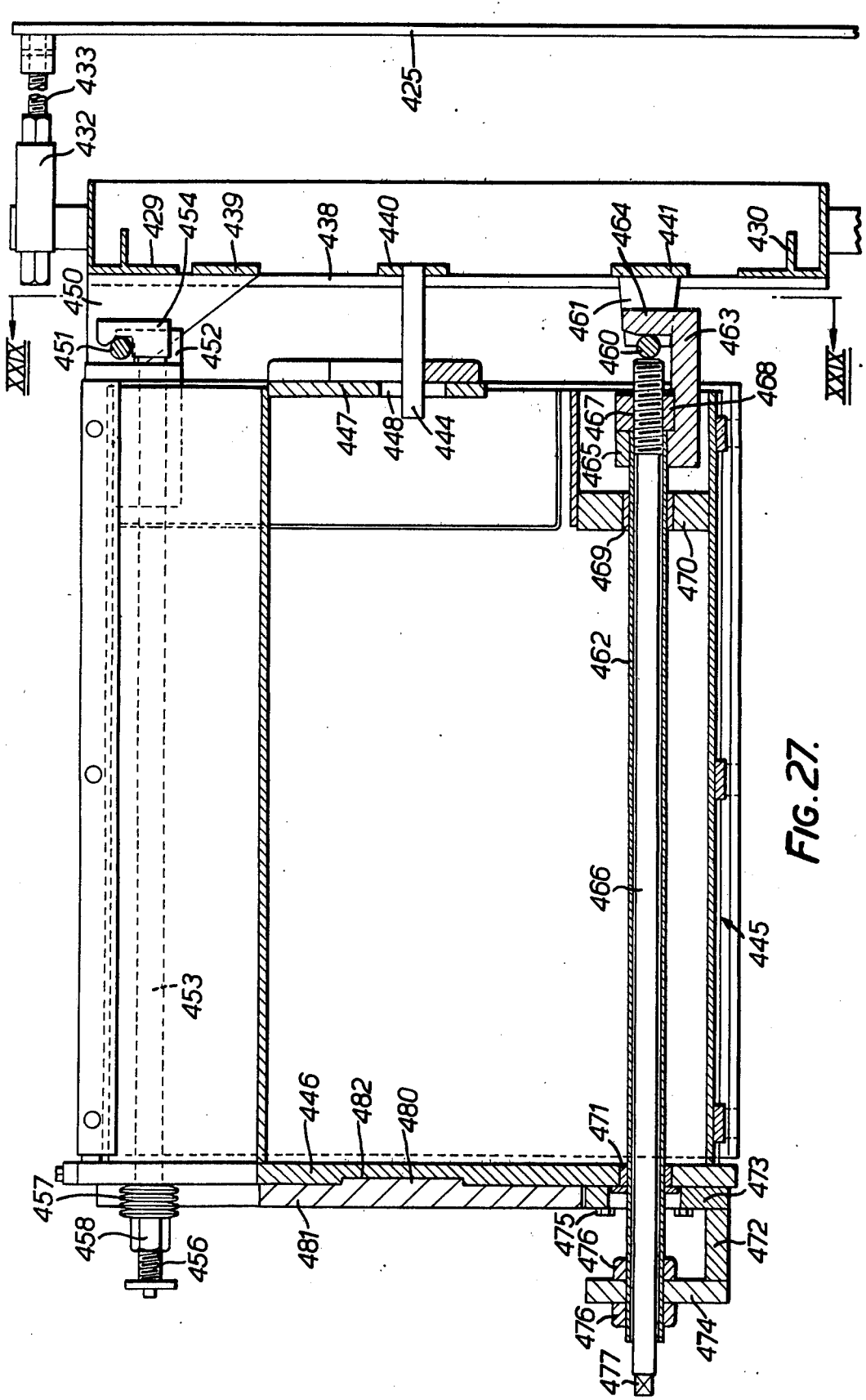

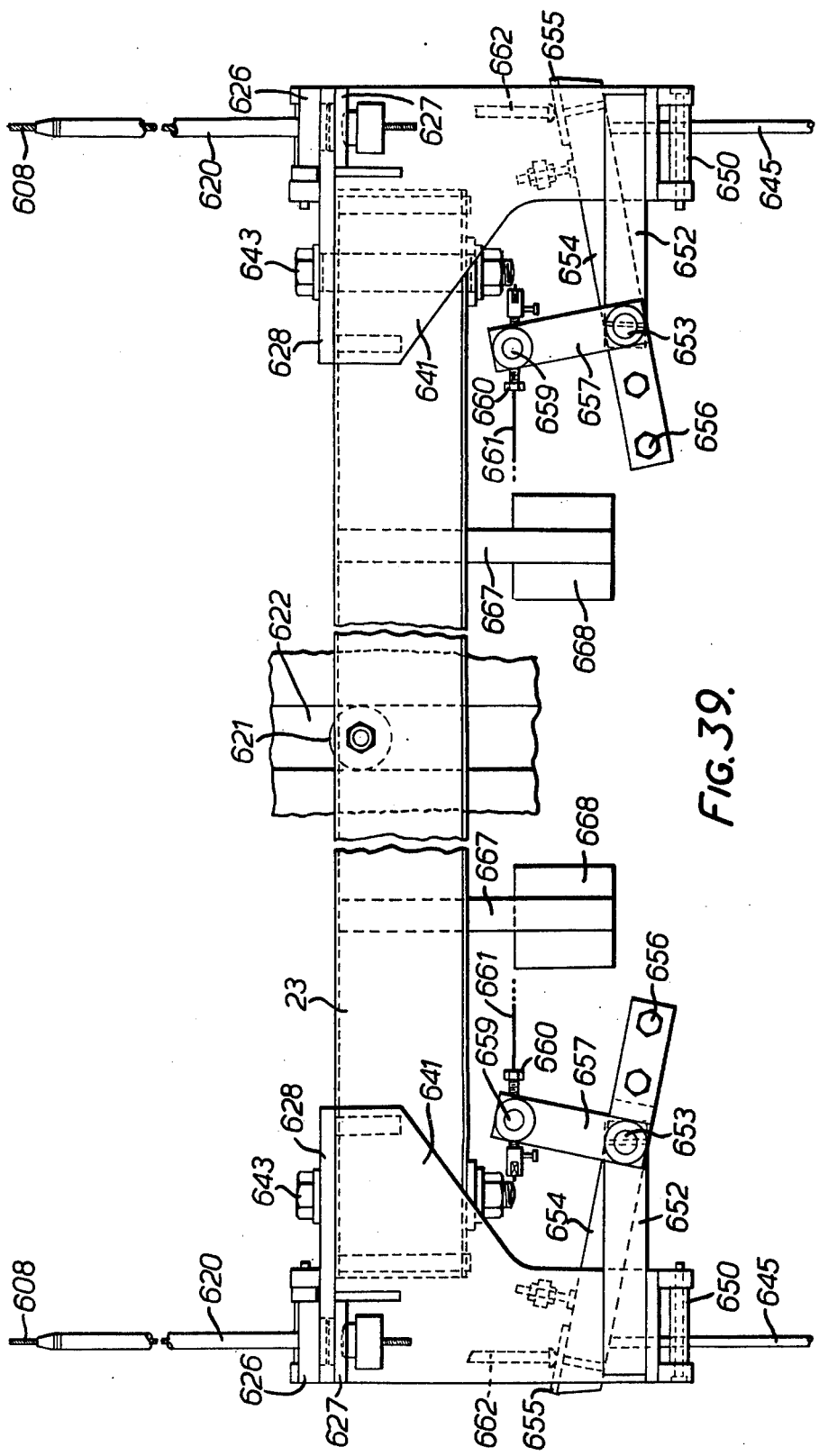

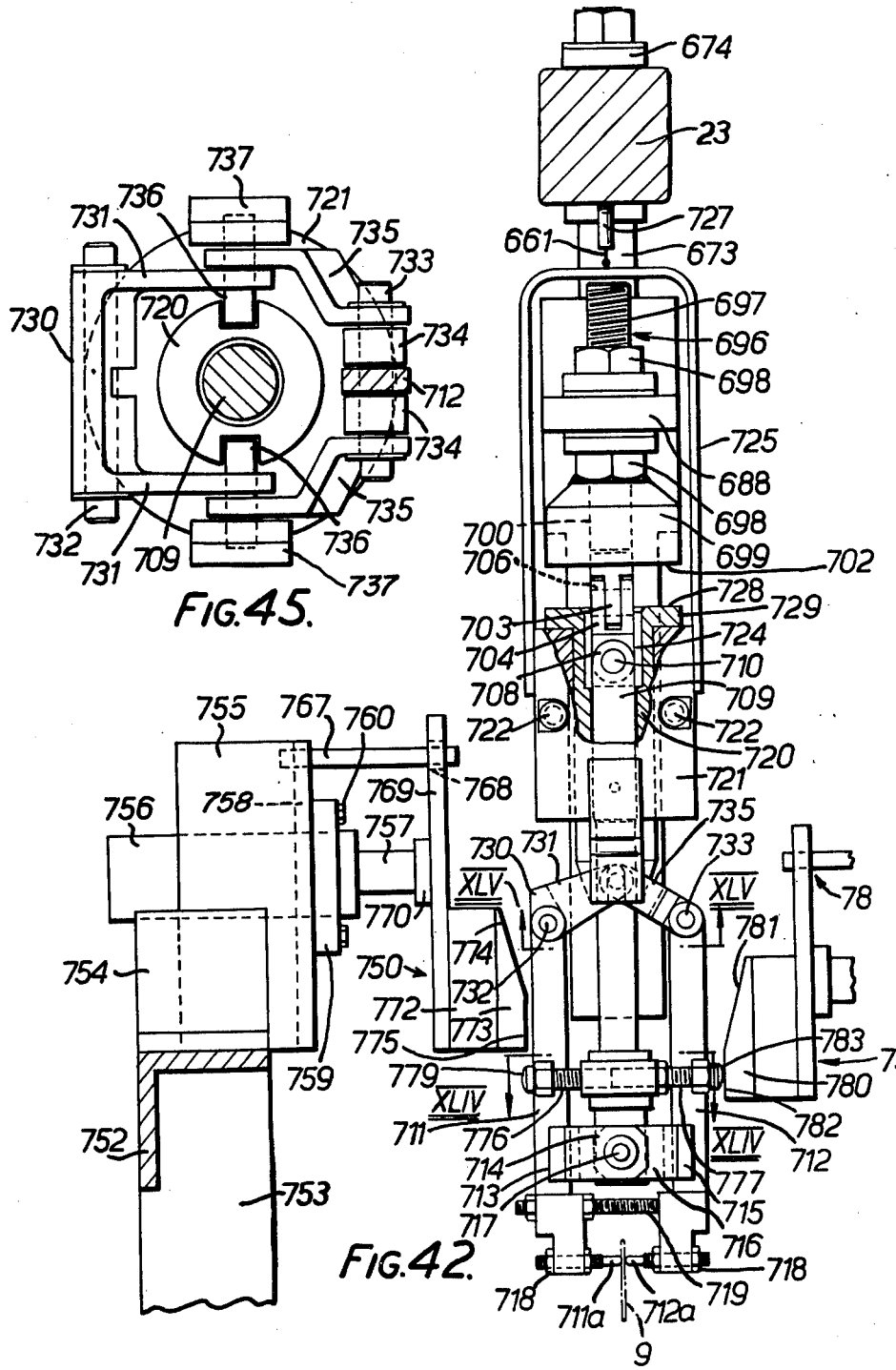

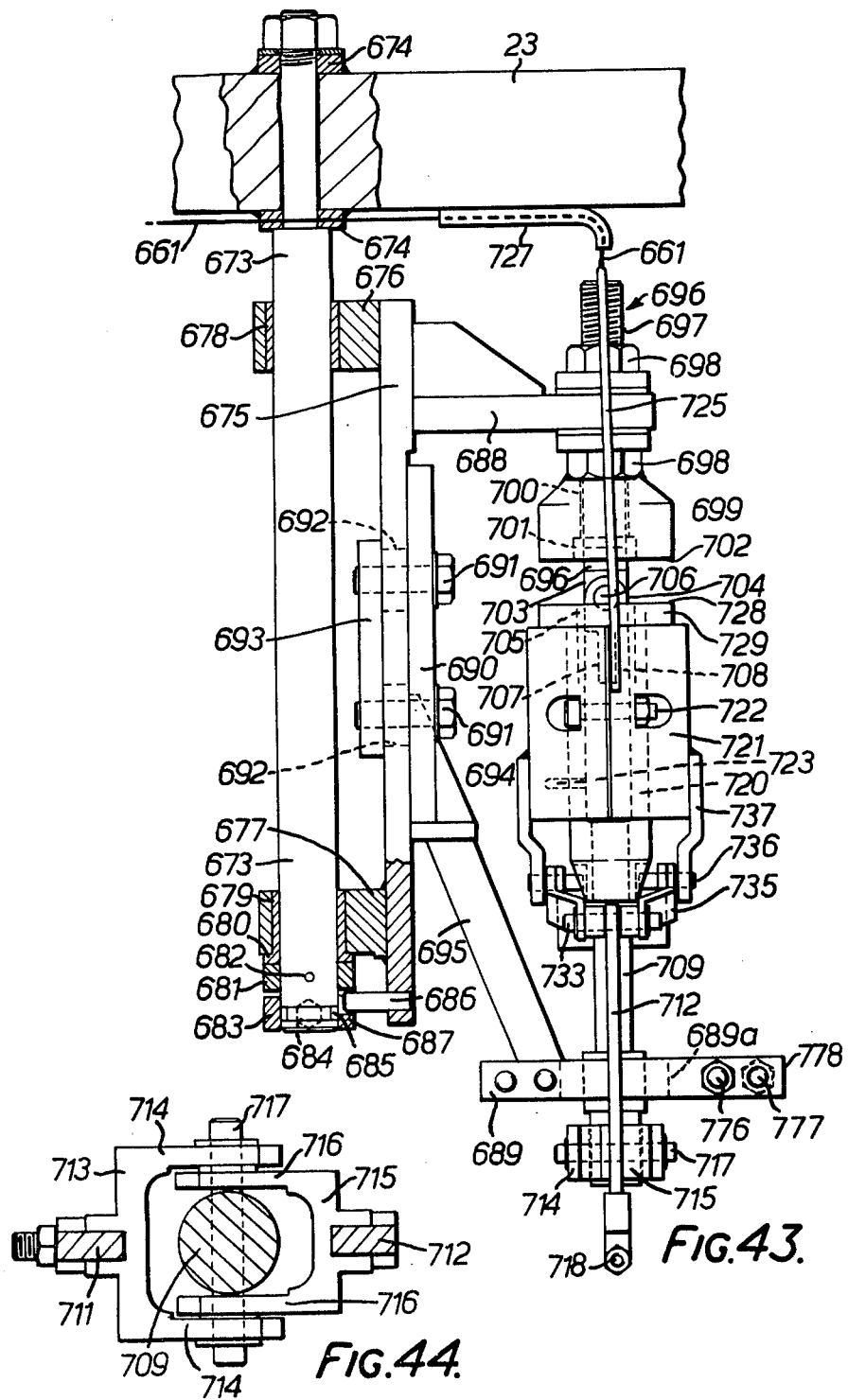

METHOD AND APPARATUS FOR PRESS BENDING GLASS SHEETS

BACKGROUND OF THE INVENTION

1. Field of the Invention

This invention relates to the bending of glass sheets in particular to the bending of glass sheets which are to be subsequently toughened or annealed and used in the manufacture of windows for vehicles, for example motor vehicle windscreens and aircraft windscreens.

A glass sheet bent by the method and apparatus of the present invention may be toughened and then used alone as a vehicle windscreen, or may be either toughened or annealed for use as one of the laminates of a composite laminated glass windscreen It is customary to laminate two thin sheets of glass together to form a windscreen using an interlayer of transparent plastics material, for example polyvinylbutyral. In such a windscreen both sheets may be of annealed glass or both of toughened glass and in a current proposal a laminated windscreen having a dual fracture characteristic is fabricated using a sheet of annealed glass as the outer sheet and a sheet of toughened glass as the inner sheet.

With such a windscreen visibility is retained even if the outer annealed sheet is fractured by a sharp flying stone, while the inner toughened sheet fragments rapidly when struck by the head of an occupant of the vehicle.

2. Description of the Prior Art

Usually in the manufacture of a toughened glass sheet for a windscreen the sheet of flat glass is first cut to the shape appropriate to the styling of the vehicle in which the windscreen is to be fitted and the cut edges of the sheets are then polished to remove defects resulting from the cutting operation. Then the glass is heated to a temperature suitable for bending, during traverse through a heating furnace while suspended by tongs from an overhead conveyor which then conveys the glass between vertical bending dies which close on to the glass sheet and bend the sheet to the desired curvature.

Thereafter the bending dies are opened and the glass is conveyed between blowing frames where the glass is toughened, or the glass is conveyed from the bending dies through an annealing lehr when an annealed glass sheet is required. Throughout this process the glass is suspended from tongs which grip the upper edge of the sheet.

In a process for bending two sheets of glass which are to have accurately matching curvature for subsequent lamination it has been customary to bend the glass by a sag-bending process in which the two sheets lying one on top of the other are placed horizontally on a sag-bending mould and then conveyed through an oven where the glass sheets are heated and sag together to the desired matching curvature.

In a more recently developed process for the toughening of glass, a sheet of flat glass cut to the desired shape is suspended by tongs in a heating furnace having an open mouth in the floor of the furnace, and when heated to bending temperature is lowered to a location between bending dies which close on to the suspended sheet and bend it to a desired curvature before the sheet is further lowered through a precooling stage in which cooling air is blown on to the glass surfaces, followed immediately by quenching in a quenching liquid, which may for example be a mineral oil or a mineral oil with a minor amount of low boiling point additive. Toluene or carbon tetrachloride are suitable additives. This process has been particularly effective for the production of high strength glass for aircraft windscreens, and bent and toughened glass of thickness 1.5 to 3 mm for use in the manufacture of laminated windscreens for motor vehicles.

Suspension of the glass sheets by means of tongs during heating and bending brings inherent problems of distortion of the glass sheet.

SUMMARY OF THE INVENTION

It has now been found that glass sheets can be heated for bending while supported mechanically in an upright position by leaning against a transient mechanical support, for example spaced rollers which are inclined at a small angle to the vertical as long as the support against which the glass leans is advancing at the same forward speed as the glass sheet itself so that no relative slipping takes place between the mechanical support and the glass. Contact of the glass surfaces with the roller surfaces may only be over small areas of the sheet, and as the sheet is upright, gravitational loading between the glass surface and the surface of the rollers is minimal so that there is a greatly reduced risk of marking of the sheet as compared with that customary with horizontal roller support. Further since the gravitational load on any part of the sheet, particularly when it is approaching its softening point, is kept to a minimum, there is less risk of sagging of the sheet and sagging of the sheet between adjacent rollers is picked up by the next roller.

It is a main object of the present invention to provide a method and apparatus for bending glass sheets in which each glass sheet is supported in an upright position, without the use of tongs, during heating and bending.

Another object of the invention is to provide a method and apparatus for the continuous bending and liquid quenching of glass sheets in which each sheet is maintained throughout in an upright position without the use of tongs, and after bending is lowered vertically into a tank of chilling liquid for toughening by liquid quenching.

A further object of the invention is to provide a method and apparatus by which the glass is transferred from the near vertical position in which it is supported during heating, to a vertical position for lowering vertically for subsequent thermal treatment, either quenching in a chilling liquid, or annealing.

The invention provides a method of processing a hot glass sheet, in particular bending, in which a sheet of glass is supported on its lower edge and near-vertical support is provided for one face of the sheet so that the sheet is disposed at a small angle to the vertical. The sheet, while so supported, is advanced through a heating furnace to a shaping station at which shaping dies are closed on to the sheet. The dies are tilted through an angle to bring the sheet to a vertical position, and are then opened for removal of the shaped sheet in a vertical path for subsequent thermal treatment.

Usually in carrying out the invention the shaping surfaces are bending dies which are closed by moving a male die having a convex surface into bending position, and supporting the hot glass sheet against the female die which carries the sheet against the male die to bend the sheet. The upper edge of the bent sheet is gripped when the dies have been tilted and the sheet is vertically disposed, then the dies are opened so that the bent sheet is suspended and can then be lowered vertically for subsequent thermal processing, either by annealing or by quenching in a chilling liquid to toughen the sheet.

A series of glass sheets are bent in succession, and after lowering of a bent sheet has begun the dies are tilted back as they are opening to an inclined disposition to receive between them the next near-vertical sheet for bending.

The invention can also be employed to produce a matching pair of curved glass sheets for subsequent lamination together to produce a laminated window unit. Each sheet is heated to the same thermal condition during its advance through the heating furnace and is bent to the same desired curvature. Constant conditions are maintained while both sheets are heated and bent, and subsequent to bending one of the sheets is rapidly chilled to induce predetermined toughening stresses therein, and the other sheet is annealed.

Glass sheets may be advanced in succession through the heating station, bent in succession, and alternately toughened and annealed as they are removed from the bending station. A toughened sheet and an annealed sheet successively produced are selected for subsequent lamination.

The invention also comprehends apparatus for processing a glass sheet including a tilting box mounted adjacent the end of a furnace through which the glass sheets are to be conveyed in upright disposition, and having an entrance in an end wall contiguous to the furnace and an exit mouth in the floor of the box for removal of a sheet vertically from the box. A plurality of spaced-apart near-vertical rollers in the box define, when the box is tilted, an inclined support for a hot glass sheet which enters the box from the furnace. Co-operating glass-engaging dies are mounted in the box one of which dies is constructed to advance from behind and through said rollers. Means are provided for tilting the box between its tilted position and a position in which the glass sheet is vertical between the dies when closed. Tongs engage the upper edge of the glass sheet when between the dies, and the bent sheet is lowered vertically through the exit mouth, when the dies are opened, to quenching means or annealing means mounted vertically below and in line with the exit mouth.

BRIEF DESCRIPTION OF THE DRAWINGS

An embodiment of the invention will now be described, by way of example, with reference to the accompanying drawings in which:

FIG. 9 is a front elevation of a carriage on which a glass sheet is supported for transportation through the furnace, FIG. 11 illustrates an arrangement of electrical heaters on one side wall of the furnace, FIG. 12 shows schematically a thyristor-controlled circuit for controlling current supply to a group of heaters of FIG. 11, FIG. 13 illustrates an arrangement of electrical heaters on the opposite side wall of the furnace, FIG. 20 illustrates in detail the mounting of adjustable bottom stub rollers in the tilting box, FIG. 25 is a front elevation of the female bending die, FIG. 26 is a schemtic plan view of the die of FIG. 25, FIG. 27 is a vertical section through a support structure for the female bending die of FIGS. 25 and 26 showing an adjustable mounting for the die, FIG. 39 is a detailed front elevation of the tong bar of FIG. 37, FIG. 42 is a front elevation of glass sheet suspension tongs which are shown suspended in a tong gate which is fixed to the tong bar, with a sheet of glass gripped between the tong jaws, FIG. 43 is a side elevation of the tongs of FIG. 42, FIG. 44 is a section on line XLIV—XLIV of FIG. 42, FIG. 45 is a section on line XLV—XLV of FIG. 42.

DESCRIPTION OF THE PREFERRED EMBODIMENTS

Figure 1:
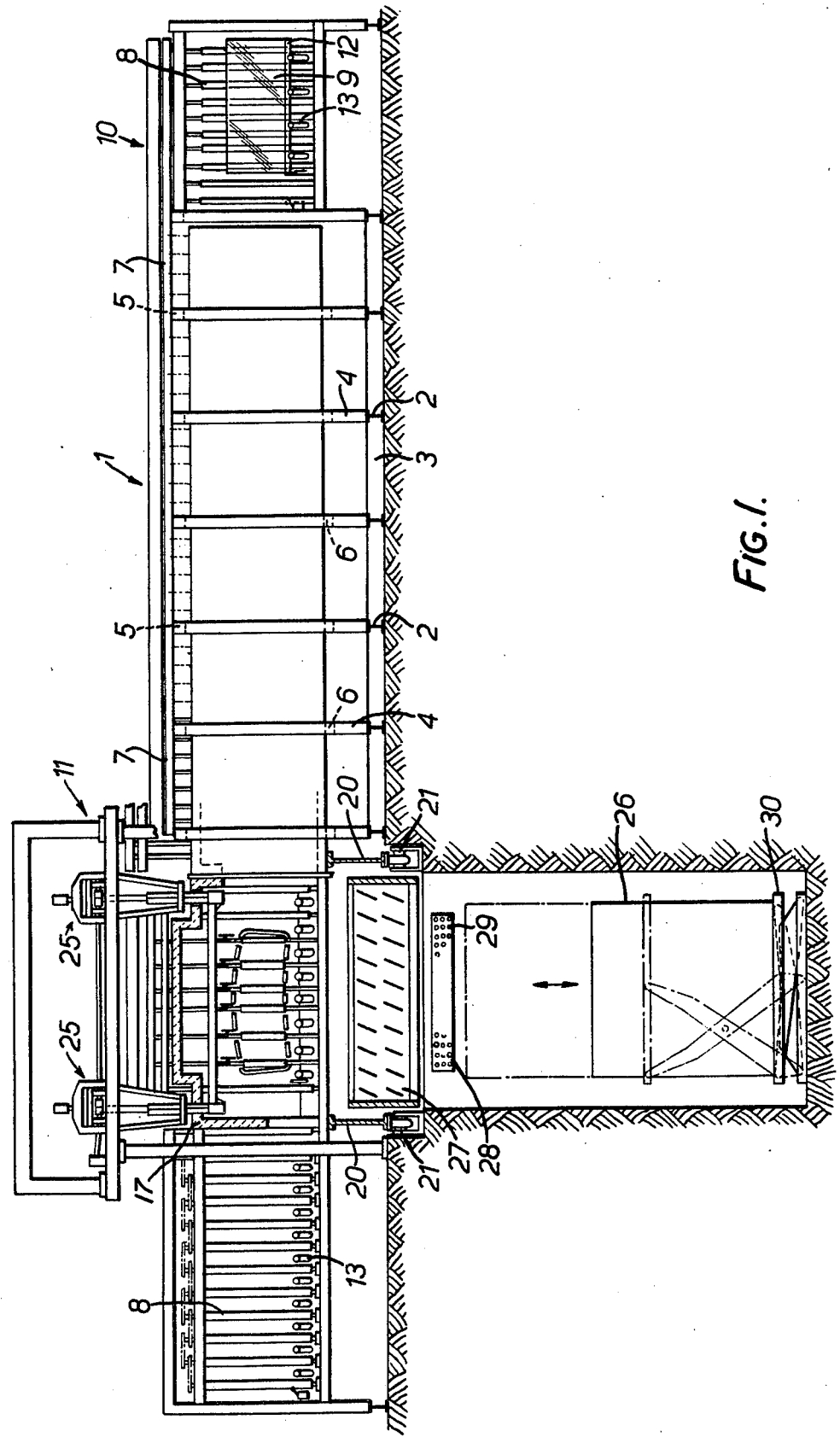
FIG. 1 is an elevation, partly in section, of apparatus according to the invention including a loading station for flat glass sheets, a heating furnace, bending apparatus and liquid quenching apparatus.

FIG. 1 illustrates the general arrangement of apparatus according to the invention for heating, bending and toughening glass sheets which are conveyed through the apparatus throughout that operation in an upright disposition, that is in a near-vertical disposition during heating, and in a vertical disposition after bending and when being quenched in a chilling liquid.

The furnace chamber is indicated generally at 1 and has a cross-section of rectangular form with a specially shaped floor as will be described, and is supported at an angle to the vertical of about 5° in a basic girder framework which includes base girders 2 which are joined at their ends by cross girders 3. From the ends of the base girders there extend upright girders 4 which are at an angle of four example 5° to the vertical as more clearly shown in FIGS. 4 and 5. The upper ends of the upright girders 4 are connected together by cross girders 5 which are inclined at an angle of about 5° below the horizontal.

The floor of the furnace is supported by cross girders 6 which extend below the lower ends of the upright girders 4 and are shaped to support the shaped floor of the furnace. The downwardly sloping step in the furnace floor which slopes towards the bottom of one side wall permits any cullet which falls to the floor to be collected at outlets near the bottom of the side walls, which outlets are closed by hinged doors.

The furnace 1 is a refractory-lined, metal structure having side walls which extend upwardly from the floor and an integral roof construction which is hung from the upper girders 5. Longitudinal girders 7 fixed along the top of the furnace provide support for gear boxes housing the upper ends of a plurality of spaced-apart, upright, near-vertical rollers 8 which define an inclined support for sheets of glass 9 which are to be conveyed through the furnace 1 for bending and subsequent liquid-quench toughening or annealing.

The rollers 8 are asbestos-covered or of heat-resisting stainless steel and are each mounted at an angle of from 2° to 10° to the vertical e.g., 5°, and form part of a conveyor for the sheets 9 which extends right through the furnace 1 from a loading station indicated generally at 10 to a bending station 11. The rollers are 6.5 cm in diameter and are spaced 19 cm apart in the furnace. The spacing between rollers may be up to 30 cm in the region of the outlet end of the furnace where the glass reaches its final temperature. At the inlet end of the furnace where the glass is at a low temperature, the spacing may be greater, for example 38 cm or more providing there are sufficient rollers to support the whole length of the glass sheet in a stable condition.

The conveyor includes a movable support in the form of a carriage 12 on which the lower edge of the glass sheet 9 is seated, and bottom stub rollers 13 which project through spaces between the upright rollers 8 near the bottom of those rollers both at the loading station 10 and in the furnace 1, and driving means for advancing the carriage 12 through the furnace with the glass sheet 9 leaning against the upright rollers 8.

The bottom stub rollers 13, which are also of heat-resistant stainless steel or asbestos covered, are mounted, in the embodiment illustrated, at acute angles of 50° to the upright rollers 8.

Figure 10:
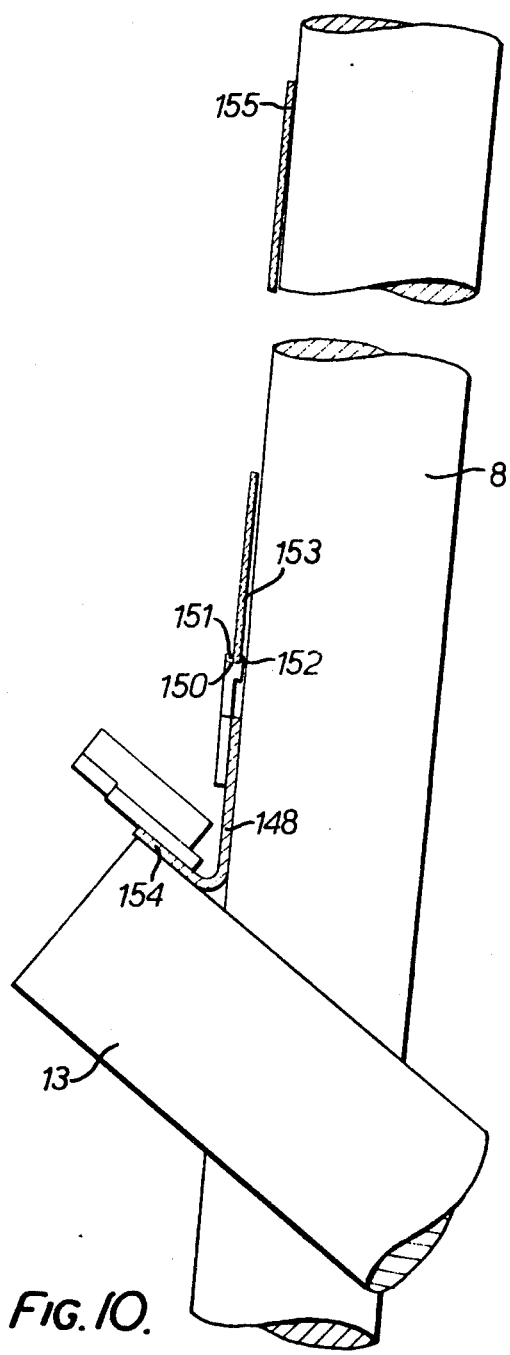
FIG. 10 is a section on line X—X of FIG. 9 also illustrating the disposition of the carriage and the glass sheet relative to the upright rollers and the bottom stub rollers of the furnace.

The carriage 12 is shown in more detail in FIGS. 9 and 10 and is of V-section having faces which are at an angle to each other matching the acute angle between the axes of the upright rollers 8 and the stub rollers 13. These faces of the carriage engage frictionally both the rollers 8 and 13, which are driven at the same speed as will be described, so that the carriage carrying the sheet is advanced through the furnace by the frictional engagement with both the bottom rollers 13 and the upright rollers 8. The bottom edge of the sheet is seated on specially shaped supports on the carriage and is slightly offset on the carriage 12 from the roller surfaces, so that a certain relaxation with deformation only below a predetermined limit can take place while ensuring that the sheet remains in its upright disposition and the lower edge of the sheet does not become displaced from the carriage.

Figure 1A:
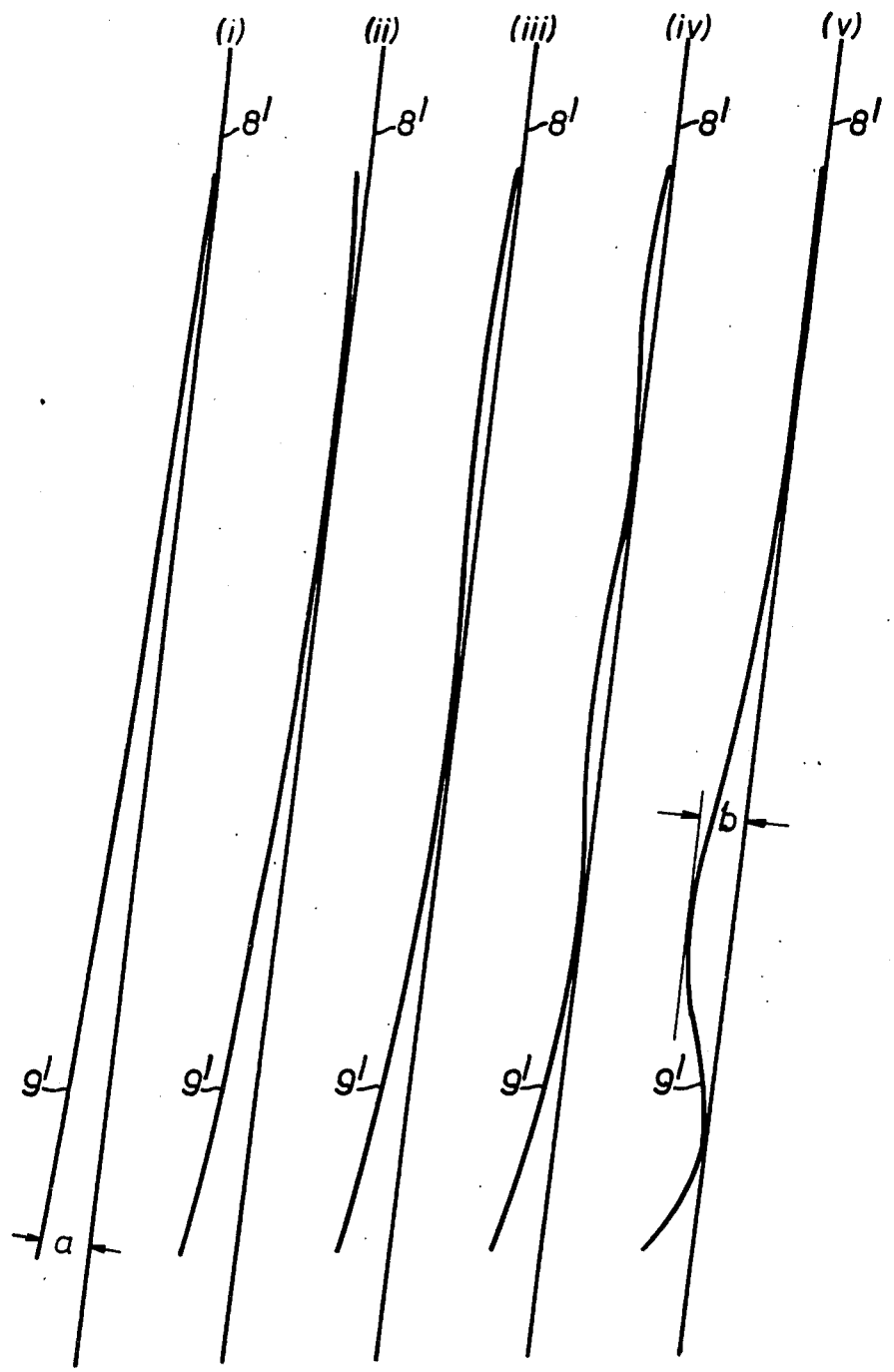
FIG. 1A shows diagrammatically stages in the relaxation of a flat glass sheet against near-vertical support rollers as the sheet is heated.

Five stages of relaxation of the glass sheet 9 against the upright rollers 8 are illustrated in FIG. 1A. In each of the diagrams of FIG. 1A the line 8' represents the effective support plane defined by the surfaces of the upright rollers 16 and the line 9' represents the glass sheet. The offset $a$ of the lower edge of the glass sheet from the rollers surfaces is indicated in diagram (i).

Initially only the top edge of the flat glass sheet contacts the rollers 8. As the glass softens the sheet begins to sag under its own weight and begins to touch the rollers below the top edge of the sheet as indicated in diagram (i).

The sagging of the glass continues causing the point of contact with the rollers to move downwards as indicated in diagram (ii) and the top of the sheet lifts away from the roller surfaces.

Diagram (iii) illustrates how as heating of the glass continues during the continued travel of the sheet through the furnace, the point of contact of one face of the sheet with the rollers continues to move downwardly and the top of the sheet falls back on to the rollers to form a shallow arch which is exaggerated in the diagram.

Then the portion of the glass sheet below the lower point of contact of the glass with the rollers continues to sag under its own weight and due to the compressive effect of the glass above it, and the arch which developed at the heating stage illustrated in diagram (iii) lengthens until it eventually collapses under its own weight against the rollers to give a second region of contact with the rollers as indicated in diagram (iv).

Study of the continued behaviour of the sheet which is now approaching the required temperature for bending and/or toughening shows that several such shallow arches may form and collapse in the upper portion to the supported sheet, but the lowest arch is the most persistent as it is under the greatest compression. All the very shallow upper arches tend to collapse against the rollers so that the upper portion of the sheet becomes virtually flat against the rollers as shown in diagram (v), and a persistant bulge develops in the lower portion of the sheet.

The extent of this bulge, represented by a dimension $b$ measured from the effective support plane 8' of the rollers 8, gives a measure of the deformation of the sheet in the course of its heating, and the thermal and time settings of the heating schedule are controlled, as will be described, to permit the supported glass sheet to relax as it is heated only by an amount less than the maximum acceptable deformation $b$ of the sheet.

For most purposes, and particularly in the manufacture of automobile windscreens the maximum acceptable value of deformation $b$ is 0.5 mm.

In the preferred way of operating the heating zone is set at a particular temperature, and the time taken for the glass sheet to traverse the heating zone is set in dependence on the glass thickness so as to achieve a predetermined temperature condition.

The temperature of the heating zone must be such that in the time taken for the glass sheet to reach the predetermined temperature condition, and depending on the thickness and height of the glass sheet, the angle of the supported sheet as governed by the angle of the rollers 8, and the amount of offset on the lower edge of the glass sheet from the rollers 8, the glass sheet is only permitted to relax by an amount less than the predetermined maximum acceptable deformation of the glass sheet which is the amount of deformation which is acceptable in meeting particular product quality requirements. When quality requirements are very stringent, the maximum acceptable deformation may occur for example during the initial relaxation of the glass sheet against the rollers as in diagram (iii) before appearance of the lower bulge.

By determination of the variation of temperature with time of the glass sheet 9 as t is carried through the furnace, and knowing the variation of viscosity with temperature of the glass from which the sheet is made, a quantity to be called the "deformation index" can be calculated for the glass sheet at any time during the heating of the sheet and when the sheet reaches a predetermined temperature condition.

The deformation index is represented by the expression:

$$\int \frac{dt}{\eta(t)}$$

where:
$t$ = heating time in seconds
$\eta(t)$ = viscosity of the glass in poises at time $t$ after commencement of heating.

The deformation index is therefore represented by the integrated area under the curve of the reciprocal of the viscosity plotted against time. The value of the deformation index of the glass sheet is zero as the sheet enters the furnace and heating begins and this value increases with time at a rate which depends on the rate of change of viscosity of the glass and hence on its rate of heating. The deformation index rises until a critical value is reached at which time deformation of the sheet has reached a maximum acceptable value. The value of the critical deformation index will depend therefore on the use to which the glass sheet is to be put.

In practice the heating schedule is such as to ensure that the actual deformation index of the sheet when it attains a desired temperature condition is less than the critical deformation index.

In the idealised case in which the glass sheet has continuous support along its bottom edge the critical value of deformation index can be represented by the expression:

$$S \cdot \frac{T^2 A}{\rho g L^2 Y}$$

Where
- $S$ = is a scale factor
- $T$ = thickness of glass (cm)
- $A$ = angle of support to vertical
- $p$ = density of glass sheet (2.5 g/cm³)

Where
- $g$ = gravitational acceleration (981 cm/sec²)
- $L$ = height of glass sheet (cm)
- $Y$ = offset of bottom edge of glass sheet from the support (cm).

For a glass sheet of a particular thickness and height and with set furnace parameters, particularly the angle of the rollers and the offset of the lower edge of the glass sheet from the rollers and hence the angle of the glass sheet to the vertical, the scale factor can be calculated for an idealised case with continuous bottom edge support for the glass sheet and for the relaxation condition in which a bulge is appearing in the glass sheet.

Figure 1B:
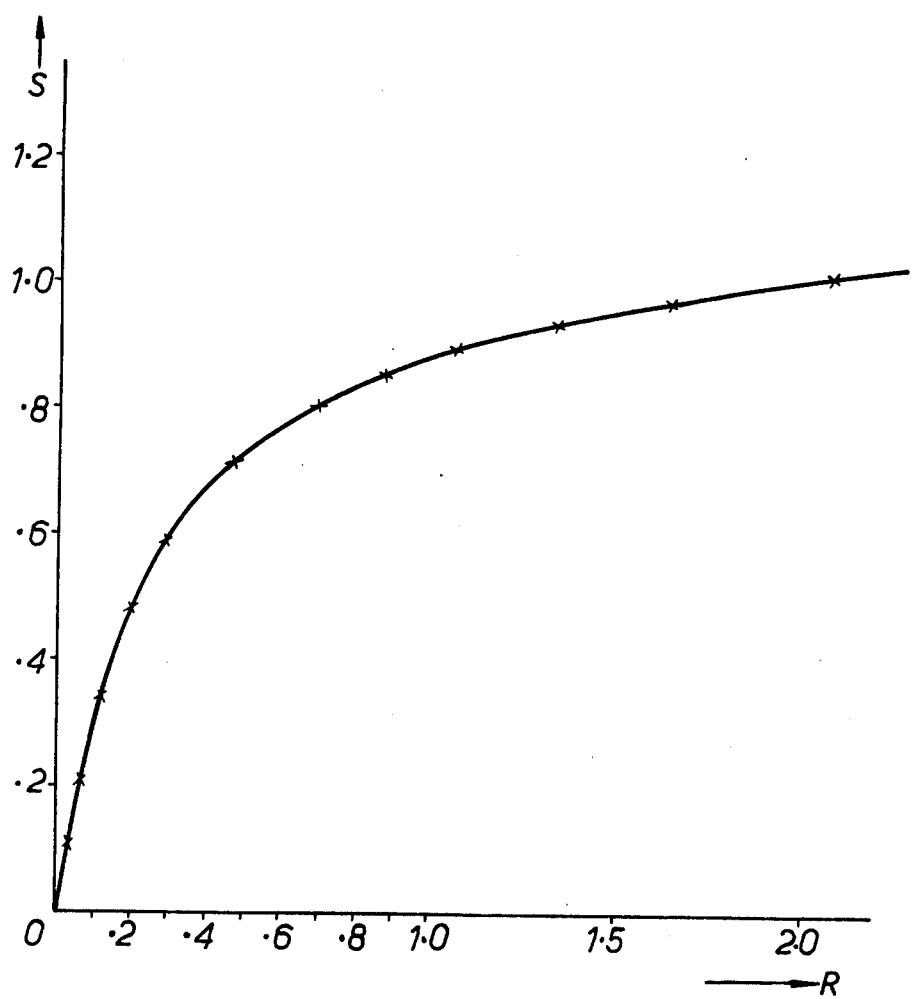
FIG. 1B is a graph illustrating selection of a scale factor for calculations concerning permissible deformation of a glass sheet as it is heated in the furnace, FIGS. 2A and 2B together show a side elevation of the loading station and the furnace of FIG. 1, partly broken away to illustrate upright support rollers and associated bottom rollers at the loading station and in the furnace.

The curve of FIG. 1B is a graph of the scale factor S against the ratio of acceptable amount of bulge of the glass sheet to the offset of the lower edge of the sheet from the rollers, which ratio is designated R. The amount of bulge is measured as the displacement at the maximum point of bulging, from the original plane of the glass sheet in its pristine condition prior to heating.

In the actual case in which the lower edge of the glass sheet is seated on spaced supports on the carriage so that the bottom edge support of the glass sheet is discontinuous, the scale factor S is less than the above mentioned idealised value so that the critical value of deformation index, which is empirically determined, will be less than given by the above idealised formula.

To obtain the critical deformation index which will apply for any set of operating conditions a glass sheet of particular thickness and height is heated under experimentally verified process conditions of roller angle, offset of the lower edge of the glass sheet from the rollers, and furnace temperature setting. The glass sheet is heated under these conditions until a maximum acceptable amount of distortion of the glass is present which may be reached during the initial relaxation of the upper part of the glass sheet against the rollers, but which is more usually a limiting amount of bulging which is acceptable during continued relaxation of the glass sheet.

The temperature/time heating schedule of the glass sheet is also determined experimentally, which permits calculation of the actual deformation index of the glass when the glass sheet has the maximum acceptable deformation, which actual deformation index is the critical deformation index.

The critical deformation index is a function of the parameters T, A, L and Y in the above formula, and the determination of the critical deformation index for a particular glass sheet under particular furnace conditions permits calculation of the critical deformation index for other thicknesses and heights of glass sheets and for other values of roller angle, and offset of the lower edge of the glass sheet from the rollers.

Usually the offset distance is about 2 mm to 4 mm and the maximum acceptable amount of deformation depends on the quality, particularly the optical quality required in the final product. In the case of glass sheets which are to be incorporated in vehicle windscreens, for which the optical requirements are stringent, it may only be acceptable to permit deformation of the glass sheets up to a point in the initial relaxation before the appearance of the bulge. A bulge of up to 0.5 mm may be acceptable.

Where the quality requirements are less critical a bulge greater than 0.5 mm may be permissible, for example up to 4.0 mm.

Having determined the critical deformation index for a glass sheet of particular height and thickness, the time required to heat the glass sheet to a desired final temperature using a particular furnace temperature setting can be determined and set, so that the glass sheet will not relax beyond the maximum acceptable amount of distortion since the actual deformation index of the glass sheet when it reaches its desired final temperature will be less than the critical deformation index.

It has been found that the near-vertical angle at which the sheet is initially supported when leaning against the rollers 8 may be in the range 2° to 10° for the heating of sheets of soda-lime-silica glass of thickness in the range 1.5 mm to 15 mm to a temperature in the range 580°C to 680°C or even 700°C which temperature range encompasses the usual temperature to which soda-lime-silica glass is heated prior to bending or toughening.

The upright, near-vertical rollers 8 are supported at their lower ends by self-aligning bearing blocks, described hereafter, which are carried by parallel girders which run beneath the furnace floor and are supported on the specially shaped cross girders 6.

The first 10 upright rollers 8 of the plurality of upright rollers constitute the loading station 10, and five bottom stub rollers 13 are respectively located between alternate spaces between the upright rollers 8.

Figure 16:
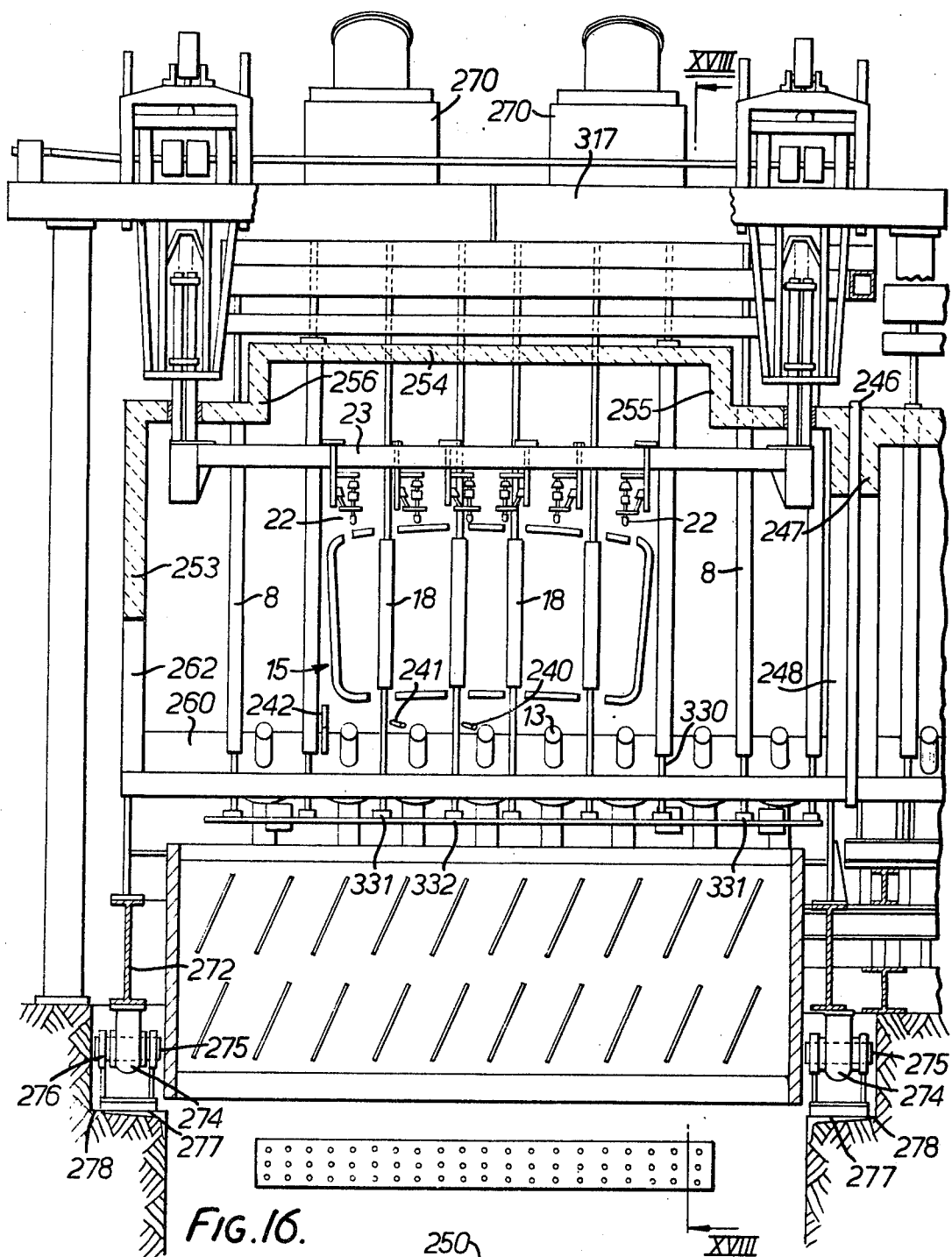
FIG. 16 is a more detailed view of part of FIG. 1 illustrating generally a tilting box which encloses male and female bending dies and is mounted to be tilted from an angle matching the angle of the upright rollers in the furnace to a horizontal disposition above thermal treatment apparatus through which bent glass sheets are lowered.

At the bending station there are horizontally disposed bending dies 15 and 16 which are shown more particularly in FIGS. 16 and 18. The female die 15 is a ring frame die which is shown in more detail in FIGS. 25 and 26 and co-operates with a male die 16 having a continuous bending surface, indicated in FIG. 18 and shown in more detail in FIG. 31. The dies illustrated are rigid dies but articulated wing dies with pivoting mechanism of known kind may be employed for bending complex windscreen shapes. The dies are located in a tilting box 17 which is a refractory lined metal structure defining a heated chamber enclosing the bending dies, and through which there extends a conveyor comprising upright rollers 8 and bottom stub rollers 13 similar to those in the furnace and forming an extension of the conveyor. The upright rollers 18 in the tilting box 17 in the area occupied by the bending dies have short support surfaces so that the female die ring frame can move through and beyond the rollers.

Beyond the outlet from the tilting box 17 there are further upright rollers 8 and bottom stub rollers 13 which form an extension of the conveyor for receiving each carriage 12 after the sheet which it supported has been lifted from the carriage for bending between the bending dies.

The drive to all the rollers at the loading station, in the furnace and in the tilting box is from the same motor. The rollers beyond the outlet from the tilting box have a separate drive and all the drives are controlled in the manner which will be described so that a glass sheet 9 can be fed slowly from the loading station towards the entrance to the furnace 1, thereafter accelerated into the furnace and is advanced through the furnace at an appropriate lower furnace creep speed as the glass is heated. At the end of the set heating time in the furnace the glass is accelerated from the furnace on to the short upright rollers 18 between the bending dies where the carriage is brought to rest with the hot glass sheet exactly located between the dies.

Figure 17:
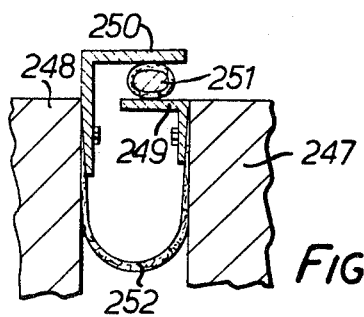
FIG. 17 is a sectional view of a flexible seal between the furnace and the tilting box, FIGS. 18A and 18B together constitute a part-sectional view of the tilting box on line XVIII—XVIII of FIG. 16.

The tilting box is heated by gas burners, shown in FIGS. 16 and 17, to the same temperature as the glass achieves during its passage through the furnace so that the bending dies are at the same temperature as the glass when it is presented to the dies for bending.

The tilting box 17 is mounted on a massive rocking girder frame including bottom beams 20 which are mounted on central pivots 21. An hydraulic ram attached centrally to one end girder of the rocking frame is operable to tilt the frame from an angle of about 5° to the horizontal, in which position the rollers 18 are aligned at the same angle to the vertical as the rollers 8 in the furnace, to a horizontal position of the frame in which the rollers 18 are vertical.

Initially the box is in its tilted position and the male bending die is moved into position as the carriage carrying a glass sheet enters the tilting box and as soon as a hot glass is located between the dies the female die 15 moves through the rollers 18 to press the sheet against the male die and the rocking frame is tilted to its horizontal position as bending of the sheet proceeds. During movement of the female die the glass sheet is lifted from the carriage by fingers on the female die which pass beneath the lower edge of the glass sheet and lift the sheet. When the rocking frame is horizontal, a tong bar 23 carrying glass-gripping tongs 22 is lowered from a hoist mechanism indicated at 25 which can itself be raised and lowered.

Provision is made for the tongs 22 to engage in recesses in the upper edges of the dies 15 and 16, so that they can grip the upper edge of the glass sheet as it is held between the bending dies.

When the glass sheet has been lifted from the carriage 12, the carriage is accelerated out of the tilting box on the exit conveyor 8 before the rocking frame is rocked to its horizontal position when the dies open and the glass, now suspended vertically from the tongs, is lowered through a mouth in the bottom of the box for further treatment.

During its transverse through the furnace 1 the glass is heated to bending temperature for example 610°C at which temperature the glass can be satisfactorily bent and engaged by the tongs 22 without having become so soft as to endanger the finish of the glass surfaces during the bending operation.

When the bent glass is to be toughened, especially when a high strength glass is required, it is desirable to quench the glass from a higher glass temperature, e.g., 680°C, and in the embodiment illustrated in FIG. 1 the bent glass is reheated before it is quenched in a chilling liquid contained in a quench tank 26 which is located in a pit beneath the tilting box 17.

Just beneath the exit mouth in the bottom of the tilting box the glass passes between two banks of electric heaters 27 mounted in a pattern as illustrated facing both surfaces of the glass. During the passage of the glass downwardly between these heaters the glass at its bending temperature, e.g., 610°C is heated throughout its thickness to a pre-quenching temperature nearer to the softening point of the glass e.g., 680°C. The bent glass may be lowered at uniform speed so as to maintain as near as practically possible uniform temperature throughout the whole glass sheet. Alternatively the glass may be accelerated as it is lowered between the heaters to produce in the glass a uniform temperature gradient from a high temperature at the bottom of the sheet to a lower temperature at the top of the sheet.

Such a temperature gradient may be induced in the glass sheet prior to bending by running lower sections of heaters on the furnace walls hotter than upper sections. For example the bottom of the furnace may be at 800°C, middle areas of the furnace walls at 750°C and the upper part of the furnace at 700°C. The bending dies are then heated by means of internal heaters to have a temperature distribution matching that induced in the glass sheet by such a furnace.

Below the boost heaters 27 are two blowing boxes 28 both of which are supplied with cooling air at ambient temperature, for example about 30°C, which is projected through nozzles 29 in the boxes uniformly towards both surfaces of the glass sheet. This pre-cooling of the glass surfaces after boost heating produces immediate temperature gradients from the central core to the surfaces of the glass. The core of the glass remains at about the temperature achieved between the boost heaters, and the pre-cooling of the glass surfaces is such that while the glass temperature is still above the strain point, the glass is immediately quenched in a chilling liquid before these temperature gradients decay.

As the glass is being lowered from the bending dies the tank 26 of chilling liquid is raised on a scissors-lift platform 30 which stands in the bottom of the pit. The tank 26 is raised until the top of the tank is located just below the bottom of the blowing boxes 28 with the surfaces of the chilling liquid in the tank at a predetermined small distance from the bottom nozzles 29 of the blowing boxes. The bent glass sheet in which core-to-surface temperature gradients exist as just described is immediately quenched in the chilling liquid as it passes from the ambience of the cooling air into the surface of the chilling liquid.

The chilling liquid is usually a mineral oil for example CYLREX FM (Trade Mark) and may have added to it a minor proportion of a low boiling point additive for example up to 1% by weight of toluene of carbon tetrachloride.

As the glass is immersed in the liquid in the tank 26 it comes to rest on a frame immersed in the tank, which frame is attached to the bottom one of the blowing boxes. The tongs are opened to release the glass on to the frame and after a time to permit the glass to cool in the liquid the tank is lowered, the glass is removed from the frame and degreased, and the toughened glass is stacked in a rack to complete its cooling to ambient temperature.

In another method of operation the tank 26 is not raised, the bent glass sheet comes to rest in the frame and remains in the frame for cooling in ambient air to produce an annealed glass sheet. An annealing enclosure may be moved on a horizontal track into position to receive a hot bent glass sheet.

Provision may be made for alternatively annealing and quenching sheets in succession as they are lowered from the bending dies so that successsive sheets of a pair are respectively annealed and toughened. These sheets have been heated and bent under identical conditions and have matching dimensions and are emminently suitable for laminating together in the manufacture of a laminated windscreen.

FIGS. 2A, 2B and 3 to 8 illustrate in more detail the construction and operation of the loading station and the furnace.

Figure 2A:
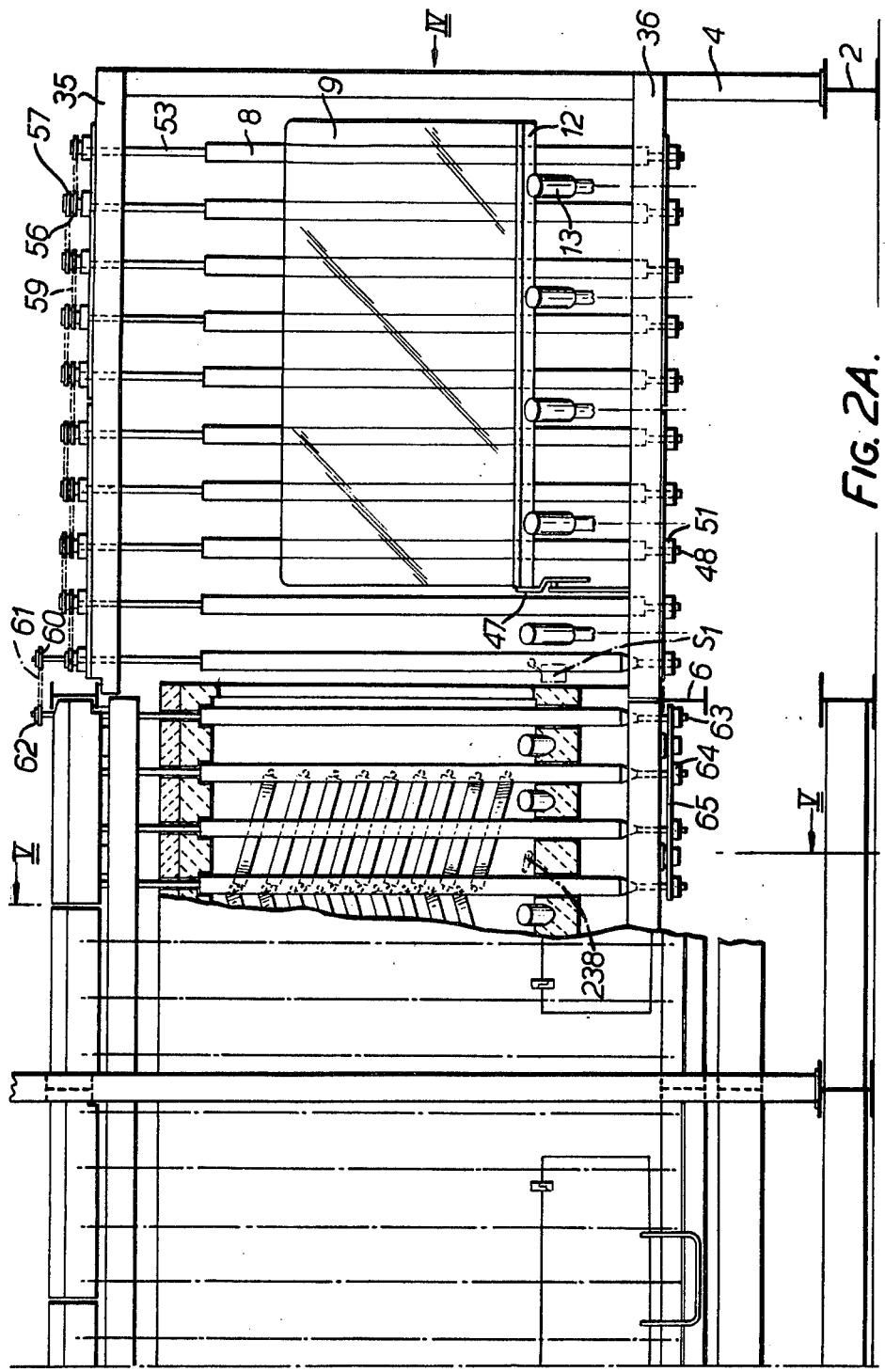

The first 10 upright rollers 8 of the conveyor constitute the loading station as illustrated at the right hand end of FIG. 2A. These rollers are of heat-resisting stainless steel and are mounted at 20 cm. intervals between upper horizontal girders 35 and lower horizontal girders 36 which form extensions of the girder construction supporting the furnace 1. The girders 35 and 36 at the loading station are connected to an end frame, FIG. 4, comprising a base girder 2 and an upright 37 which is inclined to the vertical at the same angle of about 5° as the rollers 8 and which is supported by struts 38. The end wall of the furnace at the loading station is indicated at 39 and an entrance mouth 40 to the furnace is formed through the end wall 39 in alignment with the upright rollers 8 and includes an enlargement 41 at the bottom of the mouth 40 and aligned with the stub rollers 13 to permit passage of the carriage 12 on the conveyor into the furnace. Flexible asbestos cloth sealing strips, not shown, are mounted in the upright edges of the furnace mouth 40.

Figure 5:
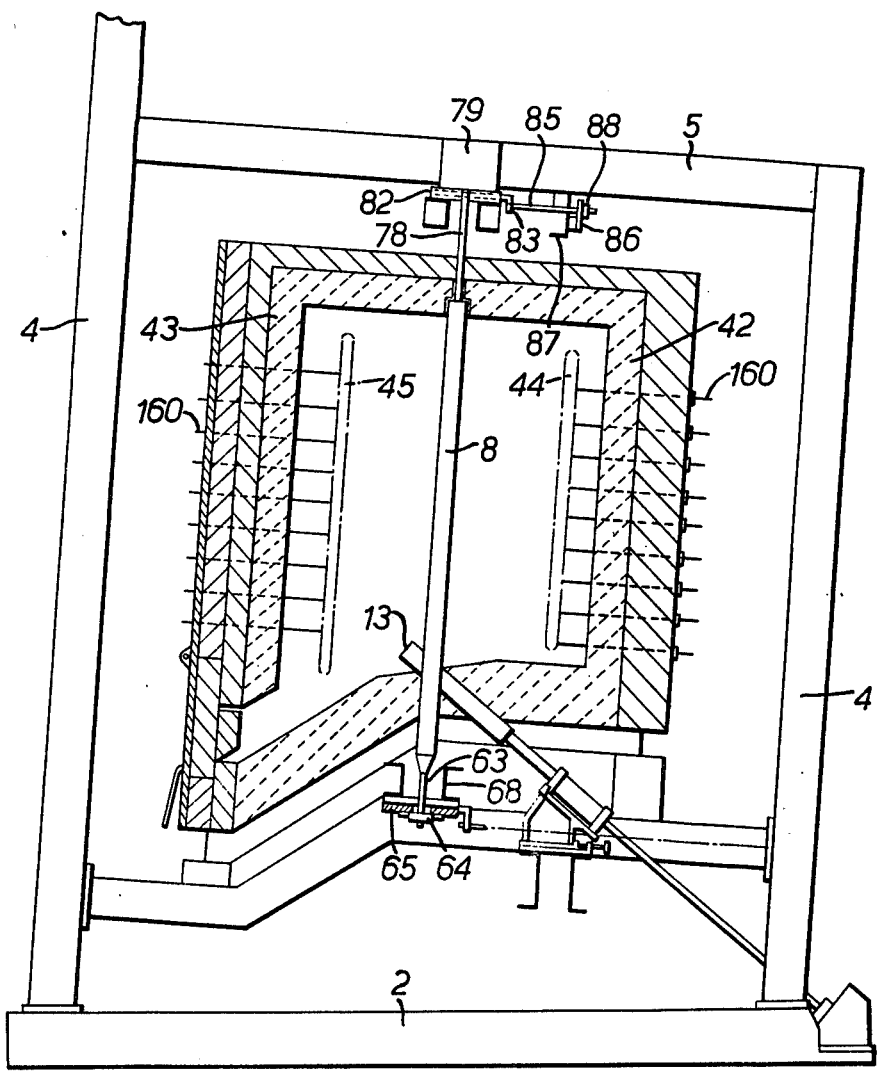
FIG. 5 is a section on line V—V of FIG. 2A.
Figure 6:
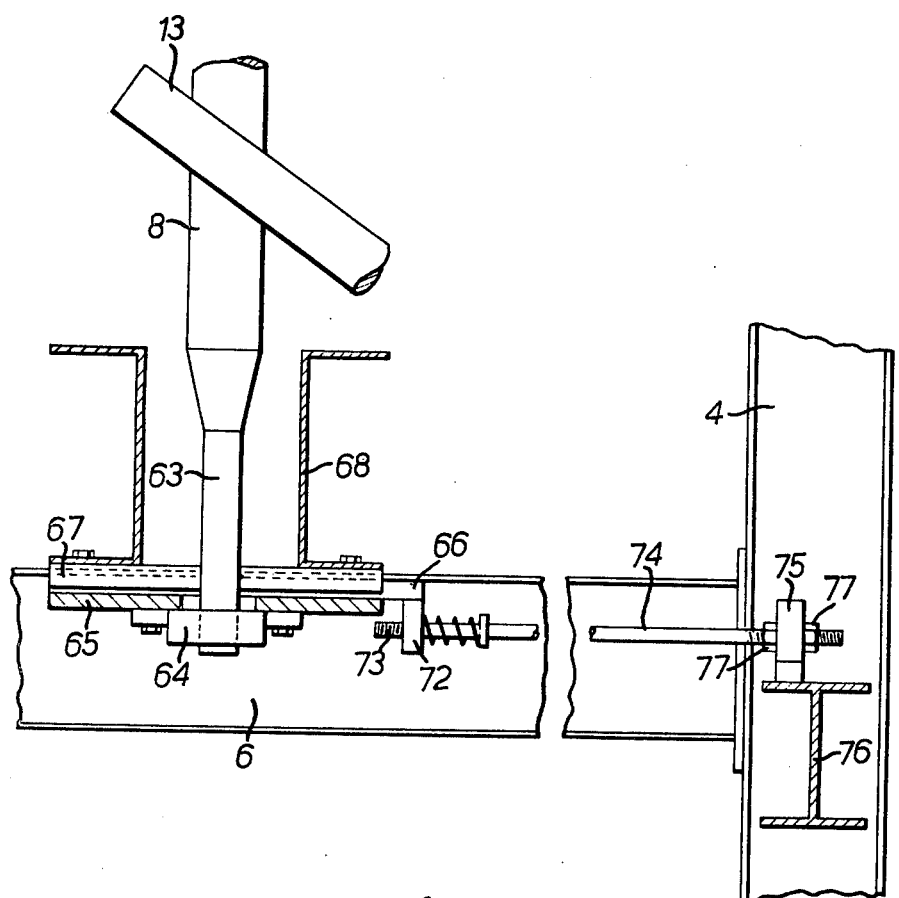
FIG. 6 is a side elevation, partly in section, showing one of the adjustable mountings for bottom bearings of the upright rollers.
Figure 7:
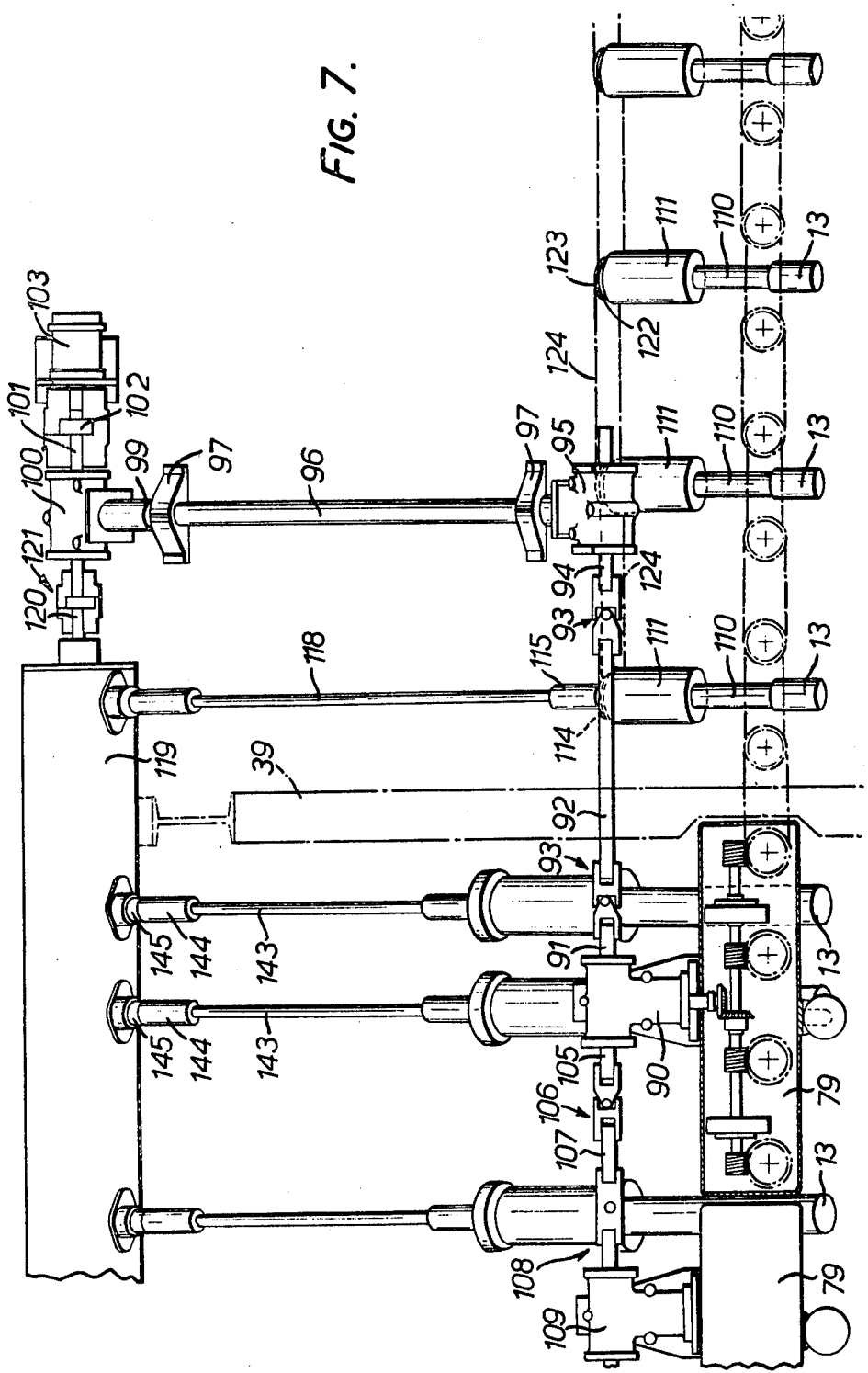
FIG. 7 is a schematic plan view of the drive for the upright rollers and for bottom stub rollers at the loading station and at the entrance to the furnace.

Side walls 42 and 43 of the furnace 1 carry banks of electrical heaters 44 and 45, FIG. 5, which heater banks are illustrated in greater detail in FIGS. 11 and 13. These heaters face opposite sides of the path of travel of each glass sheet 9 through the furnace and are connected together in groups which are individually controlled as will be described.

At the loading station, FIG. 2A, the carriage 12 is located in position by a retractable carriage stop 47 against which the front end of the carriage 12 bears so that the carriage is held in sliding engagement with the rollers which are being driven at an initial slow speed and when the stop 47 is retracted movement of the carriage commences from the loading station into the furnace. A cold flat glass sheet 9 loaded on to the carriage 12 leans against the upright rollers 8 at the loading station. The sheet, being cold is not deformable and the necessity for exact alignment of the rollers 8 and 13 at the loading station is not as critical as is the need for their exact alignment in the furnace and the tilting box. Therefore the rollers 8 which are mounted between the beams 35 and 36 at the loading station are not angularly adjustable but are set in fixed bearing blocks at the angle of the conveyor, in this embodiment 5° to the vertical.

Figure 3:
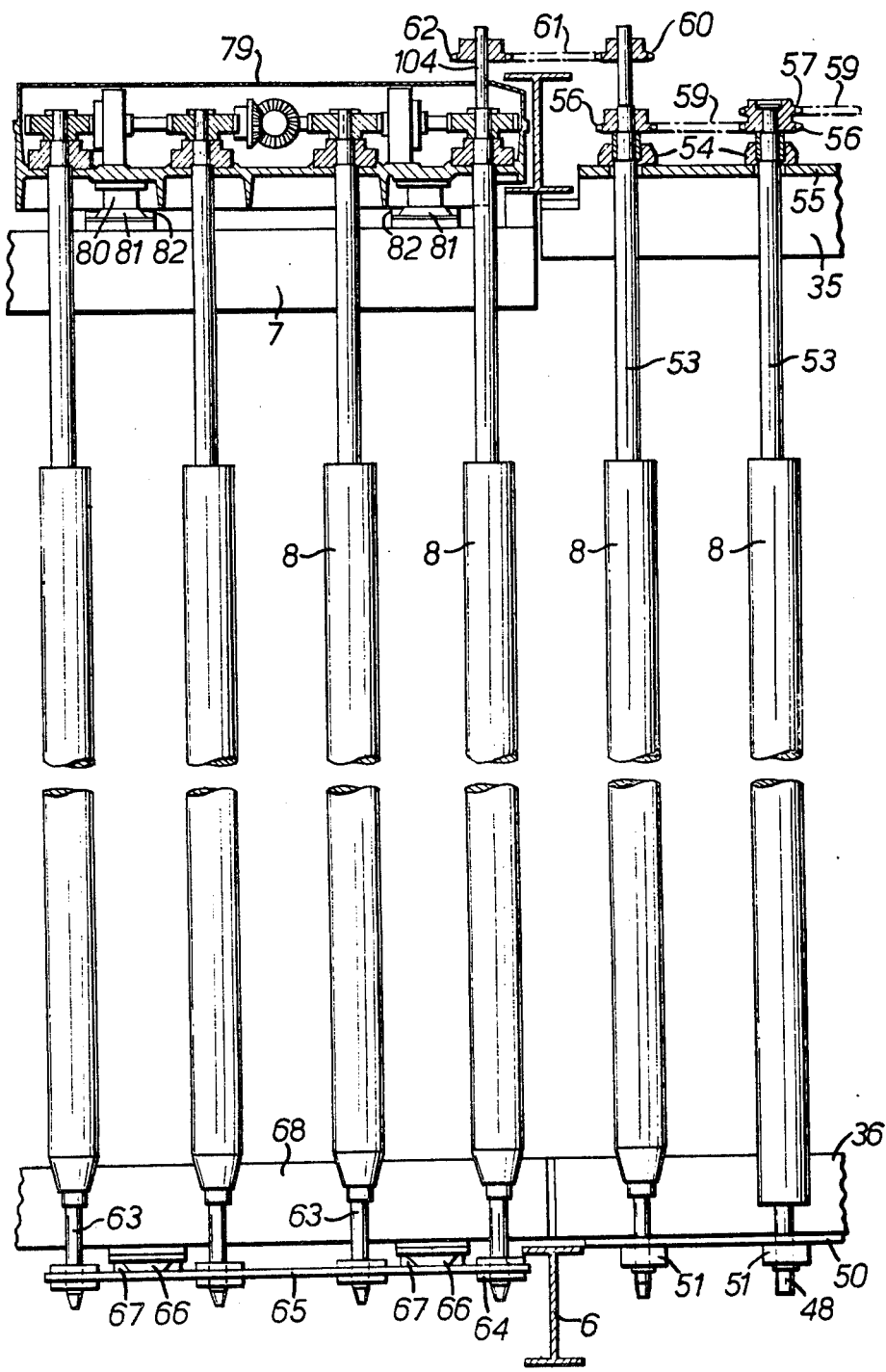
FIG. 3 is a detailed elevation showing the mounting of the upright support rollers.
Figure 4:
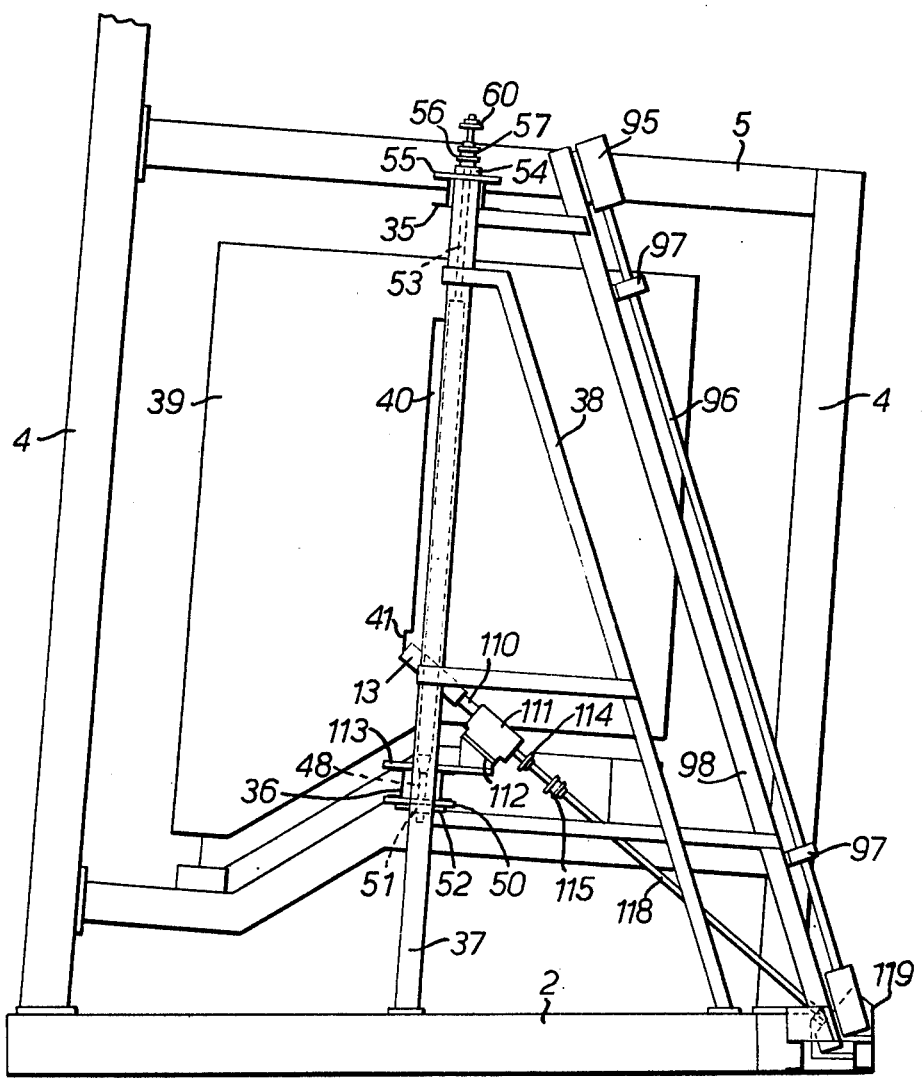
FIG. 4 is an end elevation of the furnace of FIG. 1, as viewed from the end of the loading station in the direction of arrow IV in FIG. 2A.

As shown in FIGS. 3 and 4 the lower ends of the upright rollers 8 at the loading station are formed with stub shafts 48 which extend downwardly between the girders 36 and through apertures in a plate 50 which is bolted to the bottom of girders 36. Beneath the plate 50 there are carried self-aligning bearing blocks 51, one for each of the rollers 8. The bearing blocks 51 have lugs 52 which are bolted to the plate 50 and the stub shafts 48 extend downwardly into and through the bearing blocks 51.

At their upper ends the upright rollers 8 at the loading station are formed as integral elongated stub shafts 53 which extend upwardly between the beams 35 and are each housed in a self-aligning bearing block 54. The bearing blocks 54 are bolted by lugs to a support plate 55 which is fixed on top of the girders 35. Each of the shafts 53, except that of the roller 8 nearest to the entrance to the furnace, extends upwardly through its bearing block 54 and carries a sprocket wheel block comprising two sprocket wheels 56 and 57. The sprocket wheels for adjacent rollers are connected together by means of drive chains 59.

The elongated stub shaft 53 of the roller 8 nearest to the inlet end wall 39 of the furnace is longer than the stub shaft 53 of the other rollers of the loading station, and carries a single sprocket wheel 56 and on its upper end a main drive sprocket 60 which is connected by a drive chain 61 to a sprocket 62 on the upper end of the first of the upright rollers 8 within the furnace. The rollers 8 at the loading station are thus driven from the same drive as the rollers 8 constituting the rest of the conveyor in the furnace.

Within the furnace it is important to ensure accurate alignment of the surfaces of the rollers 8 relative to each other so that the surfaces of the rollers which provide transient support for the glass sheet all lie in the same plane which is inclined to the vertical at the present angle, for example 5°. In order to effect this the rollers 8 within the furnace are mounted in alternating groups of four and three rollers each, with the rollers spaced about 20 cm. apart, and the exact location of the lower bearings of each group of adjacent rollers is adjustable horizontally at right angles to the direction of the conveyor. The upper ends of the rollers of each group are mounted in a gear box whose position is also adjustable horizontally at right angles to the direction of advance of sheets of glass along the conveyor. The adjustment of the disposition of the bearing blocks and the gear boxes relative to each other permits alignment of all the upright rollers 8 in the furnace at the required angle to the vertical.

The lower end of each roller 8 in the furnace is formed as a stub shaft 63, as shown in FIGS. 2A, 3, 5 and 6, which is supported in a self-aligning bearing block 64 which is fixed in a plate 65 which is carried by dove-tail slides 66 which slide in slide beds 67 which are fixed beneath parallel girders 68 which run longitudinally beneath the furnace floor and are supported on the specially shaped cross girders 6 which support the furnace floor. This arrangement is shown in greater detail in FIG. 6.

Each of the dove-tail slide blocks 66 has an end lug 72 which is drilled and threaded to receive the threaded end 73 of an adjusting shaft 74 whose other end extends through an apertured locating block 75 which is bolted to a cross girder 76 extending between the lower ends of the upright girders 4 along one side of the furnace. The outer end of the shaft 74 is threaded and is fitted with lock nuts 77 on either side of the block 75. Each of the plates 65 carrying the bearing blocks 64 for a group of rollers has two V-slides and the adjustment of the two shafts 74 permits adjustment of the disposition of the lower ends of that group of rollers.

The upper ends of the group of rollers 8 are of reduced diameter and the elongated stub shafts 78, FIGS. 3 and 5, extend into a gear box 79 mounted by antivibration mountings 80 on dove-tail slides 81 which are located in slide beds 82 which are mounted on top of the longitudinally extending girders 7. In the same way as the slides for the lower bearings of the rollers, each of the dove-tail slides 81 has an end lug 83 which is drilled and threaded to receive the threaded end of an adjustment shaft 85. The other end of the shaft 85 extends through an apertured locating plate 86 which is mounted on a girder 87 which runs longitudinally of the furnace beneath the cross girders 5. The outer end of the shaft 85 is threaded and is fitted with lock nuts 88 on either side of the locating plate 86.

Each of the gear boxes 79 is seated on two such slides and rotation of the shafts 85 of the gear box moves the dove-tail slides 81 in their slide beds 82 so that the position of the gear boxes 79 can be adjusted, as required relative to the adjustment of the bearing blocks 64 for the lower ends of the rollers to ensure that the rollers 8 driven by that gear box are at the required predetermined angle to the vertical.

The upper ends of the elongated stub shafts 78 of the rollers 8 are mounted in the gear boxes 79 by bearing blocks which are driven by worm gears in conventional manner. The input drive to each of the gear boxes 79 is through a right angle drive unit 90, FIG. 7 which has a main input drive shaft 91. The drive shaft 91 for the first of the gear boxes 79 is connected through an intermediate shaft 92 and flexible couplings 93 to the main output shaft 94 of a main right angle drive unit 95 whose input drive is by a shaft 96 which is mounted in bearings blocks 97 which are fixed to an inclined support girder 98, FIG. 3, which extends downwardly from the upper longitudinal girders 35 of the loading station to the base support structure of the apparatus.

At its lower end below the lower bearing block 97 the shaft 96 is coupled to an output shaft 99 of a right angle drive unit 100, whose input shaft 101 is coupled by flexible coupling 102 to the output shaft of a hydraulic motor 103 which constitutes the main drive unit for the rollers in the loading station, the furnace and the tilting box.

The first gear box 79 has an output shaft 104, FIG. 3 which carries the drive sprocket 62 which transmit drive from that gear box to the drive sprocket 60 of the roller 8 at the loading station 10 adjacent the end wall 39 of the furnace and thereby drives all the rollers 8 at the loading station at the same speed as the rollers 8 in the furnace.

The right angle drive unit 90 which transmits drive from the hydraulic motor 103 to the first gear box 79 has a further transmission shaft 105 aligned with the input shaft 91, which transmission shaft 105 is coupled by a flexible coupling 106 to an intermediate shaft 107 which transmits drive through a further flexible coupling 108 to the next right angle drive unit 109 which is connected to the gear box 79 which drives the next three rollers 8. All the gear boxes 79 are coupled together in this way and are all driven at the same speed in this embodiment by the hydraulic motor 103.

The position of the gear box 79 for each group of rollers is adjustable in the manner described in conjunction with adjustment of the plate 65 carrying the bearing blocks for the lower ends of the rollers so that in setting up the furnace all the rollers 8 of the conveyor extending through the furnace can be accurately aligned so that the glass supporting surface of each of the rollers 8 is at the same angle to the vertical, for example 5°.

The bottom stub rollers 13 define a track for the movable carriage 12 which carries the glass sheet 9 through the furnace and these bottom stub rollers project through spaces between the upright rollers 8 along the whole length of the conveyor and are mounted at an acute angle, in this embodiment 50°, to the upright rollers 8.

The five bottom stub rollers 13 which support the carriage 12 at the loading station are shorter than those that project inwardly into the furnace, and are located in alternate spaces between the upright rollers 8.

At the loading station as shown in FIG. 4 each of the rollers 13 is fixed at one end of a shaft 110 which is supported in a cylindrical bearing assembly 111 which is mounted on an inclined base 112 which is carried on a plate 113 which is bolted to the girders 36. The shafts 110 all extend downwardly towards the base of the apparatus and the shaft 110 of the stub roller 13 nearest to the inlet end wall 39 of the furnace extends through its cylindrical bearing assembly 111 and carries a sprocket wheel 114 and is connected by a flexible coupling 115 to a transmission shaft 118 from a gear box 119 which is mounted at the base of the apparatus and has an input shaft 120 connected through a flexible coupling 121 to an output from the right angle drive unit 100 which is driven directly by the main hydraulic motor 3.

The rest of the stub rollers 13 at the loading station are driven from the roller 13 just described nearest to the furnace. Each of the stub rollers has a shaft 110 which extends through an inclined cylindrical bearing assembly 111 mounted in the manner just described and carries as its outer end a sprocket block comprising two sprocket wheels 122 and 123. The sprocket wheel 122 of the short stub roller 13 adjacent the first stub roller nearest to the inlet end wall of the furnace is connected by a drive chain 124 to the sprocket wheel 114 which is driven directly from the hydraulic motor 103. A similar drive chain 124 connects the sprocket wheel 123 to the similar sprocket wheel 123 of the next roller and so on. Simultaneous drive is thus transmitted to all the bottom stub rollers 13 at the loading station from the hydraulic motor 103.

A bottom stub roller 13 is located in each of the two spaces between the first three upright rollers 8 of the furnace. Thereafter there is bottom roller in each of the spaced between the last three upright rollers.

Figure 8:
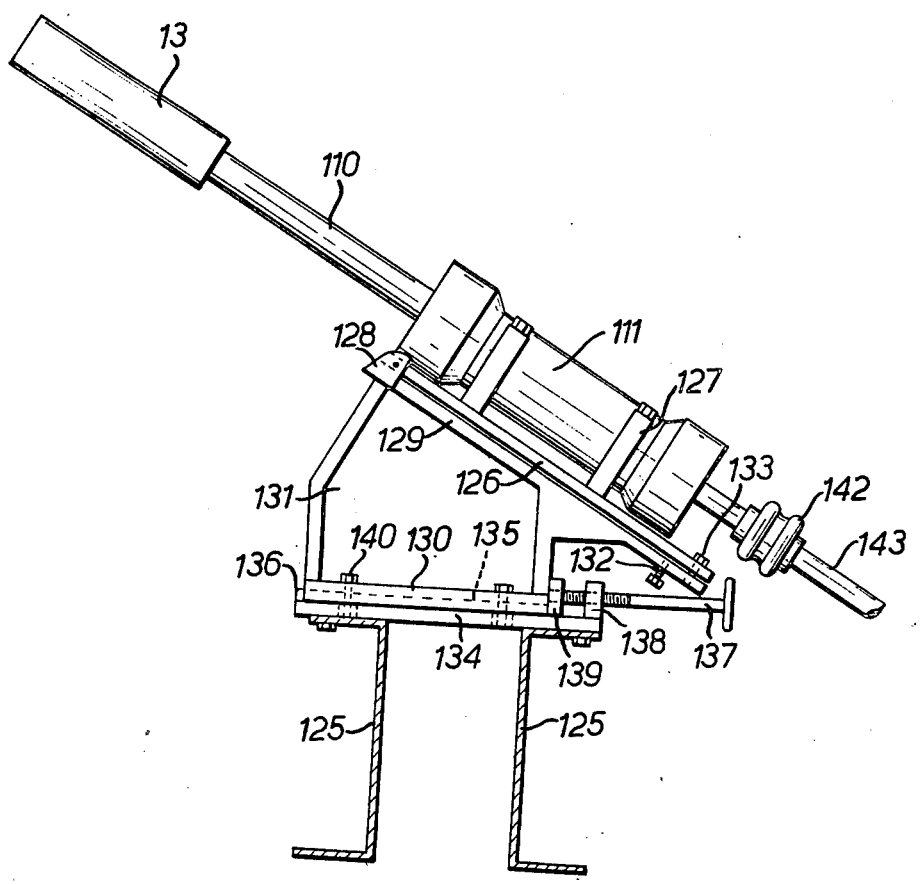
FIG. 8 is a detailed illustration of an adjustable mounting for the bottom stub rollers in the furnace.

One of the bottom stub rollers 13 in the furnace is shown in more detail in FIG. 8. Each of the rollers 13 has a longer ferrule than the rollers 13 at the loading station. Their shafts 110 are similarly mounted in cylindrical bearings 111 which are mounted beneath the furnace. Means are provided for adjusting the extent of the projection of each of the stub rollers 13 through the upright rollers 8 in the furnace so as to align the stub rollers 13 to form the track for the carriage 12.

In order to effect this adjustment the cylindrical bearing assembly 111 of each of the rollers 13 in the furnace is mounted on an adjustable base unit, and the base units are mounted on two parallel griders 125 which run along the length of the apparatus beneath the furnace and are fixed beneath the cross girders 6.

The bearing assembly 111 is fixed to a plate 126 by bolts which pass through sleeve 127 integral with the body of the bearing assembly, the plate 126 being pivoted at its upper end between lugs 128 provided on one end of an inclined top plate 129 which is joined to a flat base plate 130 by webs 131. A set screw 132 is threaded through a hole formed in the lower end of the inclined to plate 129 to bear against the underface of the plate 126 on which the bearing assembly 111 is fixed. Adjustment of the screw 132 adjusts the angle of inclination of the bottom roller 13 in the furnace. Locking bolts 133 are fitted through the plate 126 and are screwed into the inclined top plate 129 to clamp the plate 126 at the set inclination when the roller 13 is correctly angled.

The base plate 130 is seated on a bed plate 134 which is bolted to the top of the girders 125. A longitudinal groove 135 in the underface of the base plate 130 mates with a spline 136 on the upper face of the bed plate 134. An adjusting screw 137 is threaded through a mounting block 138 which is bolted to the rear end of the bed plate 134. The inner end of the adjusting screw 137 couples with a plate 139 which is bolted to the back face of the base unit. Locking bolts 140 pass downwardly through slots 141 cut in the base plate 130, and are threaded into apertures in the bed plate 134.

In order to adjust the extent of projection of the roller 13 between the roller 8, the bolts 140 are loosened and the position of the base unit supporting the bearing assembly 111 is adjusted on the bed plate 134, by rotation of the screw 137. When the rollers is correctly positioned the base unit is clamped to the bed plate by tightening the locking bolts 140.

Each of the stub rollers 13 in the furnace can thus be correctly aligned by adjustment of both the angle of inclination of each roller and the extent of the projection of each roller. Each of the shafts 11 of the rollers 13, extends rearwardly beyond the bearing assembly 111 and is connected by a flexible coupling 142 to an intermediate drive shaft 143, the other end of which is connected by a further flexible coupling 144, FIG. 7, to an output drive shaft 145 from the lower gear box 119. The gear box 119 has three further output shafts 145 for individually driving the next three stub rollers 13 in the furnace.

At the far end of the gear box 119 there is an output shaft, not shown, connected by a flexible coupling to the input shaft of a further gear box 119 which provides the drive for the next groups of three stub rollers 13 in the furnace. The flexible couplings to all the rollers permit the adjustment, just described, of the angle of inclination and the extent of projection of each of the rollers 13 into the furnace.

GLASS SUPPORT CARRIAGE

The carriage 12 which constitutes the movable support for a sheet of glass 9 is illustrated in more detail in FIGS. 9 and 10. The carriage is made of sheet steel bent to an angle so as to provide two faces which match the acute angle between the upright rollers 8 and the stub rollers 13. The upright face 148 of the carriage is the longer face and carries two support plates 149, the upper edge of each of which is widened to provide a support shoulder 150 whose upper surface 151 is provided with a non-slip refractory coating. The rear edge of the upper surface 151 of each shoulder 150 is formed with an upstanding land 152 of width which predetermines the minimum offset distance of the lower edge 153 of the glass sheet 9 from the supporting surface of the upright rollers 8 when the carriage is in position for conveying the sheet through the furnace with the face 148 of the carriage bearing against the supporting surfaces of the rollers 8 and with the lower shorter face 154 of the carriage supported on the bottom stub rollers 13. FIG. 10 illustrates how the upper edge 155 of the glass sheet rests against the rollers 8 when the glass is loaded at the loading station and FIG. 9 shows how the support shoulders are adapted to the particular shape of the sheet of glass to be bent. The shape of the glass sheet matches the styling of the vehicle in which the sheet is to be embodied.

By reason of common drive to the rollers 8 and 13 from the single hydraulic motor 103, and by choice of suitable gearing with similar frictional engagement of the faces 148 and 154 of the carriage with the upright rollers and the stub rollers 13 respectively, the movable carriage is always advancing with the same linear speed as the surface linear speed of the upright rollers 8 against which the sheet of glass rests and which provide transient support for the upper edge of the glass sheet.

The carriage also carries a stop member 156 at its front end for abutment against the retractable carriage stop 47 at the loading station as shown in FIG. 2A and for eventual abutment against a second carriage stop in the tilting box 17 when the glass sheet is correctly located between the bending dies. Also mounted on the carriage is striker 157 near the front end of the carriage for engaging a limit switch S1 mounted just outside the furnace at the loading station. A further striker 158 is mounted on the carriage at about a midway location to engage an actuating member in the furnace for a limit switch S2 which forms a part of a control system for regulation of the speed of travel of the carriage through the furnace when the whole of the glass sheet is within the furnace.

FURNACE HEATERS

FIG. 11 illustrates the way in which the electric heaters indicated at 44 in FIG. 4 are mounted on the furnace side wall 42 facing the back of the upright rollers 8. Each of the heaters is an electric resistance wire heater 159 the wire being wound on a ceramic rod which is carried by two connection rods 160 which extend through the side wall 42 of the furnace. Current is supplied through these connection rods 160. The heaters 159 are arranged in a chevron pattern and the heaters are connected together in series in groups which groups are delimited by the chain lines in FIG. 11. For example the upper group of heaters first encountered by the glass which is advanced into the furnace in the direction of the arrow 161, is indicated at 162 and comprises ten heaters 159 which are connected together in series as illustrated in FIG. 12. One end 163 of the series connection of the heaters is connected to one line 164 of a power supply. The other supply line 165 of the power supply is connected to a thryistor control circuit 166 of conventional design which controls the flow of current through the series connected group of heaters 159 in response to firing pulses supplied to the trigger electrodes of the thyristors on lines indicated by the firing pulse line 167 which is connected to a firing pulse generating circuit 168 which is also supplied with power from the lines 164 and 165.

A control thermocouple 169 is mounted in the furnace within the limits of the group of heaters 162. This thermocouple is connected into a temperature control circuit 170 of conventional design and controls a simple on/off switch indicated by the two way switch 171 to switch into the blocking oscillator of the firing pulse generator circuit 168, control by one or other of two potentiometers 172 and 173.

The setting of the potentiometers 172 and 173 are such as to give, in known manner, respectively high and low levels of power dissipation in the group of heaters 162 so that in response to the temperature in that part of the furnace within the limits of the group of heaters 162 as sensed by the thermocouple 169, the level of power dissipation can be switched between the high and low levels in order to maintain the sensed temperature at a desired value set by a set point adjustment provided in known manner by adjustment of a potentiometer in the control circuit 170.

Eight series connected heaters are arranged in chevron fashion in a second group 174 at the inlet end of the furnace lying below the group 162. Thereafter the heaters are arranged in two sets of three groups, each group consisting of nine heaters connected together in the series and each having an associated control thermocouple 169 and being supplied through a thyristor control circuit under the control of the appropriate thermocouple 169 and temperature control circuit as illustrated in FIG. 12.

Operation of each group of heaters can be set individually by the set point adjustment in the associated temperature control circuit. For example for heating a sheet of glass 2 mm thick to a bending temperature of 590°C, which is attained substantially uniformly throughout the whole of the glass sheet, the set points of the temperature control circuits may be such that the temperature as the thermocouple 169 within the group of heaters 162 is 700°C, and the temperature at the thermocouple 169 within the group 174 is 750°C. Of the subsequent groups of heaters the temperatures at the thermocouples 169 are 700°C for the upper groups, 725°C for the middle groups, and 750°C for the lower groups.

FIG. 13 illustrates the electrical heaters 45 which are mounted on the side wall 43 of the furnace facing the glass sheet leaning against the rollers 8. In this drawing the direction of glass movement 161 is shown from the left hand end of the Figure. The heaters 159 are wire-wound heaters on ceramic tubes of the same kind as illustrated in FIG. 11 and are mounted on connection rods 160 which extend through the side wall 43 of the furnace. The heaters are divided up into groups which are indicated by chain lines and are similar to the groups of heaters in FIG. 11 with the addition of a further group of heaters 177 each with a control thermocouple 178. This additional group of heaters comprises a row of six heaters extending along the bottom of the longer side wall 43 of the furnace just above the cullet clearance exit passages. Each group of heaters is controlled by a thyristor control circuit of the kind illustrated in FIG. 12 with a simple on/off switching arrangement. The temperature at the thermocouple 178 in the upper group of the two groups at the entrance end of the furnace is maintained at 700°C and the lower group at 750°C when heating a 2 mm glass sheet to 590°C for bending as described above. The bottom temperature at the control thermocouple 178 in the bottom row of heaters 177 is at 750°C, and in the upper, middle and lower groups of heaters the further arrangement of groups of heaters as illustrated the temperatures at the control thermocouples 178 are respectively controlled at 700°C and 750°C.

FURNACE CONTROL SPEED

FIGS. 1 and 2A show the position of a switch S1 mounted just outside the furnace at the loading station for engagement by the striker 157 as the front end of the carriage 12 carrying the glass sheet 9 is entering the furnace through the entrance 40, 41. An actuating member 238 for a second limit switch S2 is mounted just inside the furnace for engagement by the striker 158 half way along the carriage when the trailing edge of the glass sheet 9 is just entering the furnace.

Figure 14:
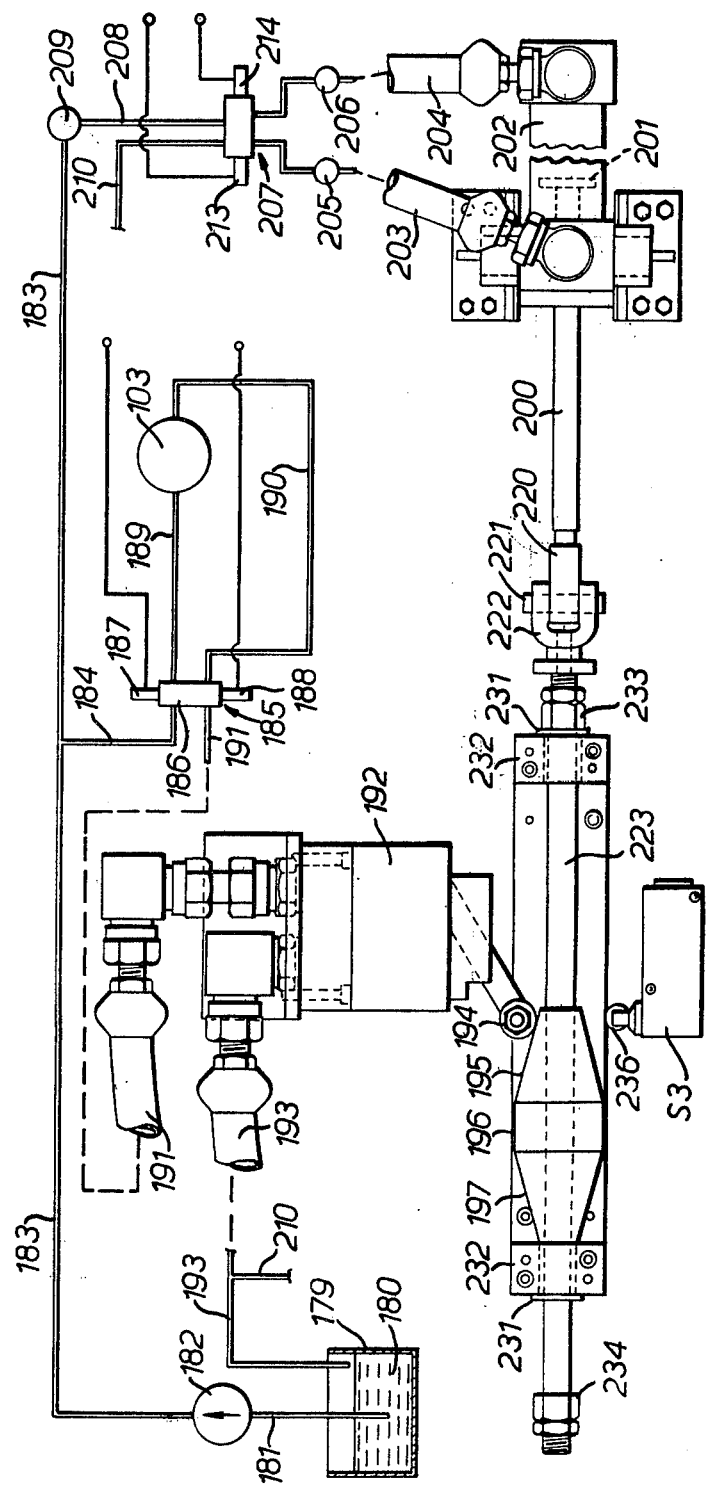
FIG. 14 is a diagram of an hydraulic circuit illustrating the control of the supply of hydraulic fluid to an hydraulic motor which provides the main drive for the rollers.

FIG. 14 illustrates the connection and control of supplies of hydraulic fluid to the hydrualic motor 103. A sump 179 containing hydraulic fluid 180 has a supply pipe 181 connected to the inlet to a pump 182 which is driven by an electric motor, not shown. The outlet from the pump 182 is connected to a main supply line 183.

A branch line 184 from the main supply line 183 is connected to one inlet of a solenoid-operated four-way directional control spool valve 185 comprising a main valve body 186 and having two operating solenoids 187 and 188. The valve 185 is of the "locked centre" type, that is, when both operating solenoids 187 and 188 are de-energised the valve spool is locked in a central position preventing liquid flow. One outlet line 189 from the valve 185 is connected to the hydraulic motor 103 and an exhaust line 190 from the motor is connected back to an exhaust inlet of the valve 185. This exhaust inlet is selectively connected through the valve 185 to a line 191 which is connected through a tappet-operated flow control valve 192 to a return line 193 which feeds into the sump 179. Solenoid 188 of the valve 185 is normally permanently energised so that liquid under pressure is normally continuously supplied to the motor 103, on line 189. The degree of opening of the flow-control valve 192 regulates the rate at which liquid is permitted to exhaust from the motor 103 and thereby regulates the motor speed.

The control valve 192 is operated by a cam follower roller 194 which bears on a sliding cam having three effective surface portons 195, 196 and 197. The central surface portion 196 stands proud of the other surface portions 195 and 197 which fall away to either side of the central portion 196. The cam is mounted on one end of a piston rod 200 which is connected to a piston 201 which is slidable in a cylinder 202.

Ports at the ends of the cylinder 202 are connected by lines 203 and 204 respectively through one-way restrictor valves 205 and 206 to outlet ports of a further four-way directional control valve 207 which is also of the "locked centre" type and is supplied with hydraulic fluid under pressure on a line 208 which is connected to the main supply line 183 through a pressure reducing valve 209. Another port of the valve 207 is connected by an exhaust line 210 to the fluid return line 193.

A knuckle 220 on the free end of the piston rod 200 is connected by a pivot pin 221 into a fork 222 which is coupled to one end of a rod 223 which carries the cam. The rod 223 is slidably mounted in bearings 231 carried in housings 232 which are fixed to a base plate which also carries the cylinder 202. Adustable stop members 233 and 234 on the cam-carrying rod 223 abut against the bearing housings to define the limits of movement of the cam by the piston 201.

A switch S3 which is also mounted on the base plate has a switch-operating roller 236 which is engaged by the cam surface 196 and is opposite the cam follower roller 194.

With the cam in its initial fully-extended position shown in FIG. 14, determined by the stop 233 abutting against the right-hand bearing 231, the cam follower roller 194 bears on the portion 195 of the cam surface, the flow of hydraulic fluid to the motor regulates the speed of the motor 103 to a value which drives the upright rollers 8 and the stub rollers 13 at a speed to advance the carriage and the glass at a low forward creep speed of 0.025 m/sec. When the piston 201 is partially retracted into a cylinder 202 and the roller 194 bears on the highest portion 196 of the cam surface the control valve 192 regulates the flow of hydraulic fluid from the motor 103 to produce a high effective speed of the rollers 8 and 13 to advance the carriage and the glass at a speed of 0.4 m/sec.

At the other extreme of the traverse of the rod 223 by full retraction of the piston 201 until the stop 234 abuts against the left-hand bearing 231, the roller 194 bears on the portion 197 of the cam surface. This gives a forward speed of the rollers 8 and 13 which advances the carriage and the glass at a speed of 0.06 m/sec. which is the speed at which the glass is advanced through the furnace as it is heated.

Operation of the apparatus begins with valve 207 locked in its central position, with hydraulic fluid under pressure on line 204 to the cylinder 202, so that the piston rod 200 is fully extended and the cam is positioned with the cam roller 194 on cam surface 195. In this position of the cam the valve 192 is only slightly open so that the motor runs at its slowest set speed and the rollers 8 and 13 are driven at a speed to advance the carriage and the gglass at a forward creep speed of 0.025 m/sec. for example.

A carriage 12 carrying a sheet 9 is held at the loading station in slipping engagement with the rollers 8 and 13 by the retractable stop 47, FIG. 2A. Retraction of the stop permits the carriage 12 and a supported glass sheet 9 to move forward on the rollers at the forward creep speed of 0.025 m/sec. until the striker 157 on the carriage engages the limit switch S1 which is located just outside the entrance 40, 41 to the furnace, the leading edge of the sheet 9 then being just within the furnace entrance.

Figure 15:
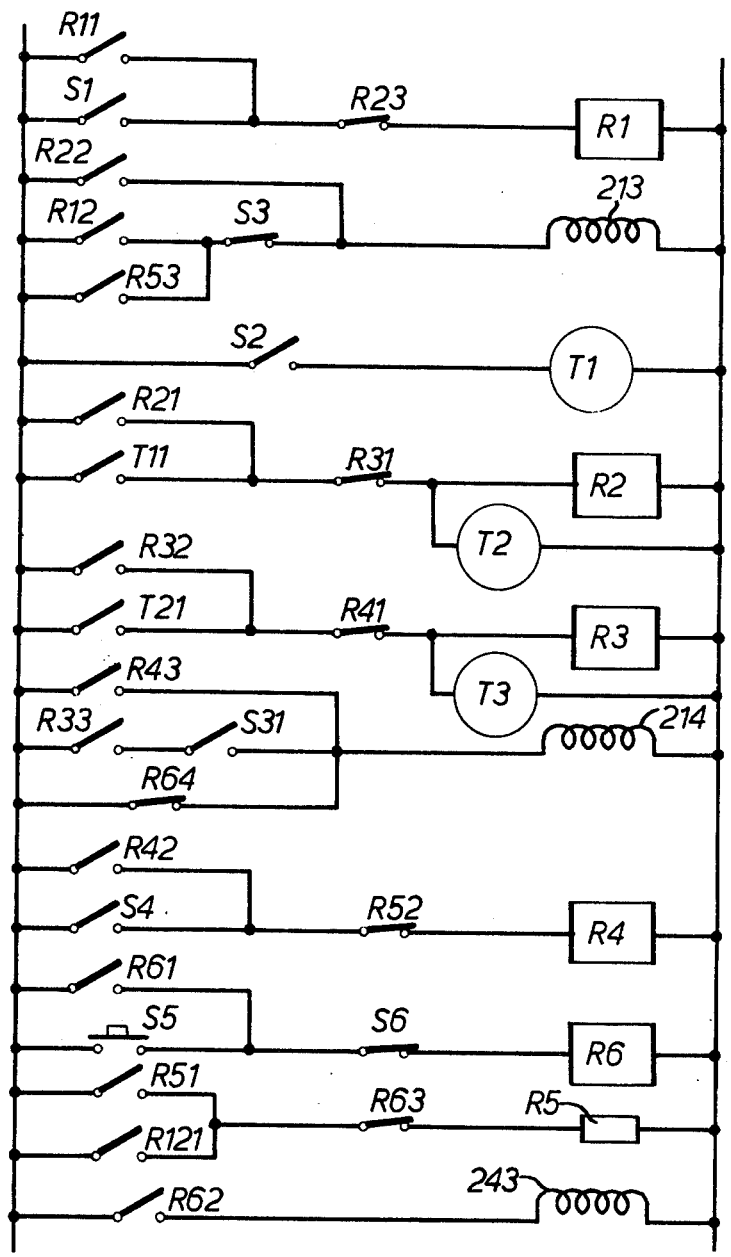
FIG. 15 is an electrical switching circuit which controls the hydraulic circuit of FIG. 14.

The limit switches S1 and S2 are connected in an electrical switching circuit which is illustrated diagrammatically in FIG. 15.

The limit switch S1, which is normally open is connected in series with normally closed contacts R23 of a relay R2 to the solenoid of a relay R1. Holding contacts R11 on the relay R1 are connected in parallel with the switch S1. When striker 157 on the carriage engages the switch S1, relay R1 is energised to close normally open contacts R12 which are connected in series with the normally closed cam limit switch S3 and with the solenoid 213 of valve 207.

The energisation of the solenoid 213 causes pressure fluid to be fed on line 203 to the cylinder 202 to retract the piston 201 into the cylinder so that the cam moves from its initial position in which the roller 194 is on the cam surface portion 195 to the position in which the roller 194 is on the highest part 196 of the cam. This operates valve 192 to increase the supply of fluid to the motor 103 so that the roller speed is accelerated to impart the entry speed of 0.4 m/sec. to the carriage and the glass.

In its central position the high part 196 of the cam opens switch S3 which de-energises solenoid 213 so that piston 201 is held in its central position in the cylinder 202.

An actuating member 238 for the limit switch S2 is mounted just inside the furnace. The switch S2 is normally open and when the actuating member 238 is engaged by the striker 158 half-way along the carriage, the trailing edge of the glass sheet 9 is just entering the furnace. This limit switch S2 is connected in series with a timer T1 which is set to a delay of up to 5 seconds to ensure that the trailing edge of the sheet is inside the furnace before the rollers are decelerated to the speed at which the carriage and glass are advanced through the furnace.

At a set period after the switch S2 is closed, contacts T11 of the timer T1 close. These contacts are in series with normally closed contacts R31 of a relay R3 and with the solenoid of the relay $2 which has holding contacts R21 in parallel with the timer contacts T11, and contacts R22 which are normally open, and are in parallel with the series-connected cam limit switch S3 and relay contacts R12.

When the timer T1 operates to close the switch T11 the relay R2 is energised and the contacts R22 close to re-energise the solenoid 213 of the valve 207. Pressure fluid is again supplied to the cylinder 202 on line 203 and retraction of the piston 201 continues to bring the roller 194 onto the cam part 197. The opening of the valve 192 then determines rotation of the rollers at a speed giving a forward speed of the carriage and the glass in the furnace of 0.06 m/sec. As the roller 194 moves down the surface 197 the rollers 8 and 13 decelerate, and decelerate the carriage and the glass from the fast entry speed of 0.4 m/sec. to the furnace speed of 0.06 m/sec. which is reached by the time the trailing edge of the sheet is inside the furnace.

When the relay R2 is energised its normally closed contacts R23 which are in series with relay solenoid R1 open to cut out relay R1. As the cam moves to the right the switch S3 recloses but the solenoid 213 remains energised through the closed contacts R22.

A second timer T2, which can be set to a time delay of up to 5 minutes, is connected in parallel with the relay R2, and operation of this timer T2 is initiated when timer contacts T11 close and relay R2 is energised. The timer T2 is held operating by the closing of the holding relay contacts R21 and this timer is set to a time delay and closes contacts T21 when the glass has been traversing through the furnace at the furnace speed for the selected time for heating the glass to a required temperature in dependence on the thickness of the glass, the height of the glass sheet and the angle of the supported sheet.

After the set time delay the timer T2 operates to close contacts T21 which are in series with normally closed contacts R41 of a relay R4 and with the solenoid of relay R3. A third timer T3 is connected in parallel with the relay R3 and operates as will be described for initiating movement of the male die.

Holding contacts R32 on relay R3 are in parallel with the timer contacts T21 and when relay R3 operates the normally closed contacts R31 in series with relay R2 open to cancel relay R2 which opens contacts R22, thereby de-energising solenoid 213 at the same time as contacts R33 of relay R3 close and energises through closed contacts S31 of the limit switch S3, the other solenoid 214 of the valve 207.

The valve 207 switches pressure fluid onto line 204 to the bottom end of the cylinder 202 and the extension of the piston rod 200 out of the cylinder begins. The cam roller 194 runs up the cam surface 197 onto the high part 196 and the motor accelerates to give the maximum carriage exit speed of 0.4 m/sec. to convey the glass at the required pre-quenching temperature from the furnace into the tilting box 17 when the glass is at the required temperature.

The striker 157 on the carriage which is accelerated into the tilting box engages a switch actuating member 240 mounted below the female die, FIG. 16, which actuates a limit switch S4 and closes that switch to energise the solenoid of a relay R4. The switch actuating member 240 comprises a short lever arm carrying a roller which is engaged by the striker 157 on the carriage and is fixed to a rotatable shaft which projects at an angle through the floor of the tilting box and operates the switch S4 whichh is located beneath the tilting box.

When relay R4 is energised holding contacts R42 in parallel with switch S4 close; contacts R41 open to deenergise relay R3; and contacts R43, which are in parallel with the contacts S31 and R33, close to energise solenoid 214 of valve 207, by-passing the open contacts R33 and S31.

The extension of the piston 201 out of the cylinder 202 continues and the roller 194 runs down the surface 195 so that the motor 103 is decelerated to impart to the carriage and the glass the creep speed of 0.025 m/sec. and is held at this speed with the stop member 233 abutting against the right-hand bearing 231, as the hot glass sheet is carried at that speed between the bending dies.

The decelerating carriage engages a further switch operating member 241 which operates a switch S3 which initiates movement of the female die. Movement of the carriage at creep speed continues until the front stop 156 on the carriage engages a retractable carriage stop 242 which is raised to arrest movement of the carriage when the glass sheet is exactly located between the bending dies.

Figure 2B:
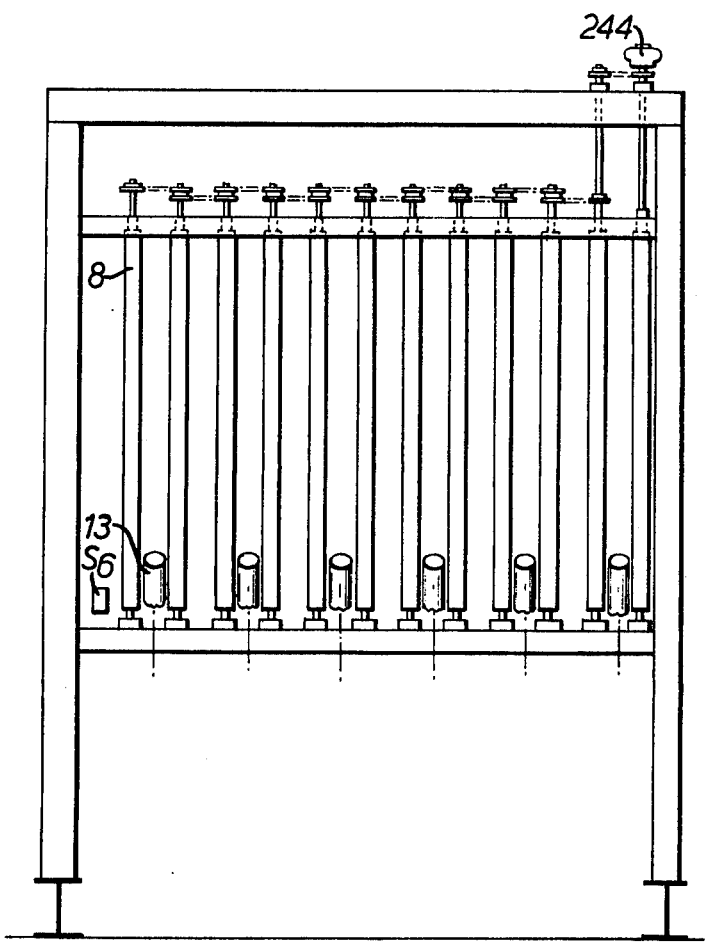

A reset press button switch S5 is connected in series with a normally closed limit switch S6, FIGS. 1 and 2B, which is located right at the far end of the exit conveyor 8 for engagement by the striker 156 on the carriage 12 when the carriage is nearing the end of the conveyor. With the switch S5 closed, when the switch S6 closes, the solenoid of a relay R6 is energised closing holding contacts R61 in parallel with the reset switch S5, and contacts R62 in series with the coil 243 of an exit roller clutch 244. This clutch coil 243 is energised throughout operation once the reset switch S5 has been closed so that the exit conveyor rollers are running at the same speed as the rollers in the tilting box 17 until the carriage engages the switch S6 whereupon the exit rollers are declutched and come to rest.

FIG. 10 illustrates how the upper edge 155 of the glass sheet rests against the near-vertical support rollers 8 when the cold sheet 9 is loaded onto the support carriage 12 at the loading station and during the initial part of the heating of the glass. As the glass is heated during its travel through the furnace and the glass approaches the temperature in the range 580°C to 660°C to which it is to be heated, the glass becomes sufficiently softened to relax against the support rollers 8, and could become unacceptably deformed if it were maintained at that temperature for too long.

Initially the upper part of the sheet relaxes against the rollers 8 and the length of effective supporting surface of the rollers 8 which extends downwardly below the top edge of the glass sheet must always be sufficient to accommodate permissible relaxation.

The timer T2 is set so that the glass has reached its desired temperature which is substantially uniform over the whole sheet and through its thickness by the time the hot sheet is accelerated out of the furnace into the tilting box, before the amount of deformation of the sheet by initial relaxation of the upper part of the sheet against the rollers 8, followed, if acceptable, by outward bulging of the lower part of the sheet as described above, exceeds the limits of acceptable deformation of the sheet.

The furnace heater temperature settings of 700°C, 725°C and 750°C achieve a mean furnace temperature of about 730°C. The time of transit of the glass sheet through the furnace at that temperature is regulated in order to ensure that the glass sheet is heated to a required final temperature in the set time of transit. During the transit time the glass sheet may deform and at the end of the heating period will have reached an actual deformation index value as described above. The glass sheet is acceptable if the actual deformation index is less than the critical deformation index based on acceptable deformation of the glass sheet by the time the sheet is being discharged from the furnace at the higher discharge speed of 0.4 m/sec.

The heating time is set either by setting the transit speed of the glass through the furnace or by setting the time of transit of the glass through the furnace at a fixed speed prior to acceleration of the glass when it has reached a predetermined temperature and discharge through the furnace exit.

The transit speed can be set by adjusting the position of the stop member 234 on the cam rod 223 in order to vary the limit of retraction of the piston 201 into the cylinder 202 and thereby determine the position of the roller 194 on the cam surface and the extent of opening of the valve 192 which controls the speed of the hydraulic motor 103. A range of transit speeds of the glass sheet through the furnace of from 0.025 m/sec. to 0.06 m/sec. is readily achieved in this way.

Other settings of furnace temperature may be employed as set out in Table I.

TABLE I

| Heater Sections Temperature (°C) | | | Mean Furnace Temperature (°C) |
|---|---|---|---|
| 680 | 705 | 730 | 710 |
| 700 | 725 | 750 | 730 |
| 720 | 745 | 770 | 750 |
| 780 | 805 | 830 | 810 |

At any particular mean furnace temperature the time taken for a sheet to reach a required final temperature is dependent on its thickness. The following Tables II to VII give examples of operation for a range of glass thicknesses from 2.2 mm to 15 mm and of heating times required to achieve a final glass temperature in the range 580°C to 700°C.

Parameters common to each of the examples in Tables II to VI are as follows:

| | |
|---|---|
| Angle of rollers 8 | = 5° to vertical |
| Offset of bottom edge of sheet from rollers 8 | = 2 mm |
| Height of glass sheet | = 0.76 m |
| Density of glass (soda/lime/silica) | = 2.5 g/cm³ |
| Maximum permissible bulge in sheet | = 0.5 mm |

TABLE II

Final Glass Temperature = 580°C.

| Glass Thickness | Critical Deformation Index | Mean Furnace Temperature (°C) | Heating Time (Sec.) | Deformation Index |
|---|---|---|---|---|
| 2.2 mm | $3.8 \times 10^{-9}$ | 710 | 67 | $3.6 \times 10^{-12}$ |
|  |  | 750 | 56 | $2.7 \times 10^{-10}$ |
|  |  | 810 | 45 | $1.9 \times 10^{-12}$ |
| 3 mm | $7.2 \times 10^{-9}$ | 710 | 88 | $4.7 \times 10^{-12}$ |
|  |  | 750 | 73 | $3.5 \times 10^{-12}$ |
|  |  | 810 | 57 | $2.5 \times 10^{-12}$ |
| 4 mm | $12.7 \times 10^{-9}$ | 710 | 115 | $6.2 \times 10^{-12}$ |
|  |  | 750 | 95 | $4.6 \times 10^{-12}$ |
|  |  | 810 | 75 | $3.2 \times 10^{-12}$ |
| 5 mm | $19.8 \times 10^{-9}$ | 710 | 141 | $7.6 \times 10^{-12}$ |
|  |  | 750 | 117 | $5.7 \times 10^{-12}$ |
|  |  | 810 | 93 | $4.0 \times 10^{-12}$ |

TABLE III

Final Glass Temperature = 610°C.

| Glass Thickness | Critical Deformation Index | Mean Furnace Temperature (°C) | Heating Time (Sec.) | Deformation Index |
|---|---|---|---|---|
| 2.2 mm | $3.8 \times 10^{-9}$ | 710 | 79 | $9.6 \times 10^{-11}$ |
|  |  | 750 | 65 | $6.8 \times 10^{-11}$ |
|  |  | 810 | 51 | $4.5 \times 10^{-11}$ |
| 3 mm | $7.2 \times 10^{-9}$ | 710 | 104 | $1.3 \times 10^{-10}$ |
|  |  | 750 | 85 | $8.8 \times 10^{-11}$ |
|  |  | 810 | 65 | $5.9 \times 10^{-11}$ |
| 4 mm | $12.7 \times 10^{-9}$ | 710 | 136 | $1.6 \times 10^{-10}$ |
|  |  | 750 | 110 | $1.1 \times 10^{-10}$ |
|  |  | 810 | 85 | $7.6 \times 10^{-11}$ |
| 5 mm | $19.8 \times 10^{-9}$ | 710 | 167 | $2.0 \times 10^{-10}$ |
|  |  | 750 | 135 | $1.4 \times 10^{-10}$ |
|  |  | 810 | 105 | $9.4 \times 10^{-11}$ |

TABLE IV

Final Glass Temperature = 650°C.

| Glass Thickness | Critical Deformation Index | Mean Furnace Temperature (°C) | Heating Time (Sec.) | Deformation Index |
|---|---|---|---|---|
| 2.2 mm | $3.8 \times 10^{-9}$ | 710 | 102 | $3.2 \times 10^{-9}$ |
|  |  | 750 | 80 | $1.9 \times 10^{-9}$ |
|  |  | 810 | 60 | $1.2 \times 10^{-9}$ |
| 3 mm | $7.2 \times 10^{-9}$ | 710 | 134 | $4.1 \times 10^{-9}$ |
|  |  | 750 | 104 | $2.5 \times 10^{-9}$ |
|  |  | 810 | 77 | $1.5 \times 10^{-9}$ |
| 4 mm | $12.7 \times 10^{-9}$ | 710 | 175 | $5.3 \times 10^{-9}$ |
|  |  | 750 | 135 | $3.3 \times 10^{-9}$ |
|  |  | 810 | 100 | $2 \times 10^{-9}$ |
| 5 mm | $19.8 \times 10^{-9}$ | 710 | 216 | $6.5 \times 10^{-9}$ |
|  |  | 750 | 166 | $4 \times 10^{-9}$ |
|  |  | 810 | 124 | $2.4 \times 10^{-9}$ |
| 6 mm | $28.8 \times 10^{-9}$ | 710 | 258 | $7.9 \times 10^{-9}$ |
|  |  | 750 | 198 | $4.8 \times 10^{-9}$ |
|  |  | 810 | 147 | $2.9 \times 10^{-9}$ |
| 8 mm | $50.8 \times 10^{-9}$ | 710 | 344 | $10.6 \times 10^{-9}$ |
|  |  | 750 | 262 | $6.4 \times 10^{-9}$ |
|  |  | 810 | 194 | $3.9 \times 10^{-9}$ |

TABLE V

Final Glass Temperature = 665°C.

| Glass Thickness | Critical Deformation Index | Mean Furnace Temperature (°C) | Heating Time (Sec.) | Deformation Index |
|---|---|---|---|---|
| 3.0 | $7.2 \times 10^{-9}$ | 710 | 163 | $14.4 \times 10^{-9}$ |
|  |  | 750 | 121 | $8.7 \times 10^{-9}$ |
|  |  | 810 | 89 | $4.5 \times 10^{-9}$ |
| 4.0 mm | $12.7 \times 10^{-9}$ | 710 | 199 | $18.3 \times 10^{-9}$ |
|  |  | 750 | 147 | $10.1 \times 10^{-9}$ |
|  |  | 810 | 107 | $5.79 \times 10^{-9}$ |
| 6.0 mm | $28.8 \times 10^{-9}$ | 710 | 290 | $27.0 \times 10^{-9}$ |
|  |  | 750 | 216 | $14.9 \times 10^{-9}$ |
|  |  | 810 | 158 | $8.48 \times 10^{-9}$ |
| 8.0 mm | $50.8 \times 10^{-9}$ | 710 | 388 | $36.2 \times 10^{-9}$ |
|  |  | 750 | 296 | $19.9 \times 10^{-9}$ |
|  |  | 810 | 207 | $11.4 \times 10^{-9}$ |

Table V—Continued

Final Glass Temperature = 665°C.

| Glass Thickness | Critical Deformation Index | Mean Furnace Temperature (°C) | Heating Time (Sec.) | Deformation Index |
|---|---|---|---|---|
| 10.0 mm | $79.2 \times 10^{-9}$ | 710 | 487 | $45.9 \times 10^{-9}$ |
| | | 750 | 360 | $25.3 \times 10^{-9}$ |
| | | 810 | 260 | $14.4 \times 10^{-9}$ |
| 12 mm | $115.2 \times 10^{-9}$ | 710 | 590 | $56.1 \times 10^{-9}$ |
| | | 750 | 436 | $30.9 \times 10^{-9}$ |
| | | 810 | 314 | $17.7 \times 10^{-9}$ |

TABLE VI

Final Glass Temperature = 680°C.

| Glass Thickness | Critical Deformation Index | Means Furnace Temperature (°C) | Heating Time (Sec.) | Deformation Index |
|---|---|---|---|---|
| 6.0 mm | $28.8 \times 10^{-9}$ | 710 | 337 | $94.5 \times 10^{-9}$ |
| | | 750 | 236 | $44.4 \times 10^{-9}$ |
| | | 810 | 168 | $23.6 \times 10^{-9}$ |
| 8.0 mm | $50.8 \times 10^{-9}$ | 710 | 450 | $127 \times 10^{-9}$ |
| | | 750 | 314 | $59.4 \times 10^{-9}$ |
| | | 810 | 221 | $31.7 \times 10^{-9}$ |
| 10.0 mm | $79.2 \times 10^{-9}$ | 710 | 565 | $160 \times 10^{-9}$ |
| | | 750 | 396 | $75.3 \times 10^{-9}$ |
| | | 810 | 278 | $40.1 \times 10^{-9}$ |
| 12.0 mm | $115.2 \times 10^{-9}$ | 710 | 686 | $197 \times 10^{-9}$ |
| | | 750 | 479 | $91.0 \times 10^{-9}$ |
| | | 810 | 337 | $49.0 \times 10^{-9}$ |
| 15.0 mm | $180 \times 10^{-9}$ | 710 | 880 | $264 \times 10^{-9}$ |
| | | 750 | 635 | $122 \times 10^{-9}$ |
| | | 810 | 435 | $78 \times 10^{-9}$ |

TABLE VII

Final Glass Temperature = 700°C.

| Glass Thickness | Critical Deformation Index | Mean Furnace Temperature (°C) | Heating Time (Sec.) | Deformation Index |
|---|---|---|---|---|
| 6.0 mm | $89.3 \times 10^{-9}$ | 810 | 184 | $85.0 \times 10^{-9}$ |
| 8.0 mm | $157.5 \times 10^{-9}$ | 810 | 243 | $114 \times 10^{-9}$ |
| 10 mm | $245.5 \times 10^{-9}$ | 810 | 306 | $145 \times 10^{-9}$ |
| 12 mm | $357.0 \times 10^{-9}$ | 810 | 371 | $177 \times 10^{-9}$ |
| | | 750 | 710 | $490 \times 10^{-9}$ |
| 15 mm | $544.0 \times 10^{-9}$ | 810 | 497 | $232 \times 10^{-9}$ |

In Table VII only operating conditions for heating glass sheets to 700°C with acceptable relaxation are given. The parameters for each of these examples are:

| | |
|---|---|
| Angle of rollers 8 | = 10° to vertical |
| Offset of bottom edge of sheet from rollers 8 | = 2 mm |
| Height of glass sheet | = 0.61 m |
| Density of glass (soda-lime-silica) | = 2.5 g/cm³ |
| Maximum permissble bulge in sheet | = 0.5 mm. |

In Tables II and III the actual values of deformation index are so much smaller than the critical deformation index, whose value is for a maximum acceptable bulge of 0.5 mm, that the glass sheets will be at the desired final temperature of 580°C or 610°C while still in the initial stages of relaxation of their upper edges against the near-vertical rollers. In setting up the apparatus therefore a more stringent criterion of acceptable deformation with a correspondingly lower value of critical deformation index may be employed.

Some of the results in Table V show that the actual deformation index exceeds the critical deformation index when heating 3 mm thick glass to 665°C with furnace temperatures of 710°C and 750°C and long heating times respectively 163 and 121 seconds, and when heating 4 mm thick glass to 665°C with the furnace temperature at 710°C and a 199 second heating time.

Table VI also demonstrates that slow heating of glass sheets of thickness 6 mm to 15 mm with a low furnace temperature of 710°C leads to unacceptable deformation as the actual deformation index exceeds the critical deformation index. This is also the case when heating 6 mm and 8 mm glass with a furnace temperature of 750°C.

The results set out in Tables II to VI show that for heating a sheet of soda-lime-silica glass whose thickness is in the range 2.2 mm to 15 mm and whose height is at most 0.76 m, and with the support rollers at an angle of 5° to the vertical and the lower edge of the sheet offset about 2 mm from the support, thermal conditions in the furnace and the time of residence of the sheet within the furnace are set to achieve a predetermined temperature of the glass sheet in the range 580°C to 680°C while relaxing the glass sheet by an amount such that the value of deformation index of the hot glass sheet is less than a critical value within the range $3.8 \times 10^{-9}$ to $180 \times 10^{-9}$, which critical value of deformation index is determined by a bulge in the hot glass sheet less than about 0.5 mm.

Further Tables II to V show that for heating a sheet of soda-lime-silica glass whose thickness is in the range of 2.2 mm to 4 mm and whose height is at most 0.76 m, and with the support rollers at an angle of 5° to the vertical and the lower edge of the sheet offset about 2 mm from the support, thermal conditions in the furnace and the time of residence of the sheet within the furnace are set to achieve a predetermined temperature of the glass sheet in the range 580°C to 665°C while relaxing the glass sheet by an amount such that the value of deformation index of the hot glass sheet is less than a critical value within the range $3.8 \times 10^{-9}$ to $12.7 \times 10^{-9}$, which critical value of deformation index is determined by a bulge in the hot glass sheet less than about 0.5 mm.

Additionally Table VII shows that for heating a sheet of soda-lime-silica glass whose thickness is in the range 6 mm to 15 mm and whose height is at most 0.61 m, and with the support rollers inclined at an angle of 10° to the vertical and the lower edge of the sheet offset about 2 mm from the support, thermal conditions in the furnace and the time of residence of the sheet within the furnace are set to achieve a predetermined temperature of about 700°C of the glass sheet while relaxing the glass sheet by an amount such that the value of deformation index of the hot glass sheet is less than a critical value within the range $89.3 \times 10^{-9}$ to $544 \times 10^{-9}$, which critical value of deformation index is determined by a bulge in the hot glass sheet less than about 0.5 mm.

The distance by which the bottom edge of the glass sheet is offset from the support plane of the upright roller surfaces in the furnace is relevant in determining the critical deformation index for a glass sheet. This offset may be up to 4 mm but is usually kept as small as possible bearing in mind the significant effect the amount of offset has on the value of the critical deformation index.

The height of the glass sheet is relevant in relation to this offset being a primary factor in determining the gravitational load on the glass while it is being heated; both the height and glass thickness determine the weight of the glass causing the possible bulge.

These factors are therefore relevant in setting the processing conditions so that the glass sheet is heated to the desired temperature without deformation by an amount exceeding the acceptable maximum deformation.

Based on operating experience and on calculations on the basis of the formula set out above to determine the deformation index of the glass sheet, it has been shown that glass sheets of thickness from 2 mm up to 15 mm and of height from 0.6 m to 1.0 m can be heated to a desired temperature in the range 580°C to 640°C with the inclined support rollers at an angle of from 2° to 10° from the vertical and with the offset distance of the bottom edge of the sheet from the rollers up to 4 mm. Within these ranges all glass sheets were satisfactorily processed with relaxation against the upright rollers less than the maximum acceptable deformation of the sheet and with the actual deformation index of the sheet well below the critical deformation index.

For the heating of glass sheets to final glass temperatures of from 640°C up to 700°C with the mean furnace temperature in the range 710°C to 810°C it has been found that, with other conditions unchanged, there is a lower limit to the glass thickness which can be processed. This is illustrated in Table VIII which summarises results for the processing of glass which is offset at a distance of about 2 mm from the surfaces of the near-vertical support rollers. In this Table the height of the glass sheet is indicated by H and the angle of the near-vertical rollers to the vertical by the angle $\alpha$.

TABLE VIII

| Glass Temperature °C | Furnace Temperature °C | Processable Glass Thickness (mm) | | |
|---|---|---|---|---|
| | | H = 0.6 m $\alpha = 10°$ | H = 0.76 m $\alpha = 5°$ | H = 1 m $\alpha = 2°$ |
| 650 | 810 | 2–15 | 2–15 | 3–15 |
| | 750 | 2–15 | 2–15 | 6–15 |
| | 710 | 2–15 | 2–15 | 8–15 |
| 665 | 810 | 2–15 | 2–15 | 8–15 |
| | 750 | 2–15 | 4–15 | 15 |
| | 710 | 2–15 | 6–15 | — |
| 680 | 810 | 3–15 | 6–15 | — |
| | 750 | 4–15 | 10–15 | — |
| | 710 | 8–15 | — | — |
| 700 | 810 | 12–15 | — | — |
| | 750 | 15 | — | — |
| | 710 | — | — | — |

For the glass sheets of least height, that is 0.6 m, a final glass temperature of up to 665°C can be achieved for all thickness from 2 mm to 15 mm.

When the final glass temperature desired is 680°C it is possible to achieve this in glass thicknesses from 3 mm upwards with the higher furnace temperature of 810°C because at this higher furnace temperature the transit time of the glass through the furnace is less and there is less time for distortion to develop in the glass. This is illustrated further by the fact that when the furnace temperature is only 710°C the distortion which developed in glass thinner than 8 mm was beyond the acceptable limits, with the actual deformation index of the glass approaching and exceeding the critical deformation index.

With the same glass height of 0.6 m a final glass temperature of 700°C could not be achieved at all in glass thinner than 15 mm when the furnace temperature was 710°C because the transit time would be so long to heat the thick glass uniformly through its thickness that there would be time for unacceptable distortion to develop. At the higher furnace temperature of 810°C however glass of thickness 12 mm and above could be successfully heated uniformly to 700°C.

The conditions are more stringent when the glass height is 0.76 m and the angle of the rollers to the vertical is 5°. Table VIII shows how for the lower furnace temperatures and the desired glass temperature of 665°C the lower limit of thickness which can be successfully processed rises to 6 mm. When a final glass temperature of 680°C is desired this can be achieved in glass 6 mm thick and above when the furnace temperature is 810°C, and in glass 10 mm thick and above when the furnace temperature is 750°C. When the furnace temperature is 710°C the glass could not be successfully processed. Glass thinner than 15 mm could not be heated to 700°C without unacceptable deformation developing.

As would be expected the trend of these results is continued when a higher glass 1 metre high is processed with the angle of the rollers nearer to the vertical at 2°. The right hand column of Table VIII shows how it is not possible, given the particular density of the glass, to heat glass of that height and of thickness lower than 15 mm to a temperature of 680°C or 700°C but that other ranges of thickness can be successfully heated to a temperature in the range of 650°C to 665°C depending on the furnace temperature; the higher the furnace temperature the wider being the range of glass thicknesses which can be processed.

All these results are concerned with the heating of glass of thickness up to 15 mm thick. Thicker glasses could be processed but the ususal commercial thicknesses of glass sheet are comprehended within the range of 2 mm to 15 mm.

FURNACE EXIT SEAL

A flexible seal indicated at 246 in FIG. 16 is provided between the exit end 247 of the furnace and the inlet end wall 248 of the tilting box 17. The form of the seal is shown in detail in FIG. 17 and comprises a flange member 249 fixed to the furnace wall 247 and a similar flange member 250 fixed to the tilting box end wall 248 and extending outwardly and overlapping the flange member 249. When the rocking frame is horizontal the flanges are parallel and a sealing member 251 is trapped between the flanges. This sealing member 251 comprises a knitted stainless steel mesh stocking filled with bulked thermally insulated ceramic fibre.

A blanket 252 woven from ceramic fibre including an inter-woven stainless steel mesh is secured between the flange members 250 and 249, and the walls to which they are fixed. The blanket has sufficient flexibility to accommodate the tilting movement of the wall 248 relative to the wall 247 and preserves the seal when the tilting box is in its tilted position.

TILTING BOX

Figure 18A:
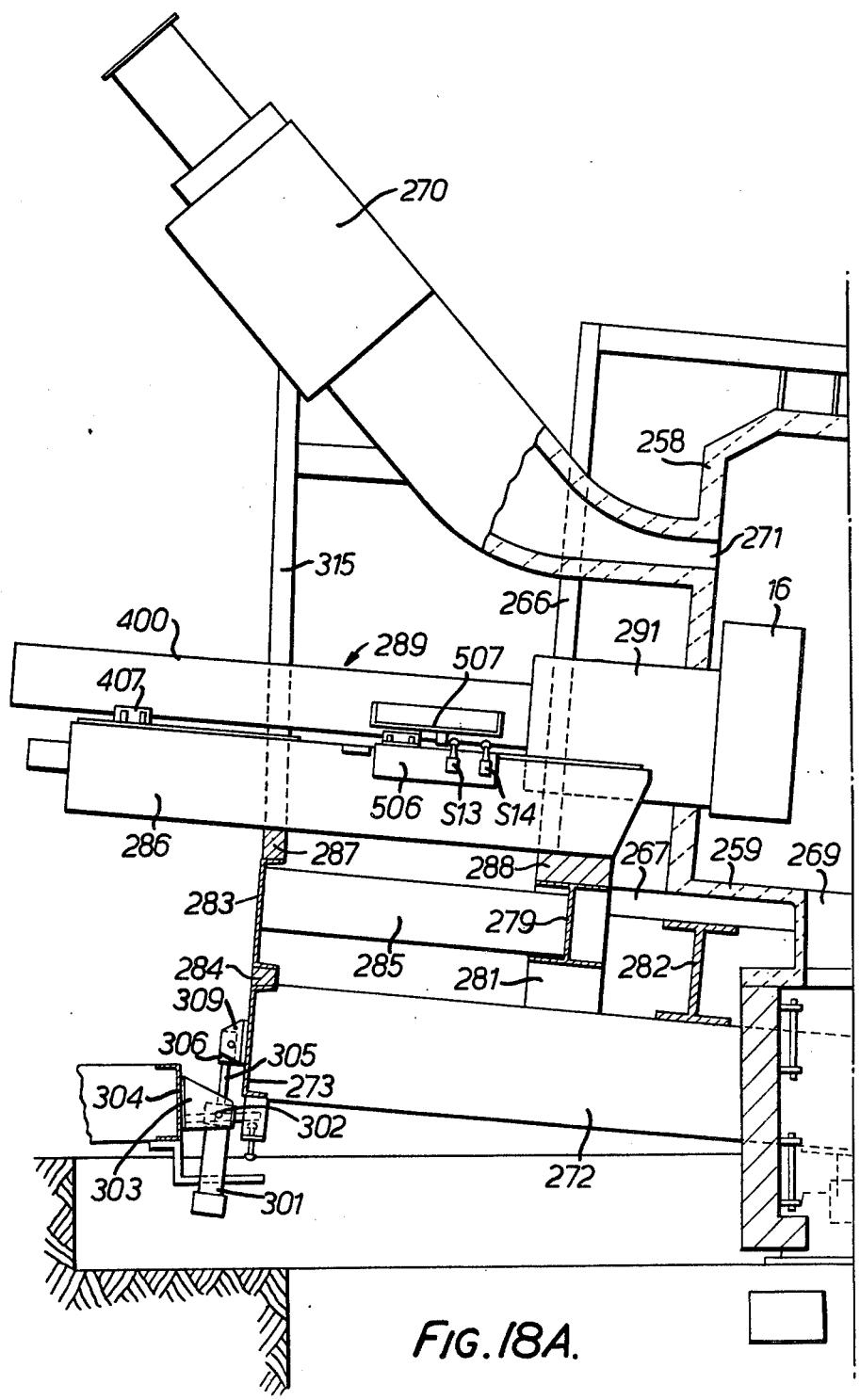
Figure 18B:
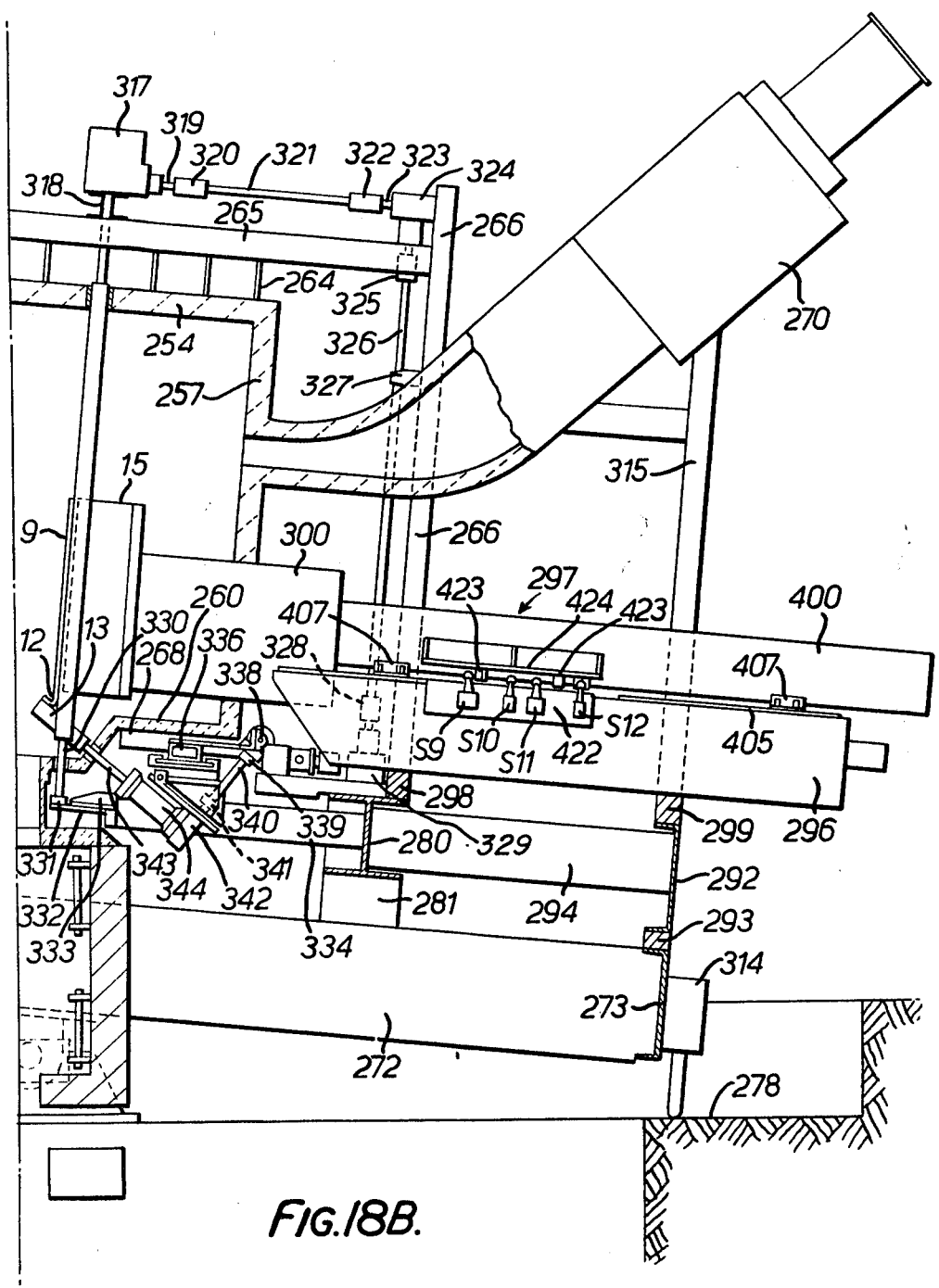

The tilting box 17 which is illustrated in FIGS. 16, 18A and 18B, defines a chamber in which the bending dies are enclosed, and comprises the inlet end wall 248, and exit end wall 253, a roof 254 formed with a step 255 leading down to the top of the inlet end wall 248 and a step 256 leading down to the top of the outlet end wall 253. The depth of each of the steps is adjustable to accommodate adjustments of the hoist mechanism for different heights of glass sheets as will be described with reference to FIGS. 37 and 38.

The tilting box further comprises a rear wall 257 and a front wall 258 and floor parts 259 extending rearwardly from the bottom of the front wall 258, and 260 extending forwardly from the bottom of the rear wall 257.

There is a vertical elongated entrance to the chamber formed in the inlet end wall 248 and an exit 262 formed in the outlet end wall 253 through which exit the carriage 12 is discharged after the glass sheet being bent has been lifted off the carriage and is being bent between the bending dies. The exit 262 leads to the extension 8 of the conveyor shown at the left hand side of FIG. 1.

The roof 254 is suspended by hangers 264 from a support structure including a cross beam 265 extending between vertical pillars 266.

The parts 259 and 260 of the floor are supported on floor support girders 267 and 268, and define between them a mouth 269 in the floor of the furnace through which a bent glass sheet can be lowered. The walls, roof and floor parts of the tilting box are fabricated with an outer steel shell lined with refractory material.

The chamber defined within the tilting box 17 is heated to the temperature of the glass which enters the tilting box from the furnace so that the bending dies which are enclosed within the tilting box are at the temperature of their environment and are therefore at about the same temperature as that of the glass sheet when it enters the tilting box. The temperature within the tilting box is maintained by gas burners indicated at 270 which are connected by ducts to inlet slots 271 formed in the front and rear walls 257 and 258 of the tilting box. There are four gas burners 270 feeding four slots 271, two in each of the front and back walls and each of the burners is controlled by a thermocouple fixed in the male die as near to its bending surface as possible, to ensure the maintenance of a uniform bending temperature, in the range 580°C to 650°C for example 610°C, within the tilting box. The burners 270 are connected by flexible ducts to gas and combustion air supplies, including means controlled by the thermocouple in the male die to vary the air:gas ratio fed to the burners.

The gas burners maintain a positive pressure of hot gases in the tilting box and hot gases flow downwardly through the exit mouth beneath the box and meet uprising gases. A pressure balance usually exists just below the boost heaters 27.

The massive rocking frame, on which the tilting box is mounted, which frame is indicated at 20 in FIG. 1, comprises side girders 272 and end girders 273 welded to the end of the side girders 272. Each of the side girders 272 is seated on and welded to a pivot block 274 which carries trunnions 275 which are mounted in bearing blocks 276 which are seated on a base support plate 277 which provides the upper surface of a ledge 278 which is cut into the side walls of the pit. The rocking frame is balanced on the trunnions 275 as is the whole of the tilting box construction and its associated equipment carried by the rocking frame so that the frame 272, 273 can be readily tilted from horizontal to the tilted position at about 5° to the horizontal which is illustrated in FIG. 18.

Cross girders 279 and 280 extend across and above the rocking frame between the side girders 272 being mounted on the side girders by end brackets 281.

A cross girder 282 is seated directly on the side girders 272 of the rocking frame and the floor support girders 267 are seated on the cross girder 282.

At the left-hand end of the rocking frame as viewed in FIG. 18, a plate 283 is supported by spacer blocks 284 on the end girder 273. The plate 283 is a short plate centrally mounted on the end girder 273, and stiffening girders 285 extend from the plate 283 to the cross beam 279.

Mounted above the plate 283 and the cross beam 279 are a pair of parallel support beams 286 which are respectively mounted by support blocks 287 and 288 on the plate 283 and the cross beam 279. The parallel support beams 286 support an actuator unit 289 for the male die 16 which is mounted on a die mounting assembly 291.

Similarly at the right-hand end of the rocking frame a central plate 292 is mounted by support blocks 293 on the upper face of the end girder 273. The plate 292 is fixed by stiffening beams 294 which extend between the plate 292 and the cross beam 280, and a pair of parallel support beams 296 for an actuator unit 297 for the female die 15 are carried on the cross beam 280 and the plate 292 by support blocks 298 and 299.

The female die 15 is mounted on a die mounting assembly 300, which is carried on the die actuating unit 297.

Figure 19:
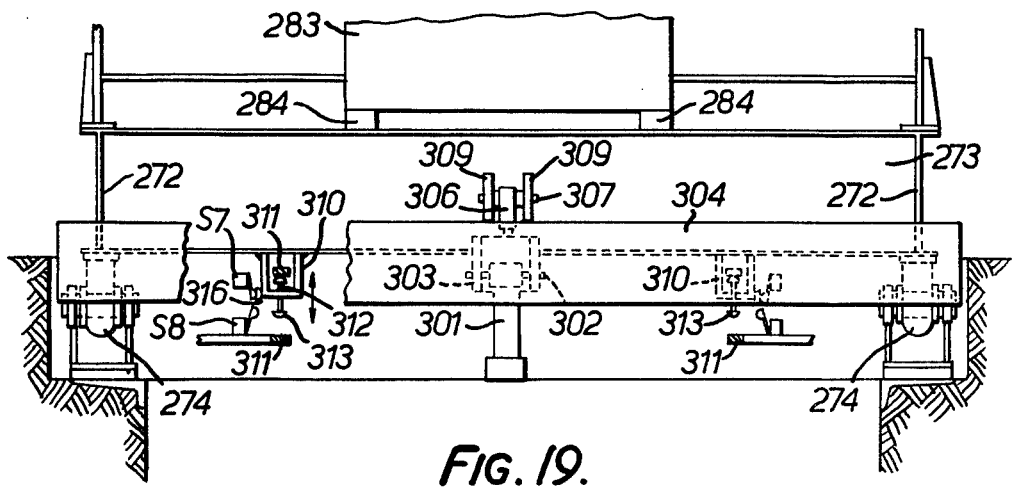
FIG. 19 is an end view of a rocking frame on which the tilting box is mounted.
Figure 21:
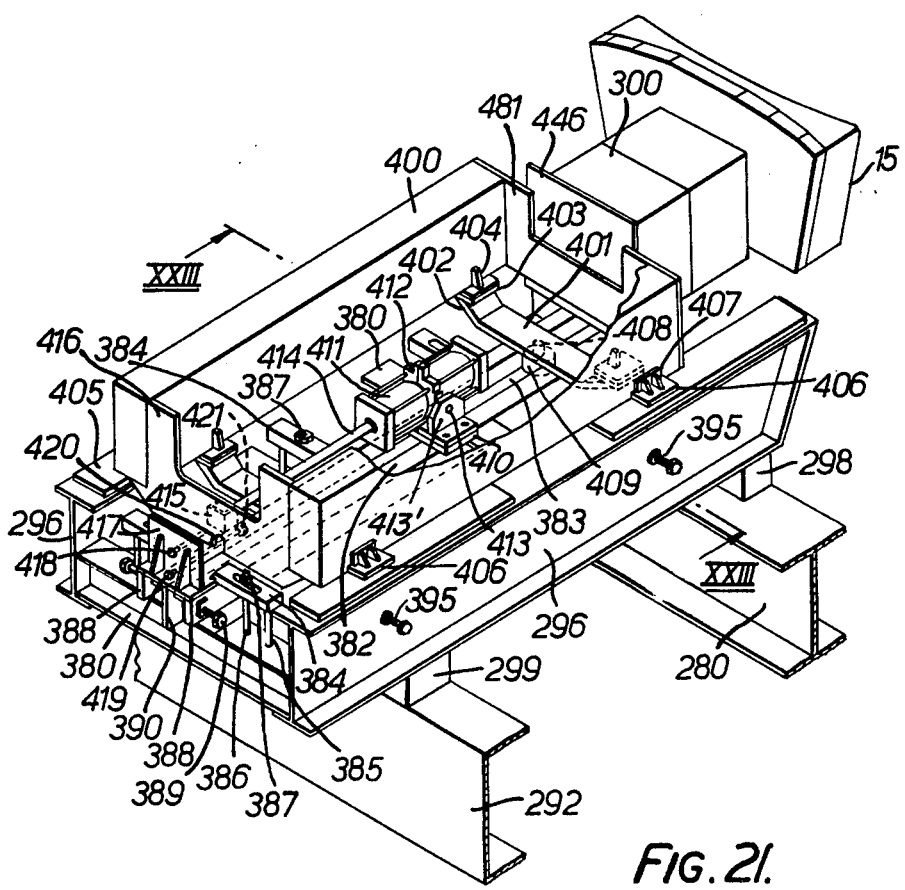
FIG. 21 is an overall view of support beams and an actuating units for the female bending die.
Figure 22:
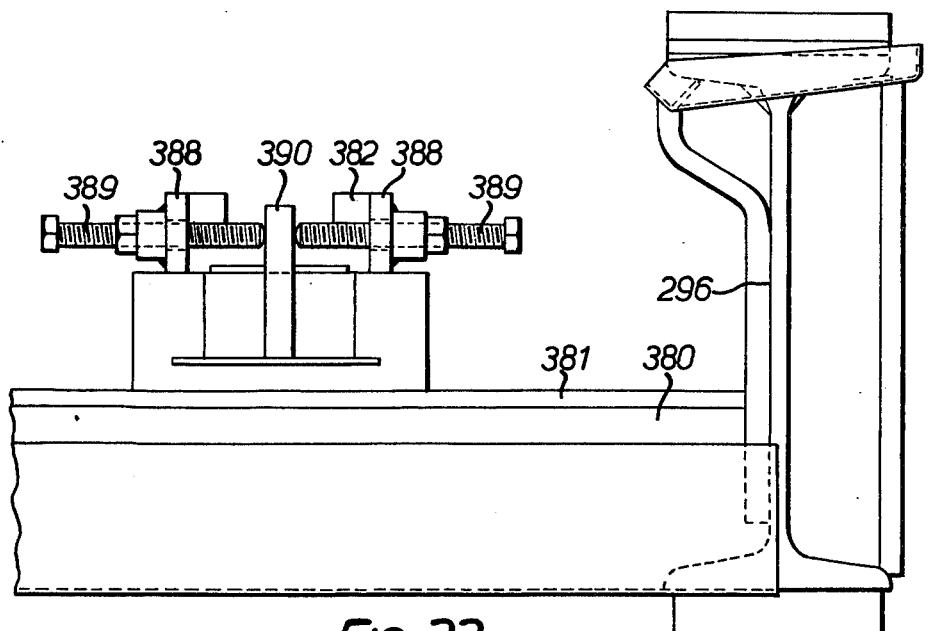
FIG. 22 is a partial end view of the apparatus of FIG. 21.
Figure 23:
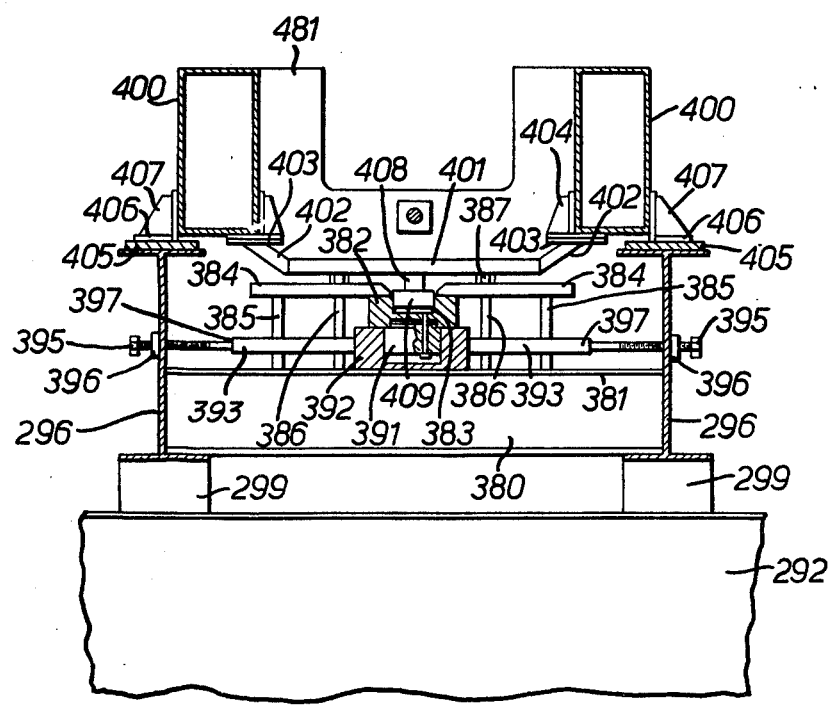
FIG. 23 is a section on line XXIII—XXIII of FIG. 21.
Figure 24:
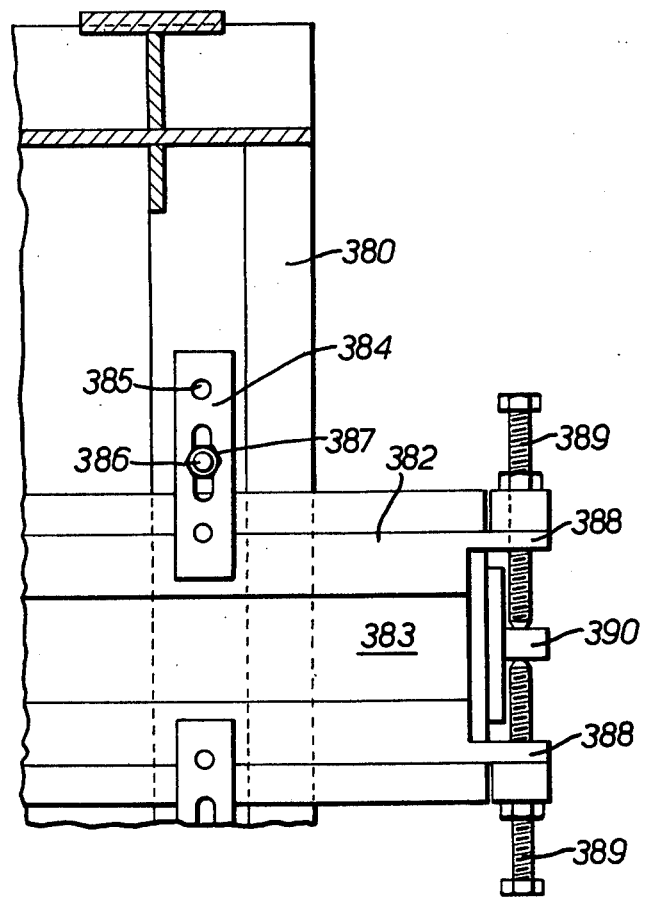
FIG. 24 is a plan view of the end part of the apparatus illustrated in FIG. 22.

The rocking frame 272, 273 is rocked by means of a single hydraulic cylinder 301, FIGS. 18 and 19 which is mounted by means of trunnions 302 between brackets 303 which are fixed to a beam 304 extending across one end face of the pit. The cylinder 301 has a ram 305 which extends upwardly and has a head 306 which carries trunnions 307 which pivot in bearings in bearing support brackets 309 which are fixed beneath the centre of the end girder 273.

The horizontal position of the rocking frame and the angle of tilt of the frame is settable by stop means illustrated in FIG. 19. Near either end of the end girder 273 to which the ram 305 is attached there are U-shaped stirrups 310 extending below the beam. Each stirrup 310 is welded to the beam and strengthened by brackets. Within each stirrup and mounted on the beam 304 fixed to the end wall of the pit there is a stop block 311 of rectangular cross-section, and a second stop block 311 is mounted on the beam 304 below the stirrup. Adjustable stop bolts 312 and 313 are secured to the base of the stirrup and respectively extend upwardly and downwardly from the base to engage the blocks 311. The head of the bolt 312 abuts against the upper block 311 when the frame is rocked to its tilted position and the head of the bolt 313 abuts against the lower block 311 when the rocking frame is tilted back to its horizontal position. Adjustment of both the stop bolts 313 ensures that the rocking frame is returned to a horizontal position and adjustment of the bolts 312 provides an adjustment of the setting of the angle of tilt of the rocking frame bringing the upright rollers 8 in the tilting box 17 into exact alignment with the upright rollers in the furnace to receive a hot sheet of glass for bending.

At either end of the other end girder 273 of the rocking frame there is an hydraulic shock absorber 314 having a ram which bears against the shelf 278 which extends along the sides of the pit. These shock absorbers steady the rocking frame as it nears the end of its tilting movement.

Also carried on the rocking frame there is a support structure indicated at 315, for supporting the gas burners 270.

An indication of the disposition of the rocking frame and the tilting box is given by switches S7 and S8 which are mounted alongside one of the stirrups 310 and are operated by a striker 316 on that stirrup. The switch S7 is closed when the frame is in its tilted position and the switch S8 is closed when the frame is horizontal. Both switches S7 and S8 are connected into an electrical control circuit for the apparatus as will be described.

The rollers 8, 13 and 18 in the tilting box 17 are driven by the same drive as the furnace rollers taken from the hydraulic motor 103. The upright rollers 8 and 18 are driven from their upper ends by gear boxes 317, FIGS. 16 and 18, of similar construction to the gear boxes 79 which drive the upright rollers 8 in the furnace. The gear boxes 317 are mounted above cross-girders 318 which are fixed between the cross-members 265, being adjustably mounted on the cross-girders 318 by means of V-slides in the same way as the mounting of the gear boxes 79 of the furnace by means of the slides 81, 82 as illustrated in FIG. 3.

The drive to the gear boxes 317 is by a shaft 319 coupled by a flexible coupling 320 to an intermediate shaft 321 which is coupled by a further flexible coupling 322 to an output shaft 323 of a right angle drive unit 324 which is mounted on one of the upright girders 266. The drive to the right angled drive unit 324 through a flexible coupling 325 is by a transmission shaft 326 which is held in bearings 327 on the upright girder 266 and the lower end of which is coupled by a flexible coupling 328 to a further right angled drive unit 329 which is mounted on the cross girder 280.

The lower end of each of the upright rollers 8 and 18 in the tilting box is formed as a stub shaft 330 which is supported in a self-aligning bearing block 331 fixed to a plate 332 which is mounted by brackets, one of which is shown at 333 on the ends of girders 334 which cantilever out from the centre web of the cross-girder 280. The plate 332 is adjustable laterally with respect to the brackets 333. The free end of each of the cantilever girders 334 is supported by a prop girder, not shown, which extends upwardly from a cross-girder, omitted from the drawing for clarity, spanning the two side girders 272 of the rocking frame. Supports for the floor support girders 268 beneath the floor part 260 of the tilting box are also provided from that cross-girder.

A box girder 336 extending transversely of the girders 334 is mounted on the upper faces of the girders 334. The box girder 336 provides a mounting support for the bottom stub rollers 13 and their drive means.

Both the angle of inclination of the stub rollers 13 relative to the upright rollers 8 and 18 and the extent of projection of the rollers 13 between the rollers 8 and 18 is adjustable in the same manner as for the bottom stub rollers 13 in the furnace. The drive to the bottom stub rollers 13 is by means of a shaft 338 which extends parallel to the box girder 336 and is mounted in bearings carried by brackets fixed to the girder 336. The drive from the shaft 338 to the bottom stub rollers 13 is through right angle drive units 339 which are also mounted by brackets on the box girder 336. Each right angle drive unit 339 drives the corresponding stub roller 13 through an intermediate shaft 340, which through a further flexible coupling 341 drives a right angled drive unit 342 which drives a shaft 343 on which the ferrule of the roller 13 is mounted. The shaft 343 extends through a cylindrical bearing assembly 344 whose body has integral sleeves 345 which are bolted to an adjustable mounting.

The shaft 338 is driven from the bottom gear box 119 which drives the bottom stub rollers 13 at the exit end of the furnace adjacent the tilting die box 17. A conventional articulated coupling, not shown, couples an output drive shaft from the bottom gear box 119 with the end of the shaft 338 adjacent the exit end of the furnace. The other end of the shaft 338 is connected through a right angle drive unit and a flexible coupling to the input shaft of the drive unit 329 thus providing the drive to the rollers 18 through the gear boxes 317.

FIG. 20 illustrates in more detail the mounting of the bottom stub rollers 13. The cylindrical bearing assembly 344 is bolted to the lower face of an inclined support plate 346 by means of bolts which extend through sleeves 345 integral with the body of the bearing assembly 344. A pivot 347 extends between trunnions 348 on the plate 346 and also mounted on the pivot 347 between the trunnions 348 is an enlarged head 349 of a horizontally disposed top plate 350 which is joined by webs 351 to a face plate 352. A set screw 353 is threaded through a hole in the lower inclined plate 352 and the end of the bolt 353 bears in a boss 354 formed on the lower end of the support plate 346. Adjustment of the bolt 353 adjusts the angle of inclination of the stub roller 13 and when the required angle of inclination is achieved locknuts 355 secure the bolt in that position.

A slide plate 356 is bolted to the lower face of the box girder 336 and a plate 357 for supporting the base unit carrying the bearing 344 is mounted beneath the slide plate 356 by two clamping members 358 which have flanges 359 fitting over the edges of the slide plate 356 and attached to the plate 357 by means of bolts 360. An intermediate spacer plate 361 is welded beneath the plate member 357. The main plate 350 of the base unit is attached to the spacer plate 361 by means of bolts 362 which extend through longitudinal slots, indicated at 363, which are formed in the top plate 350. The bolts 362 are screwed into the spacer plate 361. Dowels 364 extend from the lower face of the plate 361 into a longitudinal groove 365 formed in the upper face of the top plate 350. An adjuster screw 366 is threaded into a mounting block 367 which is bolted beneath the rear end of the upper plate member 357. The inner end of the adjuster screw 366 couples with a plate 368 which is bolted near the rear of the top plate 350.

In order to adjust the extent of projection of the bottom stub roller 13 between the upright rollers 8 and 18, the bolts 362 attaching the upper plate 350 to the spacer plate 361 are loosened and the position of the whole base unit is adjusted by rotation of the adjuster screw 366. When the stub roller 13 is correctly positioned the base unit is clamped to the spacer plate by tightening the locking bolts 362. The stub rollers 13 in the tilting box must be correctly aligned to form a straight track for the carriage 12 which is an extension of the track defined in part by the stub rollers 13 in the furnace, by adjustment of both the angle of inclination of the stub rollers 13 in the tilting box and the extent of projection of those rollers. When the required position is reached the stub rollers are clamped in position.

The upright rollers 8 and 18 in the tilting box 17 are also adjusted and clamped in position by the adjustment of the location of the gear boxes 317 and of the plate 332 which supports the lower ends of the rollers 8 and 18, so that the upright rollers 8 in the tilting box 17, when tilted, also form an aligned extension of the conveyor surface defined by the surfaces of the rollers in the furnace.

FEMALE DIE ACTUATOR UNIT

The female die actuator unit 297 and the parallel support beams 296 for that unit are shown in more detail in FIGS. 21 to 24.

The two parallel beams 296 are tied together by four cross-girders 380, the ends of which are welded to the beams 296. The cross-girders 380 carry a base plate 381 which extends parallel to and midway between the girders 296. A guide track 382 of massive U-section is seated on top of the base plate 381 and a central guide channel 383 formed in the guide track 382 serves to guide rollers on the die actuating assembly 286 as will be described.

The location of the base plate 381 and the guide track 382 on the cross-girders 380 is adjustable and when correctly positioned the guide track 382 is clamped to the cross-girders 380 by means of clamps each comprising a clamping plate 384 on one end of a pillar 385 the lower end of which screws into the upper face of the appropriate cross-girder 380. Each clamping plate 384 is held in position on a threaded rod 386 which is screwed into a threaded aperture in the cross-girder 380 and which carries on its upper end a clamping nut 387 which when screwed down tightly clamps the plate 384 firmly on to the upper surface of the guide track 382.

For angular adjustment of the guide track two parallel lugs 388 extend from the rear end of the guide track 382 and are fitted with adjuster bolts 389, the inner ends of which engage opposite faces of a fixed lug 390 which is bolted to the rear end face of the base plate 381 between the parallel lugs 388. A circular pivot block 391 is bolted beneath the guide track 382 towards its front end. The pivot block 391 fits in a circular housing 392 in the top face of the base plate 381. Angular adjustment of the guide track 382 is by adjustment of the bolts 389. Transversely extending blocks 393 which extend outwardly towards the main girders 296 are welded to the side faces of the housing 392. Adjuster bolts 395 threaded through bushes 396 welded to the outside of the beams 296 bear on the outer faces 397 of the blocks 393. Lateral and coarse angular adjustment of the disposition of the guide track 382 is effected by adjusting the bolts 395, and when the guide track 382 has thus been correctly aligned by fine angular adjustment by the bolts 389, the clamping nuts 387 are tightened to clamp the guide track and the base plate 381 on to the cross-girders 380.

The die actuating unit 297 comprises two parallel box section girders 400 which are joined near their ends by cross-members 401 which are fixed beneath the girders 400. Each of these cross-members 401 is in the form of an elongated plate the ends 402 of which are inclined upwardly and terminate in foot plates 403 which are bolted to brackets 404 on the box girders 296 is fitted with two bed plates 405 which extend for some distance along the upper surface of both girders 296 in the region of both ends of the girders. Running on these bed plates 405 are recirculating ball bearing pads 406 which are fixed to the side of the box girders 400 by brackets 407. The ball bearing pads 406 support the box girders 400 and the female die actuating mechanism 300 on the main girders 296.

Each of the cross-members 401 carries a downwardly extending spindle 408 and carrying on its lower end a guide roller 409 which runs in the channel 383 in the guide track 382 and thereby guides inward and outward movement of the die actuator along the support girders 296.

A plate 410 fixed on the top of the guide track 382 provides a base plate for a stationary hydraulic cylinder assembly 411 which is held in a central collar 412 having stub shafts 413 which pivot in brackets 413' which are bolted to the base plate 410. The cylinder 411 is held in a cage which extends between the cylinder heads and is coupled to the collar 412.

A ram 414 is connected to a piston which operates within the cylinder 411 and fitted to the outer end of the ram is the ball of a ball and socket joint indicated at 415 which is fixed to an end plate 416 which extends between and is welded to the outer ends of the box girders 400.

Movement of the ram 414 in either direction transmits drive to the box girders 400 and, guided by the rollers 409 which run in the guide track groove 383, the box girders 400 run on top of the main support girders 296 in the same direction as the direction of movement of the piston in the cylinder to move the female die 15 into bending position and to retract the die from that position.

A bracket 417 is bolted to the rear end of the guide track 382 above the lugs 388 and carries two stop bolts 418 and 419. The extent of backward movement of the die actuator during opening of the dies is limited by abutment of the end plate 416 against the stop bolt 418.

The stop bolt 419 is a longer bolt and extends through a slot 420 in the plate 416. The inner end of the bolt 419 is fitted with an enlarged head 421 against which the inner surface of the plate 416 abuts when the die 15 is at the limit of its forward movement and is closed against a glass sheet which is thereby bent against the surface of the male die.

Mounted on a plate 422 fixed to the side of one of the support beams 296 are four limit switches S9, S10, S11 and S12. The switches are staggered at right angles to the plate 422 so as to be operated as appropriate by strikers 423 which are fixed beneath a plate 424 which is cantilevered out from the side of one of the box girders 400.

These switches and their strikers are located so as to give the following indications:

S9 - female die partly out
S10 - female die in
S11 - female die partly in
S12 - female die out.

FEMALE DIE AND SUPPORT

The construction and mounting of the female die 15 is shown in more detail in FIGS. 25 and 26.

The female die 15 is of open frame construction made up in sections which can be moved between the upright rollers 18 within the tilting box as indicated in FIG. 16. There are two end sections 425 shaped to match the end configuration of the glass sheet when bent, two outer top sections 426 and three inner top sections 427 which pass between the shafts of the rollers 18. The open frame construction is completed by three lower sections 428 which also pass between the rollers 18. Each of these ring frame sections is constructed in conventional manner of heat-resistant steel with a refractory facing which contacts the margins of the hot glass sheet.

All the frame sections 425, 426, 427 and 428 are mounted on a base frame whose shape matches that of the ring frame die. The base frame is a steel structure comprising upper and lower members 429 and 430 and end members 431. These members are of L-section and stout construction and are welded together.

Each of the frame sections 425, 426, 427 and 428 is attached to the base frame by adjuster assemblies, each of which comprises an internally threaded sleeve 432 which is fitted with a threaded rod 433 and is attached to the outer surface of the appropriate member of the base frame by an L-shaped bracket 434 which is welded to the outer surface of the base frame, the sleeve 432 being welded to that bracket. Nuts 435 are threaded on to the rod 433 at either end of the sleeve 432. One end of the threaded rod fits into a slot in a block 436 which is welded to the back of the appropriate female die frame section; the end of the rod 433 being held in the slotted block 436 by a pivot pin 437.

Each of the sections of the female die frame is mounted in this way there being three such assemblies of sleeves 432 and rods 433 mounting each of the small sections 426, nine such assemblies mounting each of the end sections 425, four such assemblies mounting each of the longer sections 427 and 428, and three assemblies mounting each of the shorter central sections 427 and 428.

The locknuts 435 on the threaded rods 433 are adjusted until all the sections of the die frame construction are correctly set up, and when this correct position has been achieved it is fixed by welding the blocks 436 to the ends of the threaded rods 433.

The steel base frame 429, 430, 431 is welded to and carried by a support structure comprising two vertical struts 438 which are welded between the upper and lower members 429 and 430 of the base frame, and cross struts 439, 440 and 441. The base frame is attached to the die support 300 by an adjustable mounting which will now be described with reference to FIG. 27, which is a vertical section through the female die support unit 300 and comprises a structure 445 of generally rectangular cross-section comprising two parallel box-section beams, which structure is closed at its end adjacent the die actuating unit by a plate 446 which is welded to the ends of the box-section beams.

At the end of the die support unit adjacent the base frame for the die a locating plate 447 is fixed and a vertical slot 448 in the plate 447 receives the free end of a locating pin 444, which is fixed to the centre of the cross strut 440 of the base frame.

The base frame for the female die is suspended from the die support unit by an adjustable mounting by which angular adjustment of the female die about a horizontal axis parallel to the plane of the base frame is possible. Lugs 450 are welded at right angles to the upper frame member 429 and the cross strut 439. There are two such pairs of lugs 450 as illustrated in FIG. 26, and between each pair there is mounted a locating bar 451 which bars 451 engage in a clamping hook arrangement on the die support unit.

Figure 28:
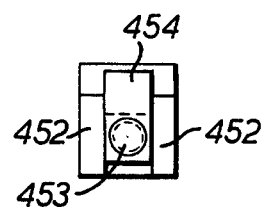
FIG. 28 is a detailed elevation of a clamping suspension forming part of the support structure of FIG. 27.

Each of the locating bars 451 is seated in recesses in lugs 452 which are fixed in pairs to the end of the die support unit as shown in detail in FIG. 28. The base frame and the die thereby hangs from the lugs 452. A shaft 453 extends through the die support unit and carries a clamping hook 454 which fits between the lugs 452 and engages behind the locating bar 451. A reduced diameter threaded end 456 of the shaft 453 projects through the rear end plate 446 of the die support unit, and a stack of spring washers 457 is fitted on to the end of the shaft 453 between the rear face of the plate 446 and a face of a clamping nut 458 which is threaded on to the end 456 of the shaft.

When the clamping nuts 458 of both shafts 453 are screwed tight the locating bars 451 are firmly clamped between the clamping hooks 454 and the lugs 452. The clamping pressure applied depends on the stiffness of the spring washers 457 which are held in compression by the clamping nuts 458.

A locating bar 460 is mounted centrally on the lower cross strut 441 of the base frame by means of lugs 461 whch are welded to the cross strut 441. The locating bar 460 is engaged by a clamp assembly which is mounted on the outer end of a tubular shaft 462 which also extends through the die support unit. The clamp assembly comprises a jaw member 463 carrying an upstanding end lug 464. A mounting plate 465 is welded to the jaw member 463 and the end of the tubular shaft 462 is welded in a hole in the mounting plate 465. A clamping shaft 466 extends through the tubular shaft 462 and has a threaded end which screws through a threaded hole 467 in a plate 468 which is fixed to the mounting plate 465. Adjacent the clamp assembly the tubular shaft 462 passes through a bearing sleeve 469 which is housed in a support plate 470 which extends transversely between the centre plates of the die support unit. The end of the clamping shaft 466 can be extended towards the end lug 464 of the clamping jaw so that the central locating bar 460 on the base frame is clamped up against the end lug 464 by the end of the clamping shaft 466.

The other end of the tubular shaft 462 extends through a bearing sleeve 471 in the rear end plate 466 of the die support unit. A U-shaped bracket 472 having parallel flanges 473 and 474 is attached to the rear end plate 446 by bolts 475. Both the flanges 473 and 474 of the bracket are drilled for the passage therethrough of the tubular shaft 462.

The outer end of the tubular shaft 462 is threaded and is fitted with lock nuts 476, one on either side of the flange 474 of the bracket.

The outer end of the clamping shaft 466 extends beyond the end of the tubular shaft 462 and is squared off as indicated at 477 for engagement by a tool for rotating the clamping shaft 466 to clamp the locating bar 460 against the end flange 464.

By means of this adjustable mounting the angle of tilt of the female die to the vertical can be adjusted by slackening the lock nuts 476 and adjusting the extension of the tubular shaft 462 to alter the position of the end flange 464. The adjustment is carried out with the upper clamping shafts 453 and 466 loosened so that the female die can pivot and when the desired angle of tilt has been achieved the lock nuts 476 are tightened to clamp the tubular shaft 462 in position and the clamping shafts 453 are tightened to clamp the jaw members 454 against the locating bars 451 and to clamp the locating bar 460 against the end flange 464.

The die support unit can also be angularly adjusted about a central axis generally perpendicular to the die surfaces.

A circular boss 480, FIG. 27, is provided on the face of a front end plate 481 of the die actuator unit. The boss 480 closely engages in a circular recess 482 formed in the abutting face of the rear end plate 446 of the die support unit which is attached by bolts 483, FIG. 29, to the front end plate 481 which is welded to and spans the front ends of the two box girders 400 of the die actuator. The bolts 483 extend through vertical slots 484 formed in the plate 446 and through horizontal slots, not shown, in the plate 481 which horizontal slots are at right angles to the slots 484.

At the centre of each side edge of the plate 446 there is fixed a lug 486 which extends outwardly from a plate 487 which is bolted to the plate 446. Two pairs of lugs 488 are welded to the opposing face of the plate 481 and each lug 486 lies between a pair of lugs 488. Each of the lugs 488 carries an adjusting bolt 489 which bears against the lug 489. By adjustment of the bolts 489 at both sides of the assembly, the die fixing box and the dies are rotated about a central pivot formed by the circular boss 480 in its recess 482. When the female die has been brought to the required angular alignment about that axis the bolts 483 are tightened to lock the die fixing box and the die in that position.

MALE DIE AND MALE DIE ACTUATOR UNIT

The male die 16 is mounted on a male die support unit 291, itself mounted on an actuator unit 289 of similar construction to the support unit and actuator unit for the female die just described with reference to FIGS. 21 to 24 and 27 to 29. The relative disposition of the male and female dies is shown in more detail in FIG. 30 which is a view of the dies looking from the outlet end of the tilting box with the male die 16 at the right-hand side of the figure.

Figure 31:
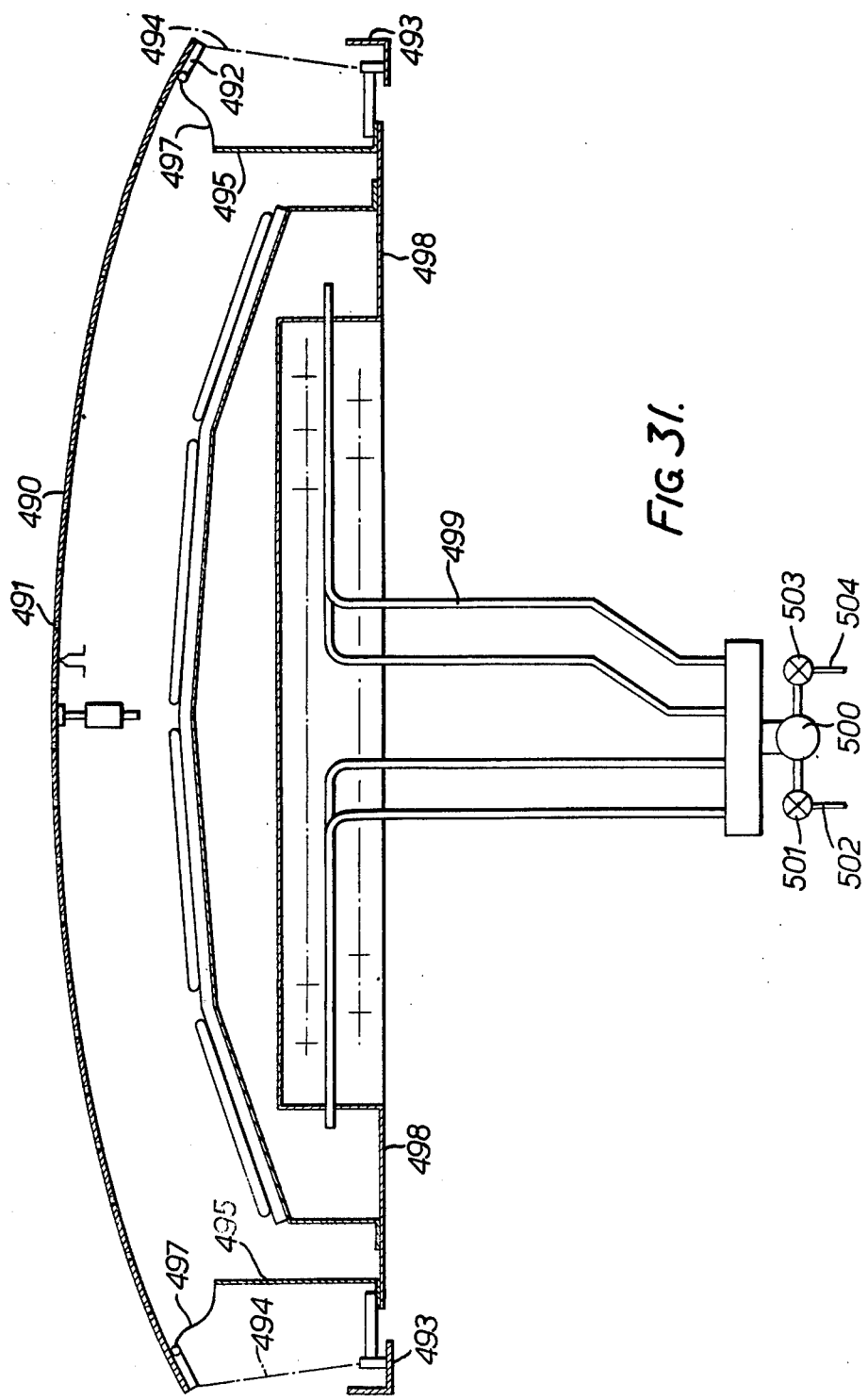
FIG. 31 is a horizontal cross section through the male die.

The male die construction is shown in more detail in FIG. 31 and comprises a continuous die face 490 of sheet steel which is perforated as indicated at 491 and is provided with a coating of refractory material for engaging one face of the hot glass sheet which is bent against that surface by the open frame of the female die construction. A shaped frame 492 provides a mounting for the die 490 and is connected to a back frame 493 by adjustable struts 494 of the same kind as the struts 432 and 435 for the female die sections illustrated in FIG. 26.

An inner wall 495 is mounted on stays within the back frame 493 and the upper edge of the wall 495 is connected to the shaped frame 492 by a flexible seal 497. The back frame 493 has a back plate 498 sealed to it which plate is recessed to receive pneumatic ducts 499 which lead into a chamber formed by the die face 490, the inner wall 495 and the back plate 498, from a manifold 500 which is connected through a valve 501 to a pressure duct 502 and through a valve 503 to a vacuum line 504. The flexible seal 497 permits adjustment of the location of the male die face 490 relative to the back frame 493.

Opening of the valve 503 connects the chamber within the die to the vacuum line and is effective through the perforations 491 in the die face to help such a sheet being bent against the surface of the die.

When bending is complete, as will be described, with the valve 503 shut, opening of the valve 501 provides a puff of air through the perforations 491 to help release the bent glass sheet from the surface of the male die upon opening of the dies.

Figure 29:
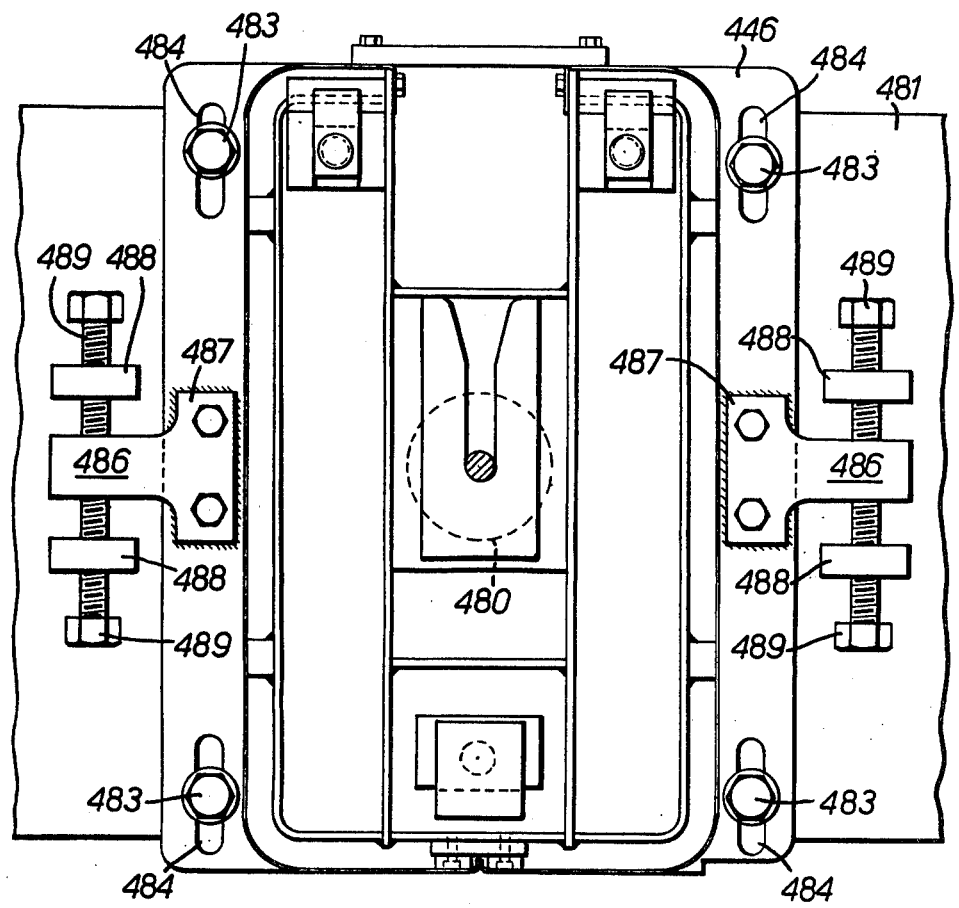
FIG. 29 is a section on line XXIX—XXIX of FIG. 27.

The back plate 498 of the male die is hung from the main die support using an adjustable locating and clamping arrangement of the same kind as illustrated for the female die in FIG. 27 to 29. Further angular rotation about a horizontal axis generally at right angles to the back plate 498 of the die is possible since the male die support unit 291 is adjustably connected to the male die actuator unit 289 in the same manner as for the female die as illustrated in FIG. 29.

Two limit switches S13 and S14 are mounted on a plate 506, FIG. 18, fixed to the side of one of the support beams 286 which support the male die actuator unit. The switches are actuated by strikers fixed beneath a plate 507 cantilevered from the side of one of the box girders 400 of the male die actuator unit. These switches and strikers are located so as to give the following indications.

S13 - male die partly out
S14 - male die in.

GLASS LIFTING FINGERS

The bottom edge of the flat glass cut to a windscreen shape usually has a slightly concave shape which is reflected in a matching shape of the male and female dies. As the carriage 12 and the glass sheet 9 move into the tilting box inward movement of the female die begins under timed control as will be described. The rollers in the tilting box are slowed as the hot glass sheet moves between the bending dies and just before the carriage 12 has come to rest against the carriage stop 242 the glass is lifted from the shoulders 150 on the carriage and is supported between the die during bending on lifting fingers mounted at the bottom of the female die. There are two lifting fingers 510 one at each end of the female die 15 and in FIG. 9 the lifting fingers 510 are shown positioned below the lower edge of the glass sheet close to the curved corners of that lower edge.

Initially when the female die 15 is retracted both the lifting fingers are at a slightly downwardly sloping angle for example 2° below the horizontal so that they can be readily moved into position beneath the lower edge of the glass sheet. When the fingers 510 have been raised in a manner which will be described they lift the glass sheet upwardly clear of the shoulders 150 on the carriage so that the carriage can then be rapidly accelerated, by acceleration of the rollers in the tilting box, out through the exit 262 from the tilting box onto the extension of the conveyor at the left-hand side of the apparatus as indicated in FIG. 1.

Figure 30:
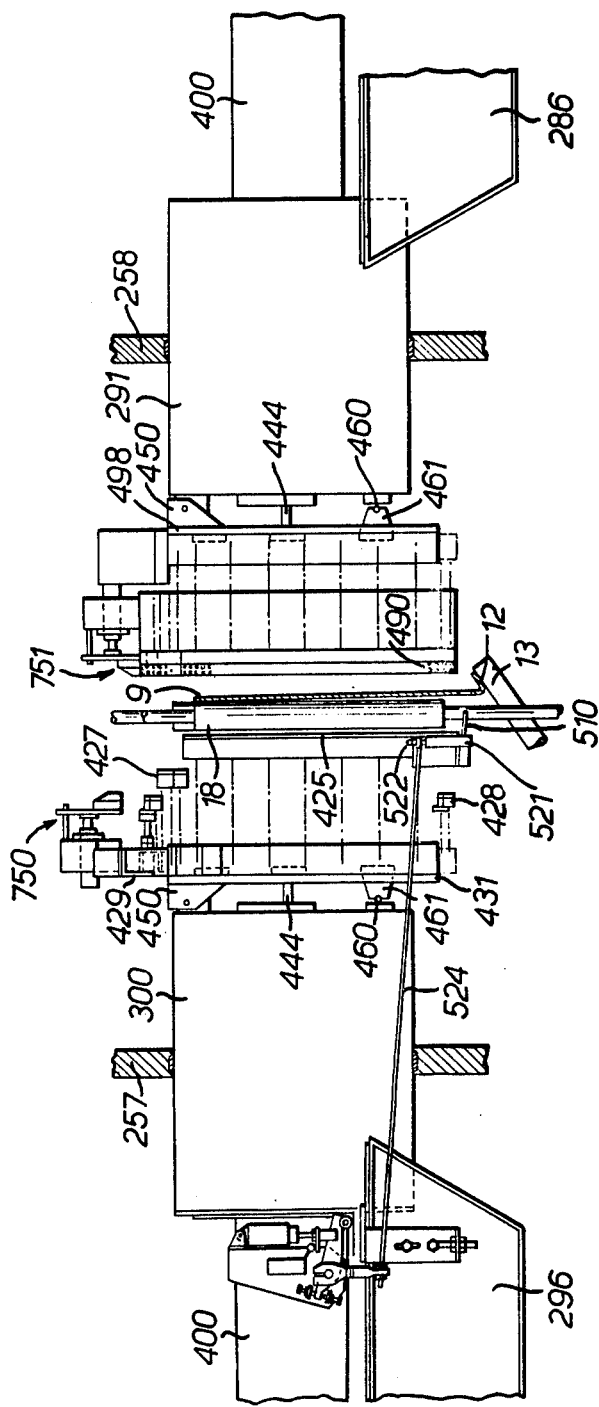
FIG. 30 is a more detailed schematic view of the male and female bending dies in the tilting box as seen from the outlet end of the tilting box.

The locating and actuation of the lifting finger 510 at one side of the female die is indicated generally in FIG. 30 and in more detail in FIGS. 32 to 36.

An identical lifting finger and operating mechanism is associated with the other bottom corner of the female die.

Figure 32:
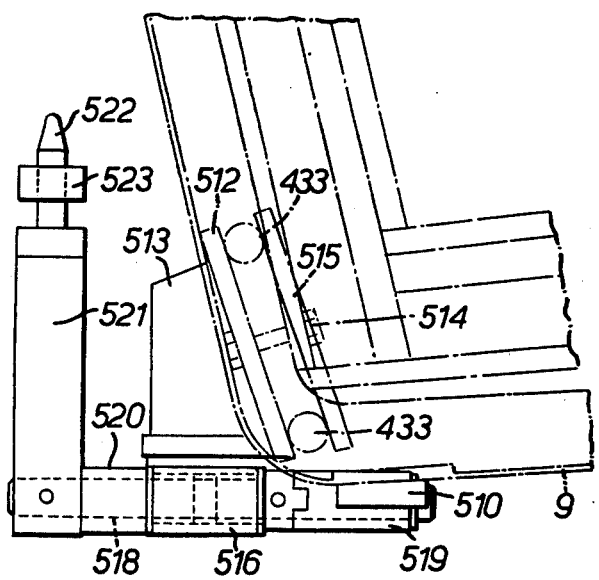
FIG. 32 is a front elevation of a lifting finger assembly attached to one bottom corner of the female bending die.
Figure 34:
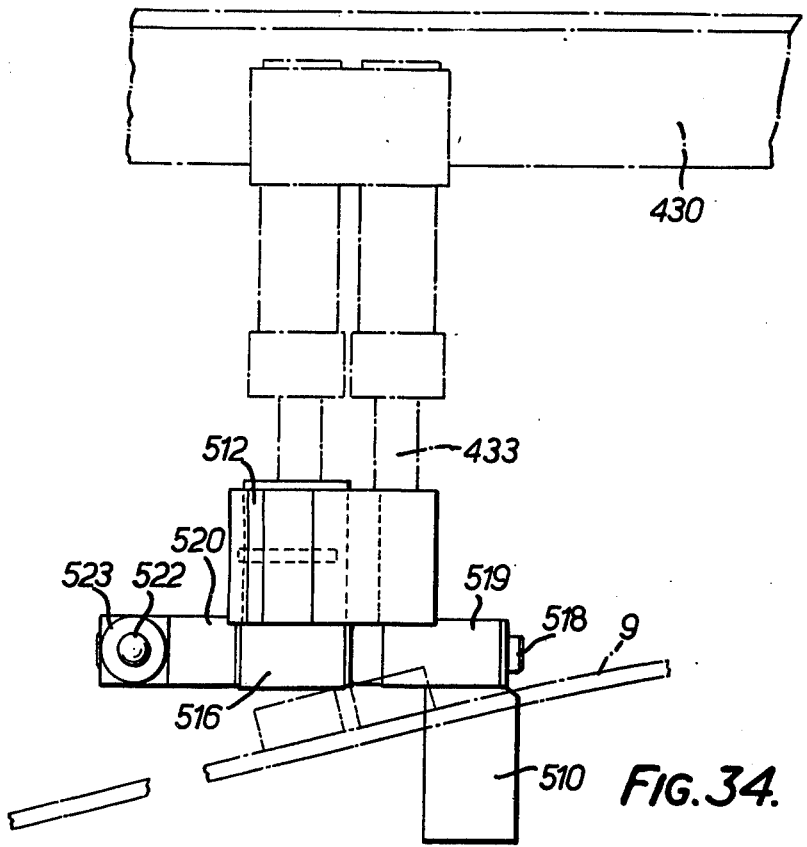
FIG. 34 is a plan view of the lifting finger assembly of FIGS. 32 and 33.
Figure 33:
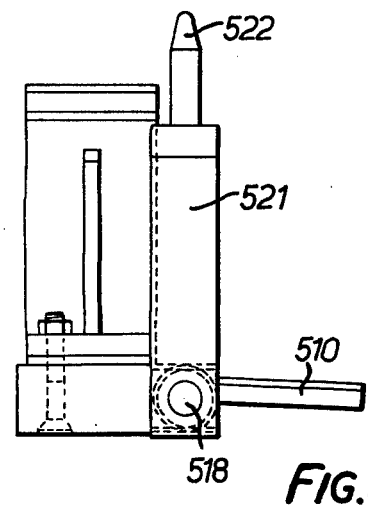
FIG. 33 is a side elevation of the lifting finger assembly of FIG. 32.

As shown in more detail in FIG. 32 each of the lifting fingers 510 is mounted from the female die by means of a mounting which includes an L-shaped bracket 512 which is positioned on the outer side of two of the threaded rods 433 which form part of two of the adjuster assemblies for a side section 425 of the female dies. The bracket 512 is strengthened by a web 513 and is attached by bolts 514 to a clamping plate 515 positioned on the other side of the two threaded rods 433.

A bearing block 516 is attached to the foot of the bracket 512 and carries a shaft 518 to one end of which there is fixed a sleeve 519 which is integral with the lifting finger 510. The other end of the shaft 518 projects from the bearing block 516 and carries a spacer sleeve 520 and has an upwardly extending crank arm 521 fixed to that end and located in position by a grub screw at an angle slightly greater than 90° to the lifting finger 510. When the crank arm 521 is vertical the lifting finger 510 is at small angle e.g., 2° below the horizontal. An upwardly extending spike 522 is fitted into the top end of the crank arm 521 and a ring member 523 which forms the termination of an actuating rod 524, FIG. 30, fits over the spike 522. The actuating rod 524 passes through a seal, not shown, in the rear wall 257 of the tilting box, and is connected to an actuating mechanism mounted on the side of one of the beams 400 of the female die actuator unit.

Figure 35:
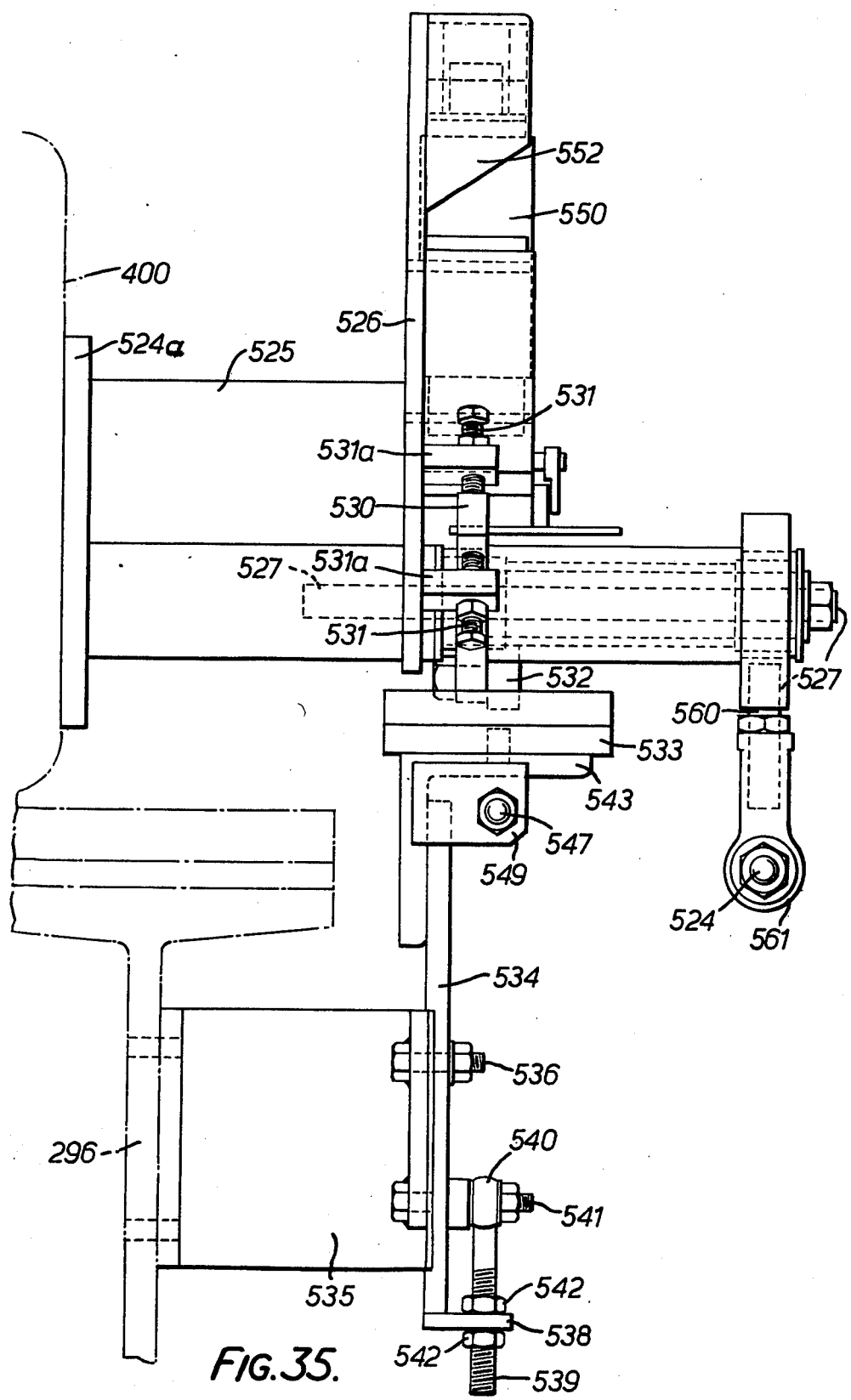
FIG. 35 is an end elevation of actuating mechanism for the lifting finger assembly of FIGS. 32 and 33.
Figure 36:
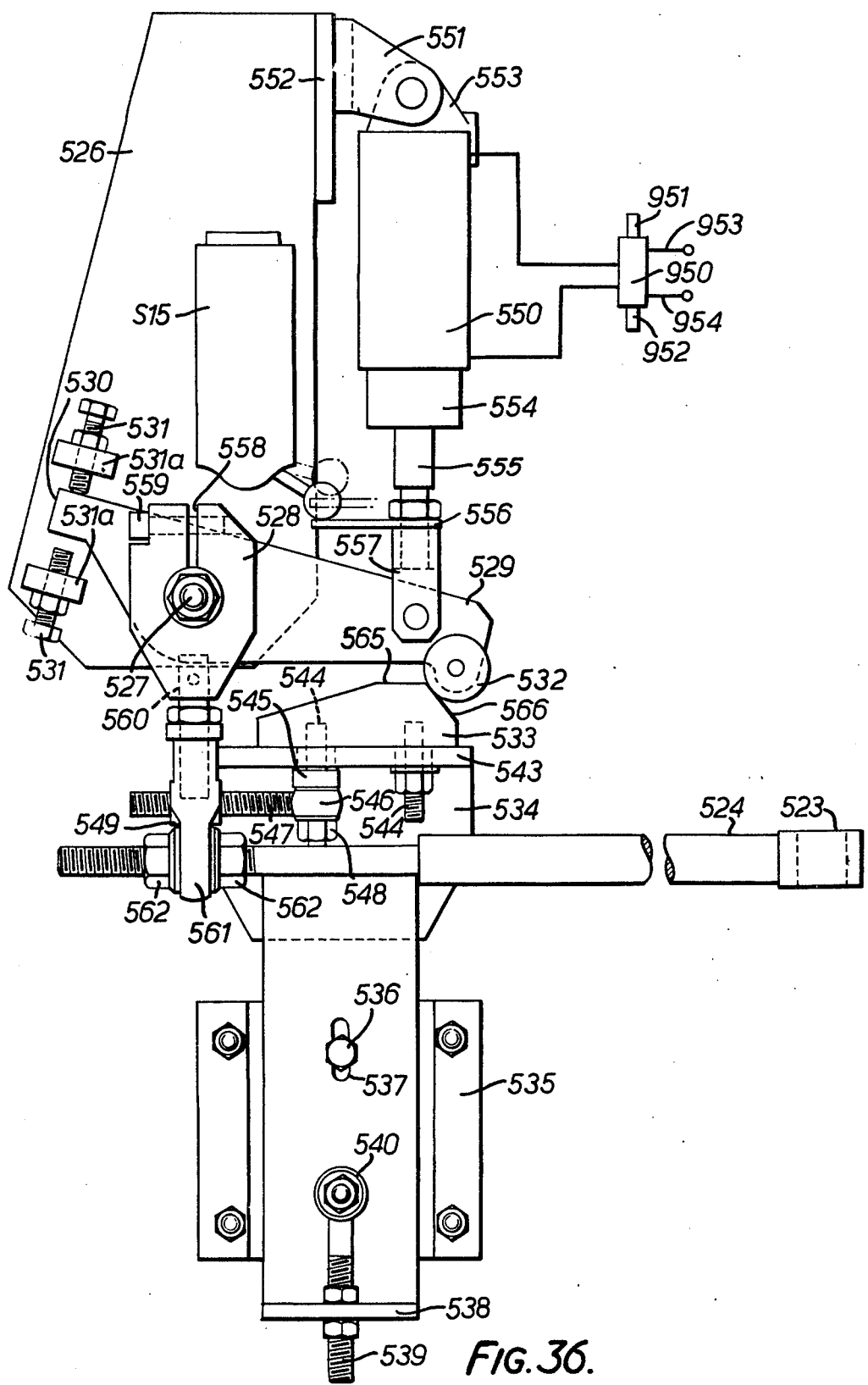
FIG. 36 is a front elevation of the actuating mechanism of FIG. 35, FIGS. 37A, 37B and 37C together form an overall view in elevation of a tong bar from which tongs are suspended for gripping the upper edge of a glass sheet between the male and female bending dies, and of the hoist mechanism from which the tong bar is suspended, FIGS. 38A, 38B and 38C together show an end elevation of a part of the hoist mechanism and the tong bar suspension.

FIGS. 35 and 36 show in more detail the actuating mechanism for the actuating rod 524. A base plate 524a is bolted to the outer side face of one of the box girders 400 of the female die actuator unit. A tubular boss 525 fixed to the base plate 524a carries a mounting plate 526. A shaft 527 is fixed into the tubular boss 525 and extends outwardly and carries on its outer end an actuating arm 528 to which the other end of the actuating rod 524 is attached.

A cam follower lever 529 is also pivoted on the shaft 527 and the outer end of the cam follower lever is formed as a lug 530 which moves between adjustable stop bolts 531 which are screwed through lugs 531a fixed to the mounting plate 526. The positions of the stop bolts 531 limits the extent of rotation of the cam follower lever 529.

The other end of the cam follower lever 529 carries a cam follower roller 532 which rides on a cam plate 533 which is supported by a mounting bracket 534 carried by a sub-bracket 535 bolted to the vertical web of one of the support girders 296. The mounting bracket 534 includes a vertical flange cooperating with an end flange on the sub-bracket 535 and is attached to the end flange of a bracket 535 by means of bolts 536 which extend through vertical slots 537 in the vertical flange of bracket 534. At the lower end of the vertical flange of bracket 534 there is welded a lug 538 which is drilled to receive a threaded rod 539 which has a ring member 540 at its upper end which fits over a stub bolt 541 which is fixed to the end flange of the sub-bracket 535 and extends through a vertical slot cut in the vertical flange of bracket 534. Adjuster nuts 542 are fitted on the threaded rod 539, one on either side of the lug 538. When the bolts 536 are loosened the height of the mounting bracket 534 and hence the cam plate 533 can be adjusted by turning the adjuster nuts 542 on the threaded rod 541.

The mounting bracket 534 has an upper horizontal mounting flange 543 on which the cam plate 533 is mounted by studs 544 fitted into the lower face of the cam plate 533 and extending downwardly through horizontal slots cut in the mounting flange 543. A nut on one of the studs 544 clamps the cam plate 533 to the plate 543. The other stud 544 extends downwardly through a spacer sleeve 545, a ring member 546 on one end of a threaded rod 547 and a locking nut 548. The other end of the threaded rod 547 passes through a lug 549 which is welded to the mounting flange 543. The extension of the rod 547 through the lug 549 is secured by means of lock nuts. This arrangement permits the position of the cam plate 533 to be adjusted horizontally.

A vertically positioned pneumatic cylinder 550 is mounted on the plate 526 by means of a pivot fork 551 whose base is secured to a flange 552 on the plate 556. A spindle fixed in the fork 551 carries pivotally a lug 553 on the head of the cylinder 550. The ram 554 of the cylinder has a shaft 555 fixed in its lower end, which shaft carries a striker plate 556 which projects horizontally to engage an actuating roller of a limit switch S15 mounted on the plate 526. The lower end of the shaft 555 carries a bifurcated coupling 557 between the arms of which the cam follower lever 529 fits. The lever 529 is coupled in the coupling 557 by a pivot pin.

The actuating arm 528 is, as shown, in the form of a plate member having a central hole which passes over the shaft 527 and formed with a clamping slot 558. A clamping bolt 559 passes through the separated upper parts of the plate to clamp the plate onto the shaft. A rod 560 is fixed into the lower end of the plate 528 and extends downwardly and is formed at its lower end as a ring member 561 which fits over the outer end of the actuating arm 524 and is secured thereto by lock nuts 562 which thread onto the outer threaded end of the shaft 524.

When the dies are open and the female die is fully withdrawn the roller 532 rests on the highest part 565 of the cam plate 533, the cylinder 550 being supplied with air under pressure to apply downward pressure on the cam follower lever 529. The actuating arm 524 is extended into the tilting box so that the lifting finger 510 is in its downward position ready to move beneath the lower edge of a glass sheet.

During the bending operation the female die actuator unit moves forwardly and at the point during its travel when the sectionalised frame of the female bending die passes between the upright rollers 18 in the tilting box, the downwardly extending lifting fingers 510, one at each side of the die, pass beneath the lower edge of the sheet. As the advance of the female die continues and the die frame sections contact the glass sheet which is resting against the rollers 18 and push the glass sheet away from contact with the rollers, both cam follower rollers 532 ride off the highest points 565 of the cam plates 533 and run down the sloping leading faces 566 of the cam plate under the action of the loading pneumatic cylinders 550. The cam follower levers 529 rotate clockwise up to the lmit imposed by the upper stop bolts 531, and rotation of the actuating plates 528 clockwise withdraws the actuating rods 524 which pull the spikes 522 on the crank arms 521 backwardly to raise the lifting fingers 510 against the bottom edge of the glass sheet 9 and pick up the glass sheet 9 from the carriage 12.

The male die has already been brought into its forward bending position, and during its continuing forward movement the female die carries the hot glass sheet 9 now seated on the lifting fingers 510 into engagement with the stationary male die. Forward movement of the female die continues to complete the bending operation. Just prior to completion of the forward movement of the female die the rocking frame is tilted back to the horizontal position to bring the dies to a vertical position and gripping tongs are engaged with the upper edge of the bent glass sheet as will be described.

After bending when the bending dies are withdrawn the lifting fingers 510 are returned to their lowered position by switching off the air supply to the cylinders 550 to cause anti-clockwise rotation of the cam follower levers 529 thereby advancing the actuating rods 524 and rotating the lifting fingers 510 to their lower inactive position.

When bending sheets of thin glass, for example up to 3 mm thick, the two lifting fingers 510 at the bottom corners of the female die are sufficient to bear the weight of the glass sheet for the time in which it is carried by those fingers as the bending dies close. For the bending of glass sheets of the greater thickness an additional lifting finger centrally of the glass sheet may be provided on the male die actuated by a mechanism similar to that just described, or which may be operated directly by an hydraulic cylinder. The position of such a finger is indicated at 510a in FIG. 9.

TONG BAR AND HOIST

The tong bar 23 from which six tongs 22 are suspended and the hoist mechanism from which the tong bar is suspended are illustrated in more detail in FIGS. 37 and 39 to 41. Each of the tongs 22 is movable to a location exactly positioned over the upper edge of the bent glass sheet between the bending dies before the tongs close onto the upper edge of the sheet, and each of the tongs is loosely mounted in a tong gate structure, illustrated in FIGS. 42 and 43, which is mounted above a vertical pivot secured to or cantilevered from the tong bar.

Figure 37A:
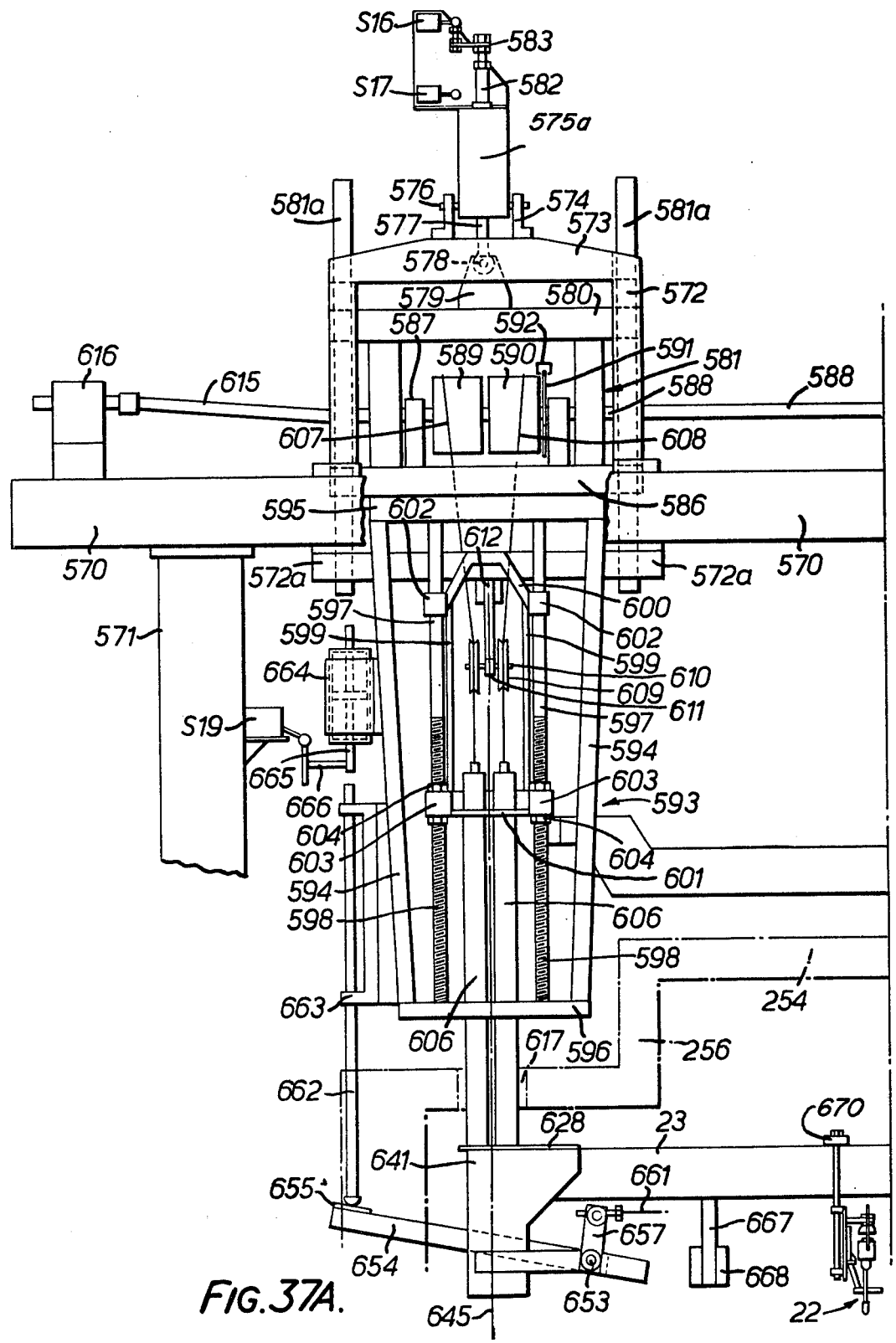
Figure 37B:
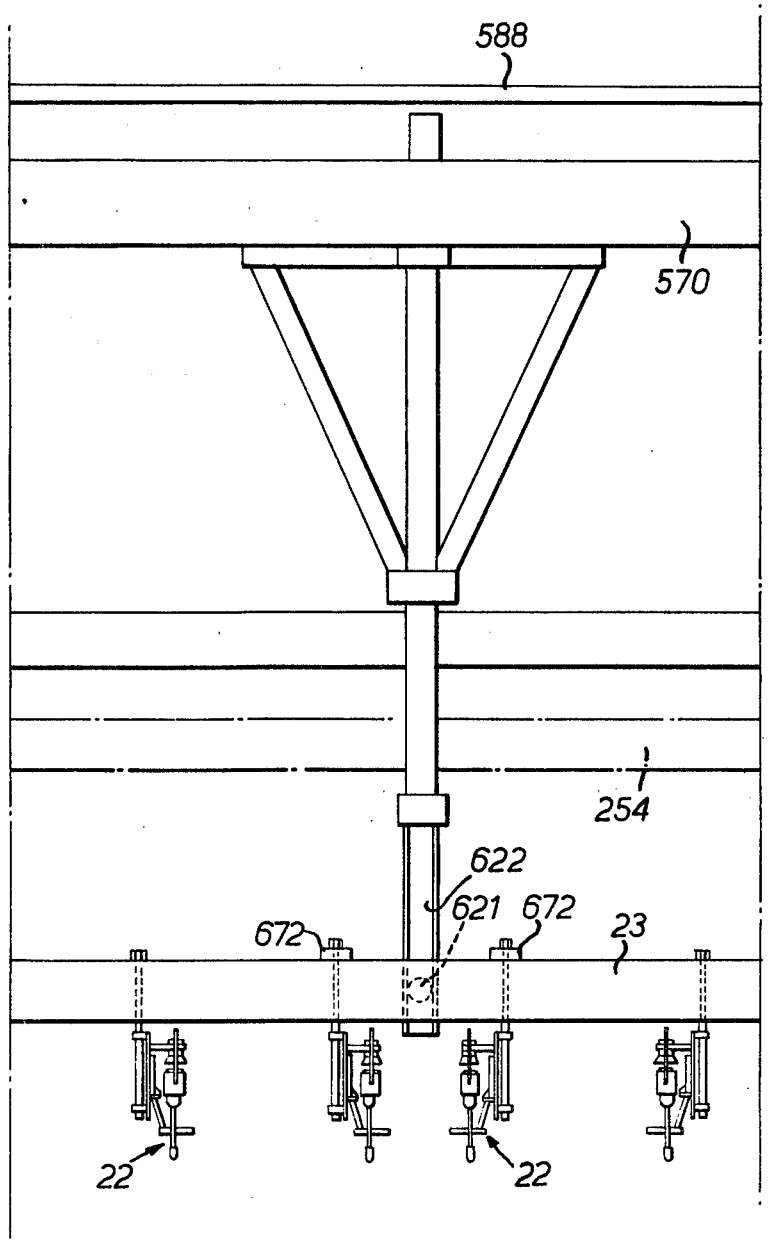
Figure 37C:
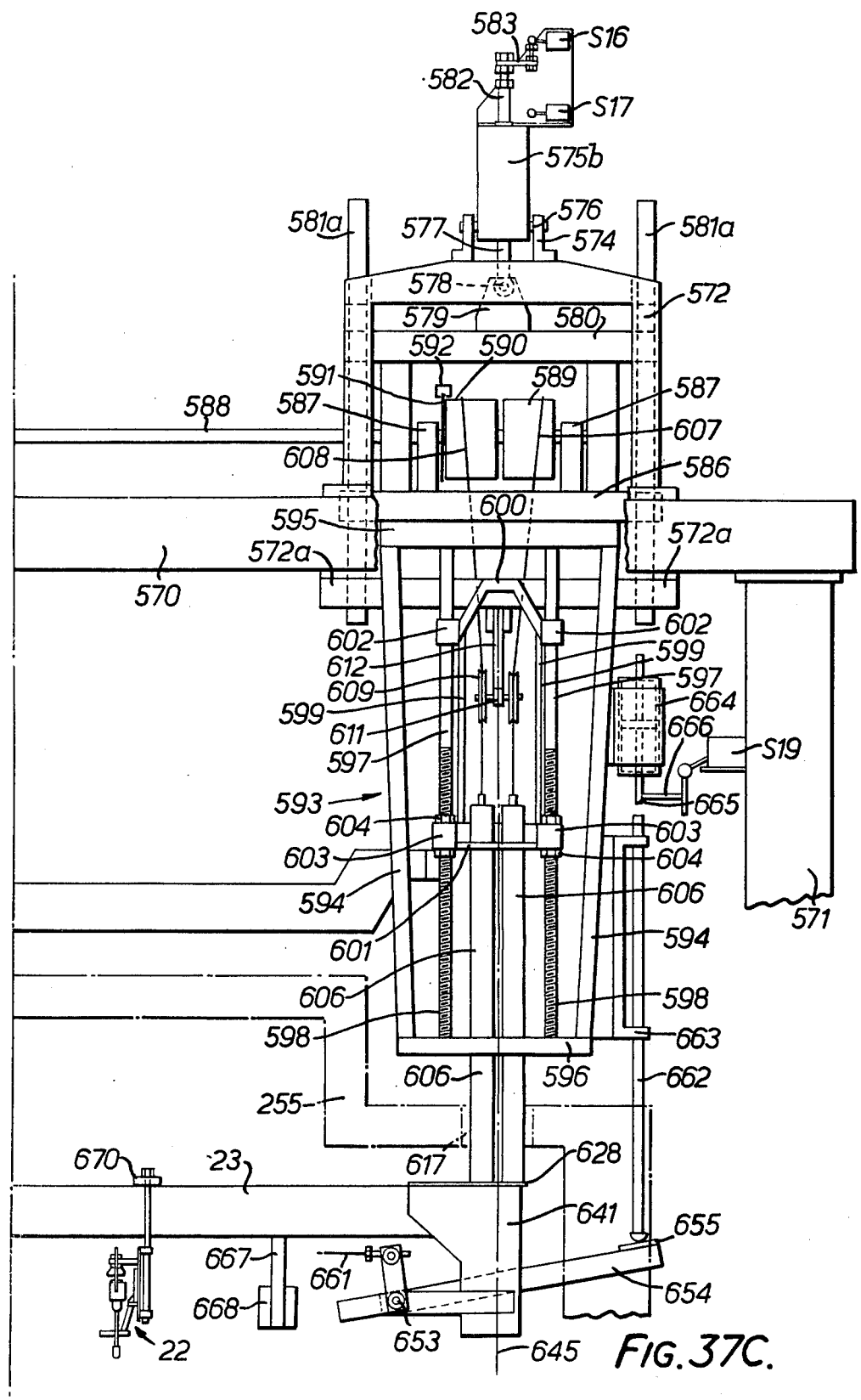

The tong bar 23 is a straight bar which is suspended from two hoists each of which is mounted on an overhead beam structure 570 which is supported on pillars 571 which structure straddles the tilting box as shown in FIG. 37. A hoist is provided for each end of the tong bar 23 and each hoist comprises a fixed head frame 572 which is an open cuboid structure including vertical supports and cross supports and having a cross head 573 on the upper surface of which are fixed trunnion brackets 574 in which the head of an hydraulic cylinder, respectively 575a and 575b is mounted by pivots 576. The piston rod 577 of the piston which is slidable in the cylinder 575 extends downwardly through the head of the cylinder and is pivotally linked at 578 to massive lugs 579 which are fixed to a cross head member 580 of a movable frame structure 581 also of open cuboid form which is movable vertically within the fixed head structure 572 by actuation of the cylinder 575. The movable frame structure is fixed to vertical shafts 581a which slide in bearings which are in lugs 572a on the head frame 572.

The piston rod 577 extends through the upper end of the cylinder as indicated at 582 and carries on its upper end a switch actuating member 583 which co-operates with two limit switches S16 and S17 are actuated when the piston in the cylinder 575 reaches the limits of its upward and downward movement which moves the frame 581 up and down within the fixed head frame 572.

The frame 581 includes a horizontal base structure 586 which provides a mounting for bearing brackets 587 which carry a shaft 588 on which are mounted two winding drums 589 and 590 both of which are coupled to the shaft 588 by a slipping clutch.

A brake disc 591 is also journalled to the shaft and braking caliper arms 592 are fixed to a support on the base structure 586. The calipers 592 co-operate with the disc 591 for braking the hoist drums as will be described.

Fixed below the movable frame 581 is a lower frame indicated generally at 593. The lower frame comprises four suspension girders 594 which extend downwardly from a frame 595 of the movable head 581. The lower end of each of the suspension girders 594 is fixed to a bottom plate 596. There are four girders 594 respectively fixed to the corners of the upper frame 595 and the bottom plate 596.

Two shafts 597, the lower parts of which are threaded as indicated at 598, extend between and are fixed to the upper frame 595 and the lower plate 596. The shafts 597 carry a centre frame which comprises two vertical members 599 which are joined at their upper ends by a bridge plate 600 and at their lower ends by a cross member 601. The centre frame is mounted on the shafts 597 by lugs 602 positioned at the ends of the bridge member 600 and which are fitted with bearing sleeves. The lugs 602 support the centre frame on the shafts 597 while permitting vertical movement of the centre frame relative to the shafts 597. Further lugs 603 are fixed to the lower ends of the side members 599 and are located on the threaded parts 598 of the rods 597 by means of nuts 604.

Adjustment of the nuts 604 adjusts the vertical position of the centre frame with respect to the frame 593 which is suspended beneath the movable frame structure 581.

Figure 38A:
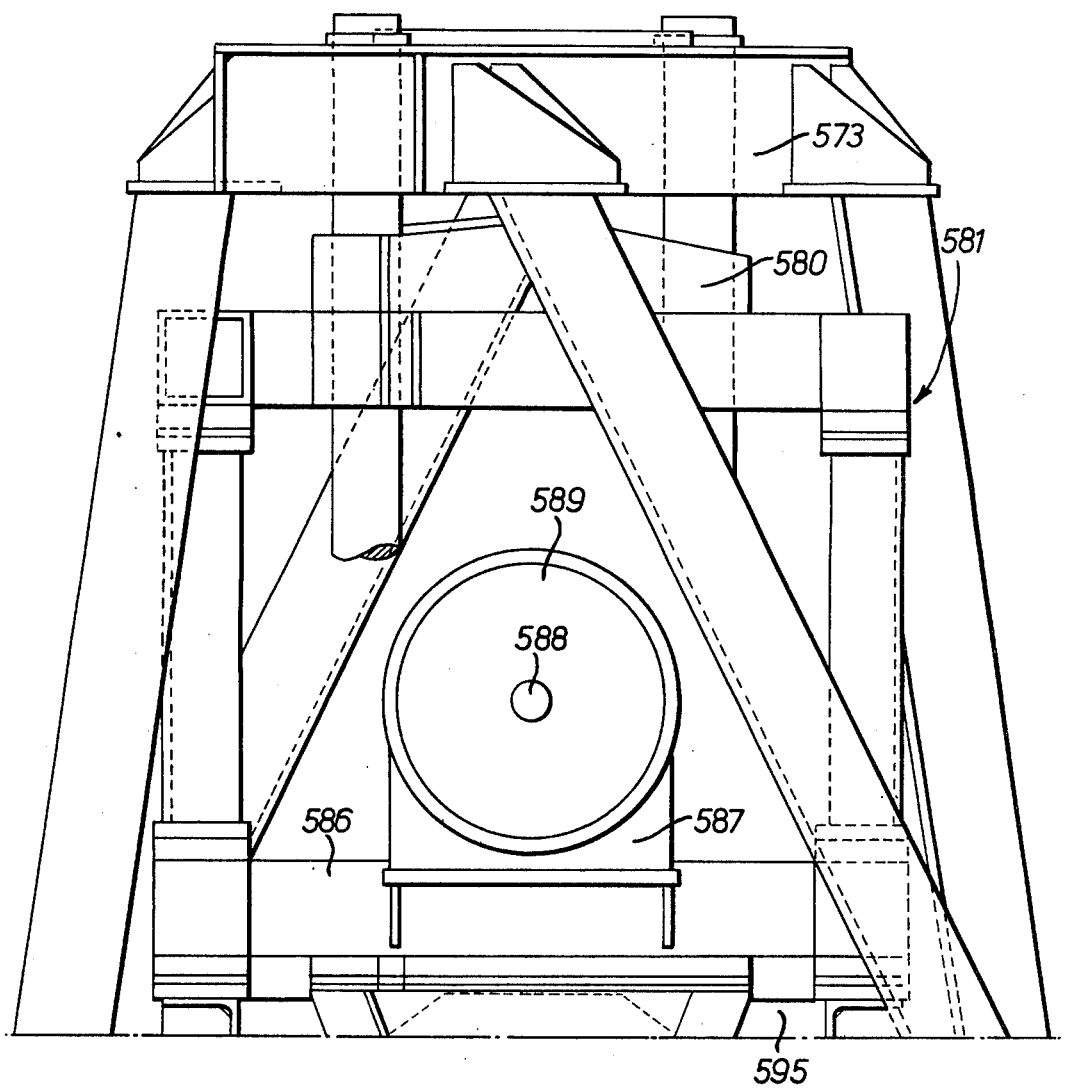

The centre frame carries two guide tubes 606 which serve to guide lifting cables 607 and 608 which are respectively wound on to the hoist drums 589 and 590. Both the cables 607 and 608 pass over jockey guide pulleys 609 which are mounted on spindles 610 supported on a mounting bar 611 which is suspended by struts 612 beneath the movable frame 581. The two jockey pulleys 689 are offset with respect to each other as shown in FIG. 38. The two tubes 606 are similarly offset so that the lower ends of the tubes can respectively engage the upper face of the tong bar 23 fixed to the upper frame 595 and the lower plate 596. The shafts 597 carry a centre frame which comprises two vertical members 599 which are joined at their upper ends by a bridge plate 600 and at their lower ends by a cross member 601. The centre frame is mounted on the shafts 597 by lugs 602 positioned at the ends of the bridge member 600 and which are fitted with bearing sleeves. The lugs 602 support the centre frame on the shafts 597 while permitting vertical movement of the centre frame relative to the shafts 597. Further lugs 603 are fixed to the lower ends of the side members 599 and are located on the threaded parts 598 of the rods 597 by means of nuts 604.

Adjustment of the nuts 604 adjusts the vertical position of the centre frame with respect to the frame 593 which is suspended beneath the movable frame structure 581.

The centre frame carries two guide tubes 606 which serve to guide lifting cables 607 and 608 which are respectively wound on to the hoist drums 589 and 590. Both the cables 607 and 608 pass over jockey guide pulleys 609 which are mounted on spindles 610 supported on a mounting bar 611 which is suspended by struts 612 beneath the movable frame 581. The two jockey pulleys 609 are offset with respect to each other as shown in FIG. 38. The two tubes 606 are similarly offset so that the lower ends of the tubes can respectively engage the upper face of the tong bar 23 near to the back and front edges of the upper face of the tong bar. The cables 607 are connected to the front edge of the tong bar 23 and the cables 608 are connected to the back edges of the tong bar.

Figure 38B:
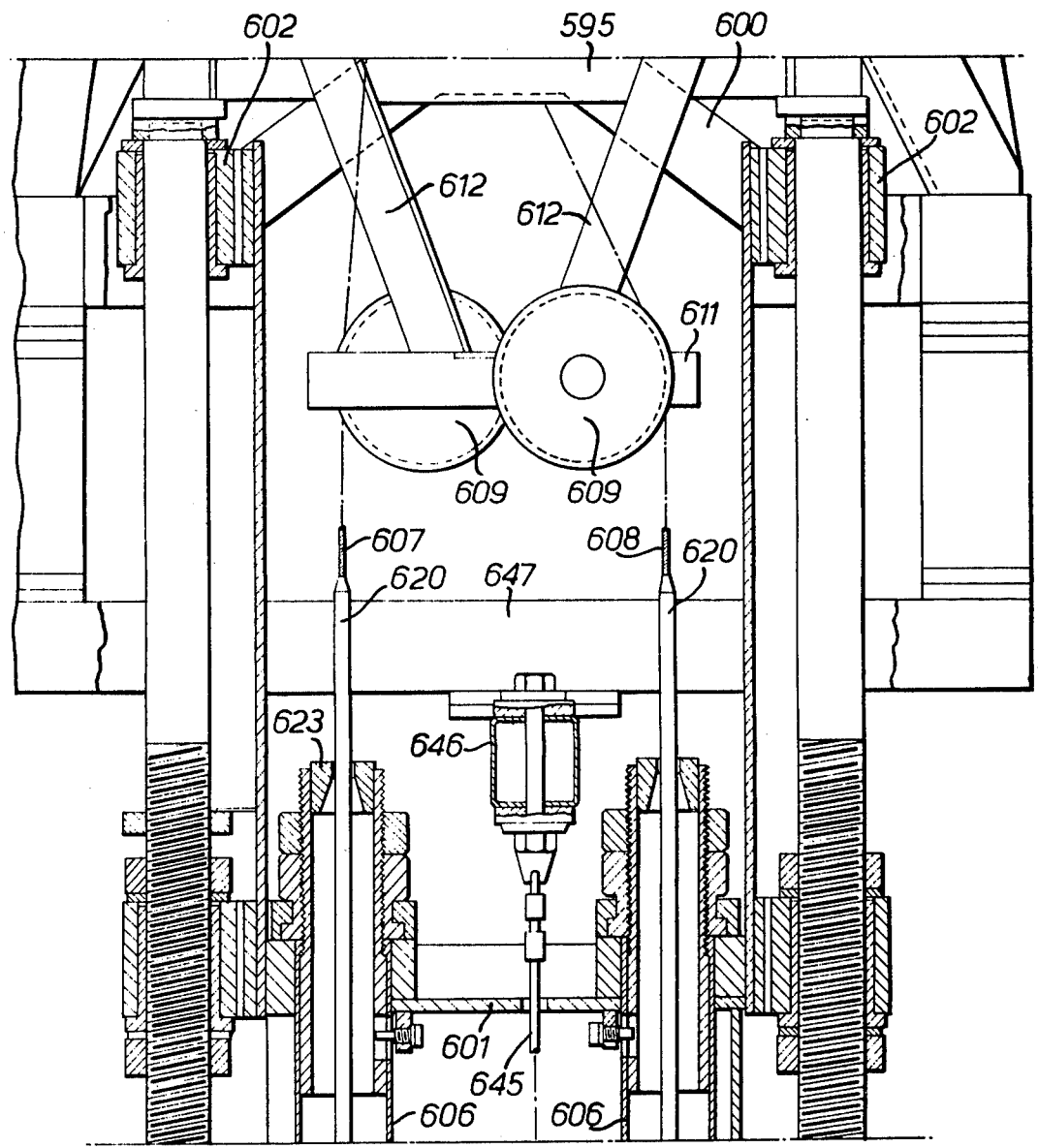

FIGS. 38B shows how the upper ends of the guide tubes 606 are fixed to the cross member 601 of the centre frame. The upper ends of the guide tubes 606 pass through apertures in the cross member 601 and are fixed to the cross member 601 by captive nuts. The guide tubes 606 pass through bearing bushes, not shown, fixed in the bottom plate 596 of the movable frame, to permit vertical adjustment of the guide tubes within the movable frame 593 when the position of the lugs 603 on the rods 597 is adjusted. In this way the vertical position of the centre frame with the guide tubes 606 is adjustable to accommodate the uppermost position and the lowered position of the tong bar 23 to suit different heights of the glass sheets being processed. Appropriate adjustment of the depth of the steps 255, 256 in the roof of the tilting box to accommodate these adjustments of the hoist mechanisms is also made as described with reference to FIG. 16.

The shaft 588 of the hoist drums 589 and 590 shown in FIG. 37A is connected by a flexible drive coupling 615 to an hydraulic drive motor 616 which is mounted on the cross beam 570 of the overhead support structure. The shaft is extended right along the top of the beam 570 to the right-hand hoist unit where it is supported in further bearing bushes 587 and has fixed to it the hoist cable drums 589 and 590 for the right-hand hoist unit for the tong bar 23 which is identical in every respect to the left-hand hoist unit.

The guide tubes 606 which are made of heat resisting stainless steel extend downwardly through glands 617 in the roof 254 of the tilting box and locate the upper face of the tong bar 23 which is suspended within the tilting box by the cables 607 and 608.

In the position illustrated in the drawing the pistons are retracted in the cylinders 575 so that the movable frames 581 are in their uppermost position retracted upwardly within the fixed frames 572 and the cables 607 and 608 are wound up on the drums 589 and 590 so that the upper face of the tong bar 23 is located against the lower end of the tubes 606 which are themselves in their uppermost position.

The lower parts of the lifting cables 607 and 608 are fitted with sleeves 620 which are located in bushings fitted in the upper and lower ends of the guide tubes 606. The tong bar 23 is fixed to the lower ends of the sleeves 620 and in the upwardly retracted position as illustrated the upper ends of the sleeves 620 project upwardly out of the upper ends of the guide tubes 606.

The location of the tong bar 23 in its raised position as illustrated is assisted by a roller 621 mounted on the back face of the tong bar 23 which roller engages in a guideway 622 which depends through the roof of the tilting box from the overhead beam 570.

In the upwardly retracted position of the tong bar which is illustrated the jaws of the tongs 22 are spaced above the position of the upper edge of the bending dies. The lowering of the tong bar to bring the tong jaws astride the upper edge of a bent glass sheet when it is held between the bending dies is effected by simultaneous actuation of the two cylinders 575 to push the movable frames 581 and 593 downwardly with the tong bar still tightened against the lower ends of the guide tubes 606 by the hoist cables 607 and 608. The whole of the movable hoist arrangement moves downwardly to reposition the tong bar 23 at a location where the open jaws of the tongs straddle the upper edge of the bent glass sheet held between the bending dies. The tongs are so located on the tong bar that they are lowered into the spaces between the sections 425, 426 and 427 of the female die, FIG. 25, and into corresponding recesses cut into the upper edge of the male bending die to accommodate the jaws of the tongs. As the tong bar is lowered the tongs are guided into exact location above the upper edges of the glass sheet.

Figure 38C:
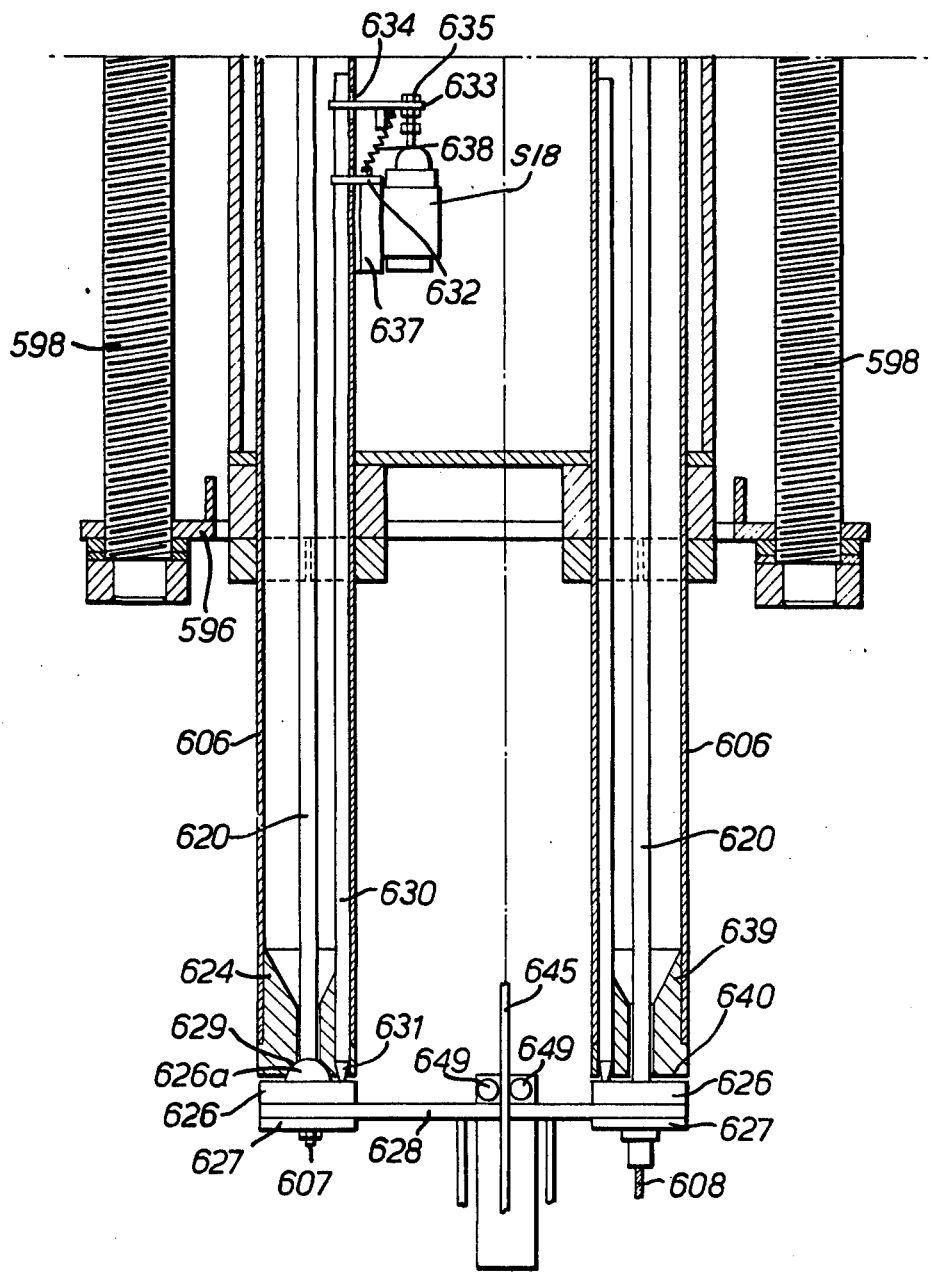

The guide tubes 606 through which the cables 607 and 608 pass are shown in detail in FIGS. 38B and 38C. The sleeve 620 which is fitted on the end of the cable 607 passes through a bush 623 welded into the top of the guide tube 606 and through a specially shaped bush 624 which is fitted into the bottom end of the guide tube.

The lower end of the cable sleeve 620 is welded to an upper adaptor plate 626 which rests on the upper face of a plate 628 of the tong bar and has a hemi-cylindrical boss 626a on its upper surface. The end of the cable 607 which projects from the lower end of the cable sleeve 620 passes through the plate 628 and through a lower adaptor plate 627 below the plate 628. A ferrule is welded to the lower end of the cable beneath the adaptor plate.

The lower face of the bushing 624 is formed with a surface 629 of inverted V-section which receives the hemi-cylindrical boss 626a of the upper adaptor plate 626 when the cable 607 is taut clamping the tong bar plate 628 against the bottom of the guide tubes.

A push rod 630 is housed in the guide tube 606, and extends through a vertical hole drilled in the bush 624. The lower pointed end 631 of the push rod rests on the upper face of the adaptor plate 626 when the tong bar is drawn against the guide tubes. The upper end of the push rod 630 is guided by a lug 632 inside the guide tube 606 and fixed to the rod 630 near its upper end is a radially extending striker arm 633 which passes through a slot 634 cut into the wall of the guide tube. An adjustable screw 635 on the arm 633 engages with a pressure-operated switch S18 which is mounted by a bracket 637 on the outside of the guide tube 606. When the tong bar is in its raised position as indicated in the drawings the rod 630 is pushed upwardly so that the screw 635 disengages from the switch S18. When the tong bar is lowered relative to the guide tube 606 the lower support for the pointed end 631 of the rod 630 falls away, the pin is pulled down by action of a spring 638 which connects the striker arm 633 to the bracket 637, and the switch S18 is operated to indicate that the tong bar is being lowered as the cables 607 and 608 unwind.

The other guide tube 606 through which the cable 608 is threaded has differently shaped bushing 639 fixed in the lower end of the guide tube 606 and extending below the tube end without a conically formed internal face, thereby providing a lower flat abutment face 640 against which the flat upper face of the adaptor plate 626 abuts when the tong bar plate 628 is drawn upwardly against the lower end of the guide tubes. The adaptor plate 627 for fixing the lower end of the cable 608 to the front edge of the tong bar plate 628 includes a cable clamp clamped to the end of the cable 608 beneath the tong bar. The clamp can be adjusted on the cable to permit adjustment of the angle of tilt of the tong bar by pivoting about the hemi-cylindrical boss 626a of the adaptor plate 626. This permits exact adjustment of the tong bar when the hoist mechanism is being set up.

Figure 40:
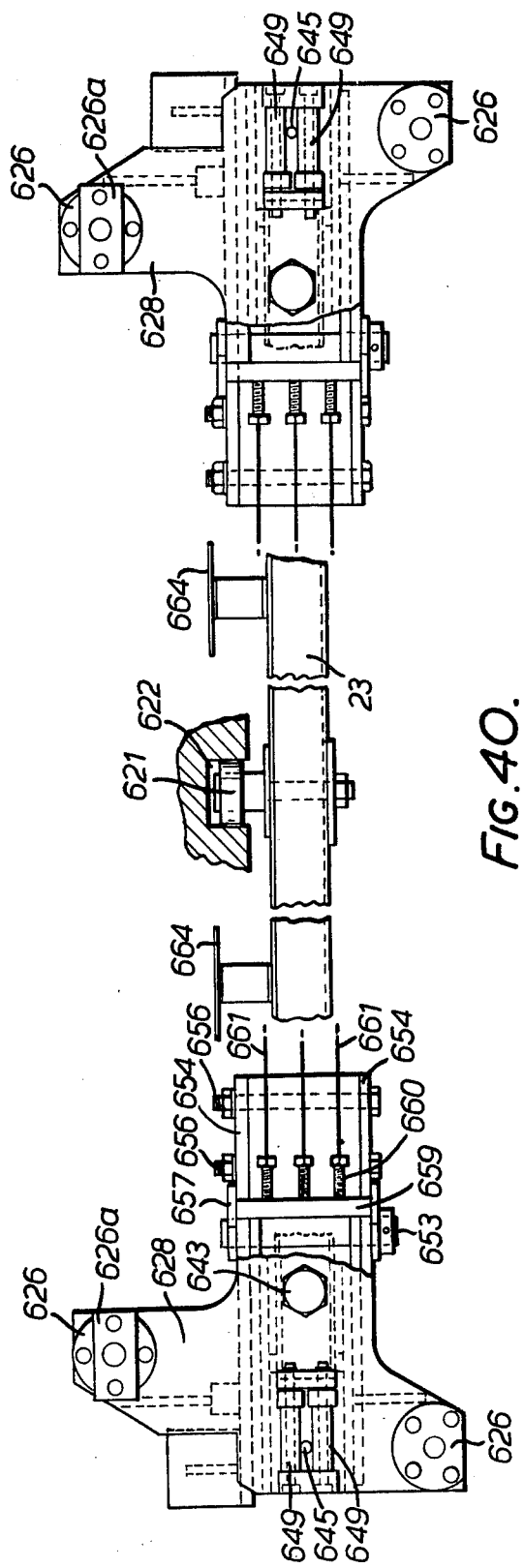
FIG. 40 is a plan view of the tong bar of FIG. 39.
Figure 41:
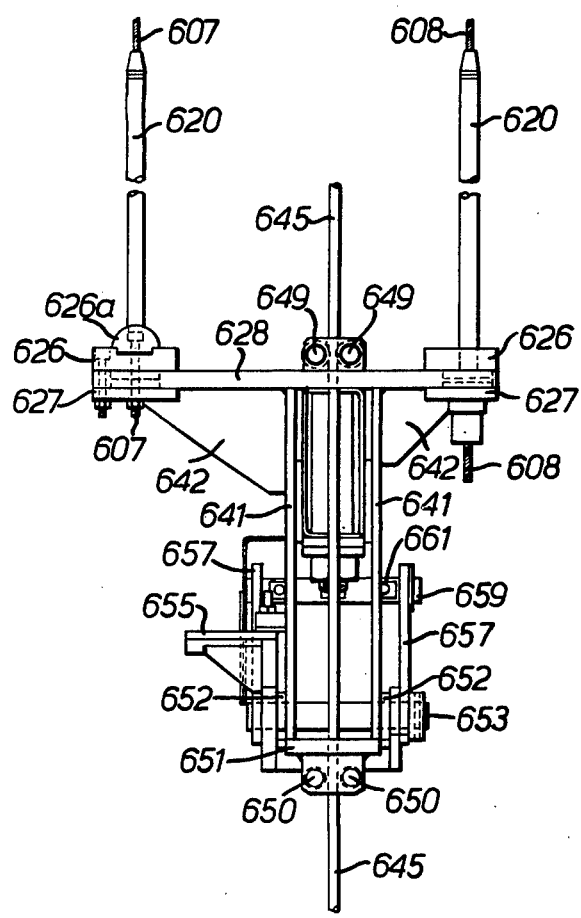
FIG. 41 is an end elevation of the tong bar of FIG. 39.

The tong bar 23 is a bar of rectangular cross-section as shown in FIGS. 39 to 41 and plates 628 are fixed to both ends of the bar. Each of the plates 628 is part of a bracket which also includes two side plates 641 which are welded to the top plate 628, being attached thereto by strengthening fins 642. The side plates 641 extend well below the tong bar 23, and the bracket is attached to the tong bar by a bolt 643 which extends vertically through the end of the tong bar and through the top plate 628.

FIGS. 40 and 41 shows that each top plate 628 has side extensions for fixing the adaptors 626, 627 which attach the ends of the hoist cables 607 and 608 to the plates 628.

The tong bar is steadied and guided during an upward and downward movement by means of two guide wires 645. The upper end of each of the guide wires 645 is held in a clamp 646, FIG. 38B, attached to a lower member 647 of the fixed head frame. The guide wires 645 extend vertically right through the tilting box and down the sides of the pit beneath the tilting box. At the bottom of the pit the lower end of each guide wire 645 passes beneath a guide pulley, not shown, which terminates in a shackle which is attached to the shaft of a hydraulic cylinder by means of which the wire 645 is maintained at a required tension.

Attached to each of the top plates 628 at the ends of the tong bar, there is a pair of rollers 649 extending parallel to the tong bar. The guide wires 645 passes between these rollers 649. Similar pairs of rollers 650 running on the guide wires are mounted on a cross plate 651 which is welded between the bottom ends of the two side plates 641 of the bracket.

At both ends of the tong bar there are welded to the side plates 641 near their lower end side extension plates 652 which extend inwardly of the tong bar and carry a pivot pin 653 on which is pivoted a frame comprising two side arms 654 which are pivoted on the ends of the pin 653 which project through the outside faces of the ends of the extension plates 652. One of the side arms 654 has a rearward extension which is fitted with a striker plate 655 to be engaged by a pusher rod for rocking the frame. The arms 654 are connected together at their outer ends by bolts 656 and fixed to each of the arms and extending at right angles thereto in the region of the pivot pin 653 are upstanding plates 657 the upper ends of which are connected by a rod 659 in which there engages screw clamps 660 in which there are clamped the ends of three actuator cables 661 which open and close three of the tongs. Three of the tongs are actuated from each end of the tong bar.

Each of the tongs is preferably constructed as described with reference to FIGS. 42 to 45, and the tong jaws close under the weight of sliding weights forming a part of the tong construction with the actuator cables 661 pulling the arms 654 to the position shown in FIG. 39.

Each of the striker plates 655 is engaged by a pusher rod 662, which, as shown in FIG. 37 is slidable in a bracket 663 fixed to one of the vertical members 594 positioned beneath a pneumatic cylinder 664 which is also fixed to the member 594 and whose downwardly extending ram 665 can, when extended, press the pusher rod 662 downwardly to engage the striker plate 655 and cause the arms 654 to rotate thereby tensioning the cables 661 and opening the tong jaws.

A striker plate 666 engages a limit switch S19 when the ram 665 is withdrawn into the cylinder and the tong jaws are closed. Identical pusher rod arrangements are provided associated with the two ends of the tong bar, each having a pneumatic cylinder 664 and limit switch S19.

Also mounted on the tong bar 23 near each end are downwardly depending bracket arms 667 carrying square metal plates 668 which are employed for sensing photoelectrically the location of the tong bar during its downward travel below the tilting box.

TONG AND TONG SUSPENSION

Six pairs of tongs 22 are suspended from the tong bar 23 and the suspension for the tongs is such that when a bent glass sheet is held between the dies, the tong bar descends with the tongs positioned with their jaws open to straddle accurately the upper edge of the bent glass sheet.

Each of the outermost tongs 22 is suspended in a tong gate which is pivoted on an arm 670 mounted at right angles to the tong bar which cantilevers the pivot out from the tong bar 23 towards the male die. The next innermost pair of tongs 22 are suspended in tong gates whose pivots are directly connected to the tong bar. The innermost tongs 22 are suspended in gates which are pivoted on the ends of the cantilever arms 672 which are cantilevered at right angles to the tong bar 23 backwardly towards the female die.

Referring to FIGS. 43 to 45, each tong gate comprises a vertical pivot rod 673 which is either bolted directly to the bottom of the tong bar 23 or is bolted to a cantilever arm as just described. The tong gates are thus brought more nearly into a location in which the tong jaws will overlie the upper edge of the bent glass sheet. For example, the tongs for gripping the upper edge of the sheet near the sides of a sheet bent to conform to the desired shape of a motor vehicle windscreen having sharp end curvature, may be cantilevered well out from the tong bar 23.

The pivot rod 673 is threaded at its upper end which is of reduced diameter as indicated in FIG. 43 which part of reduced diameter fits through vertically aligned bushes 674 which are welded to the upper and lower faces of the tong bar 23.

The tong gate which hinges on the vertical pivot rod 673 comprises a vertical plate member 675 which carries hinge plates 676 and 677 on its back face, respectively at the top and near the bottom of the plate.

Bearing sleeves 678 and 679 in the hinge plates pivot the plate member 675 on the pivot rod 673. The bearing sleeve 679 which is fitted in the lower hinge plate 677 has a lower annular flange 680 which bears against a collar 681 which is fitted on the pivot rod 673 below the bearing sleeve 679 thus locating the plate member 675 of the tong gate vertically on the rod 673. The collar 681 is fixed to the rod 673 by a dowel pin 682. A second collar 683 is fixed in position on the lower end of the rod 673, by a screw 684 engaging with an annular groove 685 around the lower end of the pivot rod 673.

A pin 686 extending transversely from the back face of the lower end of the plate member 675 of the tong gate engages with a slot 687 in the collar 683, which slot 687 is of greater arcuate length than the diameter of the pin 686 thus allowing the tong gate to hinge on the pivot rod 673 within limits defined by the arcuate length of the slot 687.

A support bar 688 for the upper end of the tongs is welded to and extends transversely from the upper end of the front face of the plate member 675. A support bar 689 for the lower end of the tongs is carried by a support structure including a plate 690 which is fixed to the front face of the plate member 675 of the tong gate by bolts 691 which extend through a longitudinal slot 692 in the plate member 675 and are screwed into a backing plate 693 positioned behind the plate member 675.

A bracket 694 is welded to the lower front face of the plate 690 and carries a downwardly extending leg 695, to the lower end of which the lower support bar 689 for the tongs is welded.

The tongs comprise a suspension member which has a tubular upper part 696 which is threaded at its upper end as indicated at 697 and is secured in an aperture in the upper support bar 688 of the tong gate by means of locking nuts 698.

A collar 699 is welded to the lower locking nut 698 and the tubular part 696 extends through a bore 700 in the collar. The bore 700 has a widened lower part 701, and the collar 699 has a lower flat abutment face 702.

Just below the collar 699 the tubular part 696 terminates in a tongue 703 which fits into a fork 704 at the upper end of a short link 705. The tongue 703 is coupled into the fork 704 by a pivot pin 706.

The lower end of the link 705 is formed as a tongue 707 which is at right angles to the tongue 703, and which engages in a fork 708 on the upper end of a bar 709 which constitutes the lower part of the suspension member. The tongue is coupled into the fork by a pivot pin 710 which is at right angles to the pin 706.

The bar 709 is thus linked to the upper part 696 of the suspension by means of a joint permitting swinging of the bar, and of the tongs carried on the bar, in two directions at right angles. Near its lower end the bar 709 passes freely through a slot-shaped aperture 689a in the support bar 689.

The tongs comprise a pair of straight tong arms 711 and 712 which are pivoted together by a pivot pin. The tong arm 711 is fitted with an inwardly extending bifurcated hinge bracket 713, FIG. 44, having two parallel arms 714, the tong arm 711 being welded or brazed in a slot in the hinge bracket 713.

The tong arm 712 is similarly welded or brazed in a slot in a bifurcated hinge bracket 715 which has two parallel arms 716, and the ends of the arms 714 extend outside and overlap the ends of the arms 716. The pivot pin 717 which pivotally connects the arms 711 and 712 together, passes through an aperture near the lower end of the bar 709 and through apertures in the arms 714 and 716, and is retained in position by means of stainless steel washers and co-operating split pins. The pivot pin 717 for the tong arms 711 and 712 is thus fixed in the vertical sense relative to the tong bar 23 and there is no vertical movement of the pivot pin 717 as the tong jaws are opened or closed.

The tong arms 711 and 712 extend below the brackets 713 and 715 to form the jaws of the tongs which jaws carry actually adjustable tong pins 711a and 712a of heat-resisting steel. The tong pins are screwed into threaded bushes 718 which are formed at the lower ends of the jaws and the pins are held in position by lock nuts.

The depth of penetration of the points of the tong pins 711a and 712a into the surfaces of the glass sheet 9 is determined by the settable stop bolt 719 which is screwed through an aperture in one of the tong jaws. The length of extension of the stop bolt 719 from one tong jaw towards the other sets the gap between the points of the tong pins 711a and 712a when the tongs are gripping the glass sheet 9.

In this embodiment the weighted slider includes a sleeve 720 which is slidable on the bar 709. A tubular weight 721 is clamped on the sleeve 720, the parts of the weight being joined by bolts 722 and being located by a dowel 723. The bolts 722 clamp the two parts of the weight to the sleeve.

The bore through the sleeves 720 has a widened upper part 724 which surrounds the articulated link 705 when the sleeve and weight are in their lowermost position to permit movement of the joint about both pivot pins 706 and 710.

An inverted U-shaped strap 725 is welded at its lower ends to the outer surface of the tubular weight 721 and the multistrand cable 661 for opening the tongs is attached to the top of the strap. The cable is threaded through a guide tube 727 which is attached to the bottom of the tong bar 23.

When the cable is tensioned to open the tong jaws the weight 721 is raised until the upper face 728 of a radial flange 729 on the upper end of the sleeve 720 abuts against the lower face 702 of the fixed collar 699. In this position the sleeve 720 fits closely around the articulated link 705 so that the suspension bar 709 is effectively locked solid with the fixed upper tubular part 696 of the suspension.

The suspension member is thus rigid when the tong jaws are opened and the tongs are being located over the upper edge of a glass sheet, but is free to move relative to its fixed suspension when the tong jaws are closed on to the sheet, while the spacing of the pivot 717 of the tongs from the fixed suspension does not vary.

The upper end of the tong arm 711 is freely pivoted to a bifurcated tong link 730 which is formed with two parallel arms 731 which extend inwardly. A pivot pin 732 extends through the tong link 730 and the upper end of the tong arm 711 is freely pivoted on the pin 732 which is retained in position by means of stainless steel washers with co-operating split pins.

At its upper end the tong arm 712 is freely pivoted on a pivot pin 733 between two spacer washers 734. Also freely pivoted on the ends of the pivot pin 733 on either side of the washers 734 are two tong links 735. The assembly of the tong arm 712, the spacer washers 734 and tong links 735 is held together by stainless steel washers on the ends of the pivot pin 733 with co-operating split pins which pass through holes at the ends of the pivot pin 733. The tong links 735 are bent outwardly and fit over the ends of the parallel arms 731 of the tong link 730. Pivot pins 736 are fixed to the lower ends of straps 737 which are welded to the outer surface of the weight 721, which pins 736 fit through holes in the ends of the arms 731 and through aligned holes in the ends of the tong links 735. The inner ends of the pivot pins 736 extend into vertical slots formed in the lower end of the sleeve 720.

With the tong bar 23 in its raised position and the glass sheet 9 held between the male and female bending dies which are still closed position on the bent glass sheet, the tongs are opened by tensioning each cable 661 to raise the weight 721 and sleeve 720 on the bar 709 of the suspension member and thereby raise the tong link pivot pins 736 causing the tong jaws to open and locking the bar 709 to the member 696.

The tong bar is then lowered until the tongs are in position with the open jaws astride the upper edge of the glass sheet 9 and the cable 661 is slackened which allows the weight to drop. This pushes the tong link pivot pins 736 downwardly so that the tong jaws close pressing the points of the tong pins 711a and 712a against the surfaces of the glass sheet. When the bending dies are withdrawn the hot bent glass sheet is suspended vertically from the tongs, and the bending dies can be opened and the suspended glass sheet lowered by operating the hoist motor 616.

The articulated joint constituted by the link 705 and its two pivots at right angles permits small swinging movement of the tongs in two directions at right angles, limited by the dimensions of the slot 689a so that the tong points can swing somewhat relative to the fixed upper parts of the tong suspension to accommodate expansions and contractions of the suspended glass sheet during further processing by reheating and quenching by immersion in a chilling liquid.

TONG GUIDING MEANS

Means for guiding the tongs into exact location with the tong jaws straddling the upper edge of the glass sheet as the tong bar 23 is lowered is shown in FIGS. 30 and 42. As the tong bar is lowered the tongs first engage tong guiding means indicated generally at 750 mounted on the upper member 429 of the base frame which carries the female die sections. There are six such tong guiding means on the base frame of the female die spaced along the member 429.

As the tong bar is lowered each of the tong gates first engages the tong guiding means 750 causing the tong gate to pivot about its pivot rod 673 so as to bring the tong jaws to the vicinity of their required exact location. As lowering of the tongs continues the tong gates engage against further tong guiding means indicated generally at 751 mounted on the upper edge of the male die. The tong guiding means at 751 is somewhat lower than the guiding means 750 on the female die and effects final adjustment of the positions of the tong gates to bring all the tong jaws exactly over the upper edge of the bent glass sheet as the lowering of the tongs is completed with the tong jaws passing downwardly between the upper sections of the female die and into recesses cut along the upper edge of the male die.

Each of the tong guiding means 750 mounted on the female die includes a bar 752 which is mounted from the upper member 429 of the base frame of the female die by legs 753 which are welded to the upper edge of the member 429 of the base frame and to the bar 752. A bracket 754 is welded to the upper face of the bar 752 and an intermediate support bracket 755 is welded to the bracket 754 and carries a cylindrical housing 756 which is fitted with a shaft 757. The intermediate support bracket 755 has a side flange 758 which is drilled to accommodate the cylindrical housing 756 which housing has an end flange 759 which is attached to the side flange 758 by bolts 760.

A support strut 767 extending perpendicularly from the side flange 758 of the bracket 755 engages in a vertically disposed slot 768 in a plate member 769 which has a boss 770 on its back face into which the end of the shaft 757 fits.

The plate 769 carries on its lower part a tong guide member comprising a support block 772 which carries the guide block 773 whose outer face is shaped with a downwardly sloping part 774 which is inclined inwardly towards the axis of the tongs leading into a lower vertical part 775 parallel to the axis of the tongs.

Swinging of the tong gate into position is through the agency of pusher members 776 and 777 which are screwed into holes in an extension 778 of the bottom support bar 689 of the tong gate.

The pusher member 776 has a domed head 779 which engages with the sloping surface 774 of the tong guide block 773 as the tongs are lowered.

The tong guides on the male die are similarly mounted as illustrated at the right-hand side of FIG. 30 and each includes a guide block 780 having a shaped face the upper part 781 of which is downwardly inclined and inwardly sloping towards the axis of the tongs and the lower part 782 of which is vertical and parallel to the axis of the tongs. The pusher member 777 on the tong gate has a domed head 783 which bears on the surface at 781 and 782 as the tong bar is lowered.

The mounting brackets for the tong guides attached to the male die are indicated at 784 and are of somewhat different construction to match the construction of the male die, being welded to a back frame 493 of the male die.

The guide blocks 773 attached to the female die are mounted higher than the guide blocks 780 attached to the male die and the relative position of the blocks is such that the domed heads 783 of the pusher members 777 do not engage the vertical surfaces 782 of the male die guide blocks until the domed heads 779 of the pusher members 776 having moved off the vertical surfaces 775 of the female die guide blocks 773. This avoids any possibility of jamming of the pusher members and the tong gate between the tong guide means.

In operation with the pusher rods 662 held down by extension of the rams 665 from their cylinders 664, FIG. 31, the cables 661 are tensioned and maintain the jaws of the tongs open as the tong bar is lowered, and the heads 779 of all the pusher members 776 on the six tong gates engaged with the inclined guide faces 774 of their respective guide blocks carried by the female die.

As the lowering of the tong bar 23 continues by operation of the cylinders 575 the heads 779 of the pusher members 776 ride down the upper inclined guide faces 774 causing the tong gates to swing to bring the tong jaws to approximate alignment above the upper edge of the glass sheet.

If any degree of misalignment remains the heads 783 of the pusher members 777 will, during further downward movement of the tong bar, engage the inclined surfaces 781 of the male die guide blocks 780 until the heads 783 ride on the vertical faces 782 bringing the tongs into final and exact alignment with the open tong pins 711a and 712a exactly straddling the upper edge of the bent glass sheet.

When the lower position of the tong bar 23 is reached, that is the lower position of the pistons in the cylinders 576, the cables 661 are relaxed and the jaws close onto the glass sheet.

The male and female bending dies, which are at the temperature of their environment within the tilting box which is maintained as nearly as possible the same as that of the glass sheet leaving the furnace, remain closed on the sheet for the period of, for example, 5 seconds, during which period bending stresses which are induced in the glass by the bending operation are permitted to relax and thermal inhomogeneities within the glass are reduced due to the contact of the glass with the hot bending dies. When the tongs grip the upper edge of the glass sheet the lifting fingers are lowered, and retraction of the female die begins and the bent glass sheet, suspended from the tongs, is still in contact with the continuous surface of the male die.

The valve 501, FIG. 31, is opened and air puffed through the perforations 491 in the male die releases the bent sheet from the male die surface, and retraction of the male die begins.

The bent glass sheet is now freely suspended vertically from the tongs and the lowering of the glass sheet for further processing commences. The rocking of the box back to its tilted position begins, ready for receiving the next sheet to be bent, and the retraction of male and female dies to their initial positions is completed.

BOOST HEATING

The temperature to which the glass sheet is heated during its advance through the furnace which temperature is related to the time of heating of the glass in the furnace so as to heat the glass without unacceptable deformation as it relaxes against the upright rollers of the furnace, is also the temperature at which the glass is bent and this temperature in the range 580° to 650°, e.g., 610°C is the temperature of the bent sheet of glass released from the bending dies and suspended by the tongs within the tilting box.

It is often desirable, particularly when producing a high strength glass sheet, that the initial temperature of a glass sheet before toughening should be greater than the bending temperature, e.g., 690°C and prior to the quenching of the sheet in the tank 26 of quenching liquid, the sheet, as it is lowered, passes between boost heaters which heat the sheet to a higher initial temperature from which it undergoes a preliminary surface cooling prior to immersion in the chilling liquid.

After bending of the glass, the rams 577 in the cylinders 575 of the hoists are extended downwardly so that the movable frames 593 are at their lowermost position relative to the fixed head frames. Further lowering of the tong bar during continued processing of the glass takes place by operation of the hoist motor 616 which, through the flexible drive 615, drives the shaft 588 and the cable drums 589 and 590 to unwind the cables 607 and 608 which suspend both ends of the tong bar. Vertical descent of the tong bar along the guide wires 645 commences and the glass passes between the two banks of boost heaters 27, FIG. 1, which are shown in more detail in FIG. 46. The top of the boost heaters 27 is about 60 cm below the bottom edges of the dies, and the boost heater panels are 100 cm deep.

The banks of boost heaters each comprises a refractory panel 790 which carries a pattern of heating elements 27. The refractory panels 790 form walls of an elongated chamber having an open entrance mouth 791 lying below the exit mouth 269 from the tilting box. Sealing asbestos curtains 792 hang downwardly from the sides of the elongated mouth 269 against members defining the mouth 791 into the refractory boost heating assembly. The refractory panels are fixed vertically and the flexible asbestos curtains 792 provide a flexible seal between the mouth 269 of the tilting box and the fixed entrance mouth 791.

Each of the refractory panels has a metal support backing structure 793. The heater elements 27 are in the form of wire wound elements on ceramic tubes which are mounted on steel connector rods 794 which are fixed through the refractory panels 790 and are mounted in insulators held by the metal backing structure 793.

The electrical supplies to the boost heater elements 27 are such as to maintain the heater elements at a temperature in the range 750°C to 1,600°C, for example 1,000°C to 1,200°C. During the downward passage of the bent glass sheet between the heaters the glass may be heated to 60°C or more above the temperature at which it leaves the bending dies, for example the glass at 620°C may be heated to a pre-quenching temperature of 680°C.

If the glass passes downwardly at uniform speed between the heater elements it is heated substantially uniformly throughout its thickness. The surface temperature may be raised slightly higher than that of the core of the glass but at worst a temperature difference of about 12°C is produced between the surfaces and the core of the glass.

Alternatively, and in order to heat the lower edge of the glass sheet to a higher temperature than the upper edge of the glass sheet, the glass may be accelerated when the lower edge of the glass sheet is at the level of the bottom of the heater panels for example, from a lowering hoist speed of 150 mm/sec. to a lowering speed of 300 mm/sec. The heating time for the upper part of the glass sheet between the boost heater panels is therefore less and so, while each part of the glass sheet is heated so that there is substantially no temperature gradient through its thickness or at most about 12°C as just described, a linear temperature gradient is set up from a high temperature of for example, 700°C at the lower edge of the bent glass sheet to a lower temperature of for example, 680°C at the upper edge of the glass sheet as it passes between the bottom of the boost heaters 27 to a pre-cooling stage prior to quenching in the oil tank 26.

The control equipment to be described permits the setting up of a selected velocity profile for the hoist motor 616 from initiation of its operation to the time the hot bent sheet of glass is brought to rest in the quench tank.

A maximum lowering speed of 100 cm/sec. can be achieved, and some further examples will be given.

Some more detailed examples of operation will now be given in Table IX which gives the temperature at which the glass is bent as well as times between the boost heaters to heat the glass to a desired prequenching temperature and values of hoist speed necessary to achieve the desired temperature.

TABLE IX

| Thickness mm | Temp. °C | Furnace Temperature °C | Temperature °C | in Boost Heat (seconds) | Speed in/sec. |
|---|---|---|---|---|---|
| 2.0 | 580 | 750 | 630 | 15 | 1.8 |
| 2.0 | 580 | 750 | 650 | 22 | 1.6 |
| 2.0 | 620 | 750 | 630 | 3.0 | 12.0 |
| 2.0 | 580 | 1000 | 630 | 4.0 | 9.0 |
| 2.0 | 580 | 1000 | 720 | 12.6 | 2.8 |
| 2.0 | 620 | 1000 | 720 | 9.3 | 3.9 |
| 2.0 | 580 | 1600 | 720 | 2.8 | 1.3 |
| 2.0 | 620 | 1600 | 720 | 2.1 | 17.0 |
| 3.0 | 580 | 750 | 630 | 20 | 1.8 |
| 3.0 | 580 | 750 | 650 | 30 | 1.2 |
| 3.0 | 620 | 750 | 630 | 5 | 7.2 |
| 3.0 | 620 | 750 | 680 | 35 | 1.0 |
| 3.0 | 580 | 1000 | 630 | 5.6 | 6.4 |
| 3.0 | 580 | 1000 | 720 | 17.3 | 2.1 |
| 3.0 | 620 | 1000 | 720 | 12.9 | 2.8 |
| 3.0 | 580 | 1600 | 630 | 1.3 | 28.0 |
| 3.0 | 580 | 1600 | 720 | 3.9 | 9.0 |
| 3.0 | 620 | 1600 | 720 | 2.9 | 12.4 |
| 4.0 | 580 | 750 | 630 | 26.3 | 1.4 |
| 4.0 | 620 | 750 | 630 | 6.3 | 5.7 |
| 4.0 | 650 | 750 | 670 | 16 | 2.3 |
| 4.0 | 580 | 1000 | 630 | 7.2 | 5.0 |
| 4.0 | 580 | 1000 | 720 | 22.2 | 1.6 |
| 4.0 | 620 | 1000 | 630 | 1.4 | 25.7 |
| 4.0 | 620 | 1000 | 720 | 16.6 | 2.2 |
| 4.0 | 650 | 1000 | 680 | 5.0 | 7.2 |
| 4.0 | 650 | 1000 | 720 | 12.0 | 3.0 |
| 4.0 | 580 | 1600 | 630 | 1.7 | 21.2 |
| 4.0 | 580 | 1600 | 720 | 7.9 | 7.4 |
| 4.0 | 620 | 1600 | 720 | 3.62 | 9.9 |
| 4.0 | 650 | 1600 | 720 | 2.6 | 14.0 |

Some further examples of operation are given in Tables X, XI and XII which show the production of a linear temperature gradient of from 10°C to 30°C from a higher temperature of the lower edge of the sheet to a lower temperature of the upper edge of the sheet. These tables are based on a glass sheet 25 cm in height, the acceleration of which takes place from the initial speed to the final speed when the lower edge of the glass sheet has reached the bottom of the furnace. The hoist speed gives the approximate transit times of the top and bottom edges of the glass sheet between the boost heaters.

PRE COOLING STAGE

The two blowing boxes 28 are each elongated boxes which extend from side to side of the pit below the boost heaters. Each of the boxes 28 with its nozzles 29 extending from the front face of the box is mounted on side wheels 800, FIG. 47, which run on tracks 801 which extend longitudinally along the side walls of the pit. Each of the blowing boxes 28 is connected by a duct 802 to a centrifugal blower 803 mounted near one

TABLE X

Glass Thickness 2.0 mm

| Bending Temp. °C | Boost Heat Furnace Temp. °C | Final Glass Temperature °C | | Gradient °C | Times in Boost Heat Seconds | | Hoist Speed in/sec. | |
|---|---|---|---|---|---|---|---|---|
| | | Bottom Edge | Top Edge | | Bottom Edge | Top Edge | Initial | Final |
| 580 | 750 | 630 | 620 | 10 | 15 | 11 | 2.4 | 4.0 |
| 580 | 750 | 650 | 620 | 30 | 22 | 11 | 1.6 | 6.5 |
| 580 | 1000 | 630 | 620 | 10 | 4.0 | 3.2 | 9.0 | 13.0 |
| 580 | 1000 | 720 | 690 | 30 | 12.6 | 9.4 | 2.9 | 4.6 |
| 580 | 1600 | 720 | 690 | 30 | 2.8 | 2.2 | 13 | 19 |
| 620 | 750 | 680 | 650 | 30 | 25 | 11 | 1.44 | 9 |
| 620 | 1000 | 720 | 710 | 10 | 9.3 | 8.3 | 3.9 | 4.6 |
| 620 | 1000 | 720 | 690 | 30 | 9.3 | 6.3 | 3.9 | 7.5 |
| 620 | 1600 | 720 | 710 | 10 | 2.1 | 1.8 | 17 | 22 |

TABLE XI

Glass Thickness 3.0 mm

| Bending Temp. °C | Boost Heat Furnace Temp. °C | Final Glass Temperature °C | | Gradient °C | Time in Boost Heat seconds | | Hoist Speed in/sec. | |
|---|---|---|---|---|---|---|---|---|
| | | Bottom Edge | Top Edge | | Bottom Edge | Top Edge | Initial | Final |
| 580 | 750 | 630 | 620 | 10 | 20 | 15 | 1.8 | 2.9 |
| 580 | 1000 | 630 | 620 | 10 | 5.6 | 4.5 | 6.4 | 9.0 |
| 580 | 1000 | 720 | 690 | 30 | 17.3 | 13.1 | 2.1 | 3.3 |
| 580 | 1600 | 680 | 670 | 10 | 2.7 | 2.5 | 13.3 | 15.0 |
| 580 | 1600 | 720 | 690 | 30 | 3.9 | 3.0 | 9.2 | 14.0 |
| 620 | 750 | 540 | 630 | 10 | 10 | 5.0 | 3.6 | 14.4 |
| 620 | 750 | 680 | 650 | 30 | 35 | 15 | 1.0 | 7.2 |
| 620 | 1000 | 660 | 650 | 10 | 5 | 3.6 | 7.2 | 12.4 |
| 620 | 1000 | 720 | 690 | 30 | 12.9 | 8.7 | 2.8 | 5.5 |
| 620 | 1600 | 680 | 670 | 10 | 1.7 | 1.4 | 21.2 | 29.0 |
| 620 | 1600 | 720 | 690 | 30 | 2.9 | 2.0 | 12.4 | 23.2 |

TABLE XII

Glass Thickness 4.0 mm

| Bending Temp. °C | Boost Heat Furnace Temp. °C | Final Glass Temperature °C | | Gradient °C | Time in Boost Heat seconds | | Hoist Speed in/sec. | |
|---|---|---|---|---|---|---|---|---|
| | | Bottom Edge | Top Edge | | Bottom Edge | Top Edge | Initial | Final |
| 580 | 750 | 630 | 620 | 10 | 26.3 | 20 | 1.4 | 2.1 |
| 580 | 750 | 650 | 620 | 30 | 40 | 20 | 0.9 | 3.6 |
| 580 | 1000 | 630 | 620 | 10 | 7.2 | 5.7 | 5.0 | 7.3 |
| 580 | 1000 | 720 | 690 | 30 | 22.2 | 16.9 | 1.6 | 2.5 |
| 580 | 1600 | 660 | 650 | 10 | 2.8 | 2.4 | 12.8 | 16.4 |
| 580 | 1600 | 720 | 690 | 30 | 4.9 | 3.9 | 7.4 | 10.4 |
| 620 | 750 | 640 | 630 | 10 | 12.5 | 6.3 | 2.9 | 11.2 |
| 620 | 750 | 680 | 650 | 30 | 45 | 20 | 0.8 | 4.8 |
| 620 | 1000 | 660 | 650 | 10 | 6.2 | 4.6 | 5.8 | 9.0 |
| 620 | 1000 | 720 | 690 | 30 | 16.6 | 11.2 | 2.24 | 4.2 |
| 620 | 1600 | 720 | 690 | 30 | 3.62 | 2.5 | 10.0 | 19.0 |
| 650 | 750 | 670 | 660 | 10 | 16 | 7.5 | 2.25 | 11.1 |
| 650 | 1000 | 720 | 690 | 30 | 12 | 6.8 | 3.0 | 8.6 | of the end walls of the pit and each of the blowing boxes 28 has an individual supply from its own centrifugal blower 803 at a pressure of 38 cm water gauge. The wheels 800 are the wheels of carriages on which the blowing boxes and their connection ducts are mounted and the blowing boxes can be moved in an out on the tracks 801 to adjust the spacing of the ends of the nozzles 29 from the path taken by the hot bent glass sheet as it is lowered through the bottom of the boost heater elements. A usual separation of the ends of the nozzles is 10.5 cm. The front faces of the blowing boxes 28 may be flat as shown in the drawing or may be curved to a shape nearly matching that of the bent glass sheets which are to be pre-cooled by cooling air directed from the blowing boxes.

The faces of the boxes are in one embodiment 22 cm. The nozzle orifices are 3 mm in diameter and there are arranged in a "DOMINO 5" pattern with a pitch of 18 mm. The nozzles are staggered so that they do not face each other across the interspace through which the glass is lowered.

Figure 47:
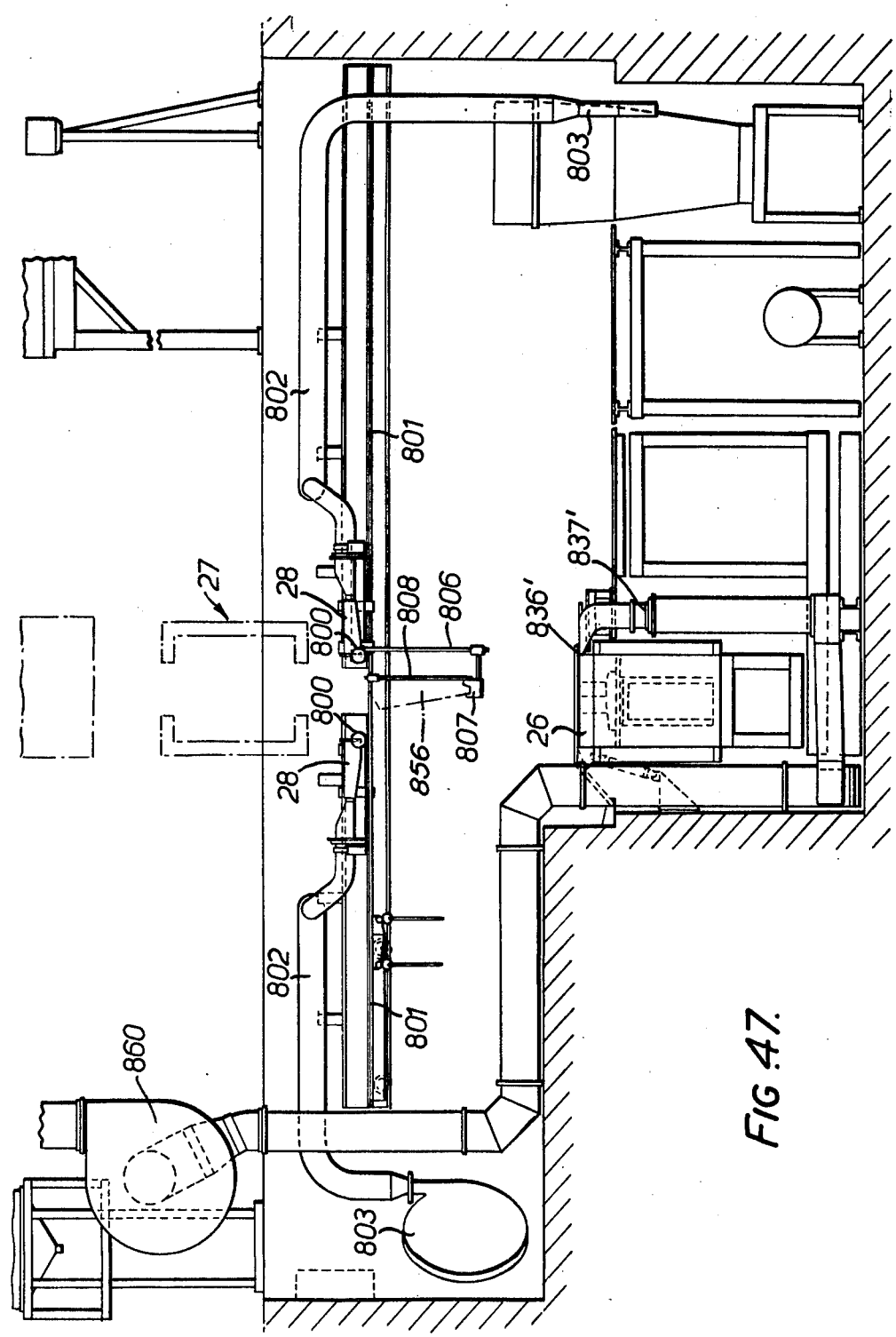
FIG. 47 is a generalised sectional view through the lower part of the pit below the tilting box showing a precooling stage and a tank of chilling liquid in more detail.

Attached to the carriage for the right hand blowing box 28 as shown in FIG. 47 is a downwardly depending frame 806 which carries at its lower end support shoes 807 onto which the hot glass sheet is lowered. The shoes 807 extend right across the lowering path of the glass and are steadied by stays 808 which are clamped to the track 801 when the blowing box is in desired location. The frame 806 and the stays 808 are sufficiently long to ensure that when the bottom edge of the glass rests in the shoes 807 the upper edge of the glass is just below the bottom nozzles of the blowing boxes.

The supply of cooling air to the boxes 28 is regulated so that the surfaces of the reheated glass are cooled by, for example 50°C while the core of the glass thickness does not cool appreciably below the pre-quenching temperature achieved by reheating by the boost heaters. In this way temperature gradients of about 50°C exists from the core to the surfaces of the glass as the glass leaves the ambience of the cooling air supplied through the nozzles 29 and the glass is then immediately quenched in the quench tank 26.

QUENCH TANK

Figure 49:
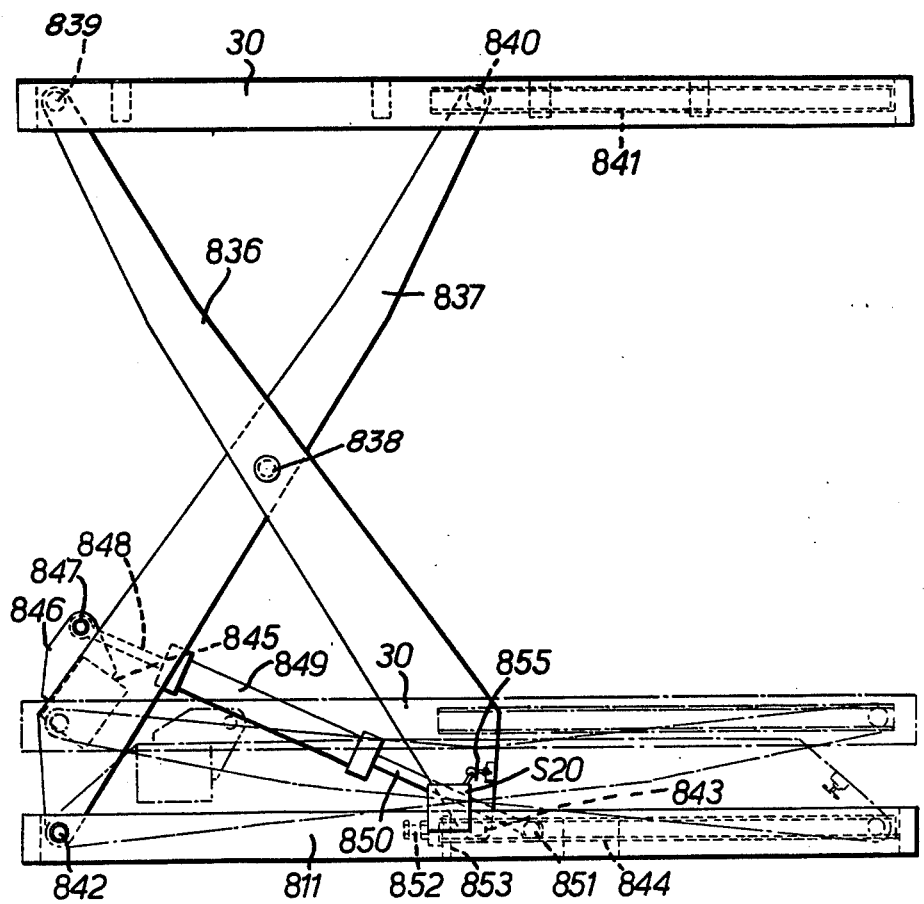
FIG. 49 is a side elevation illustrating the construction of a scissors-lift table supporting the quench tank of FIG. 48.
Figure 48:
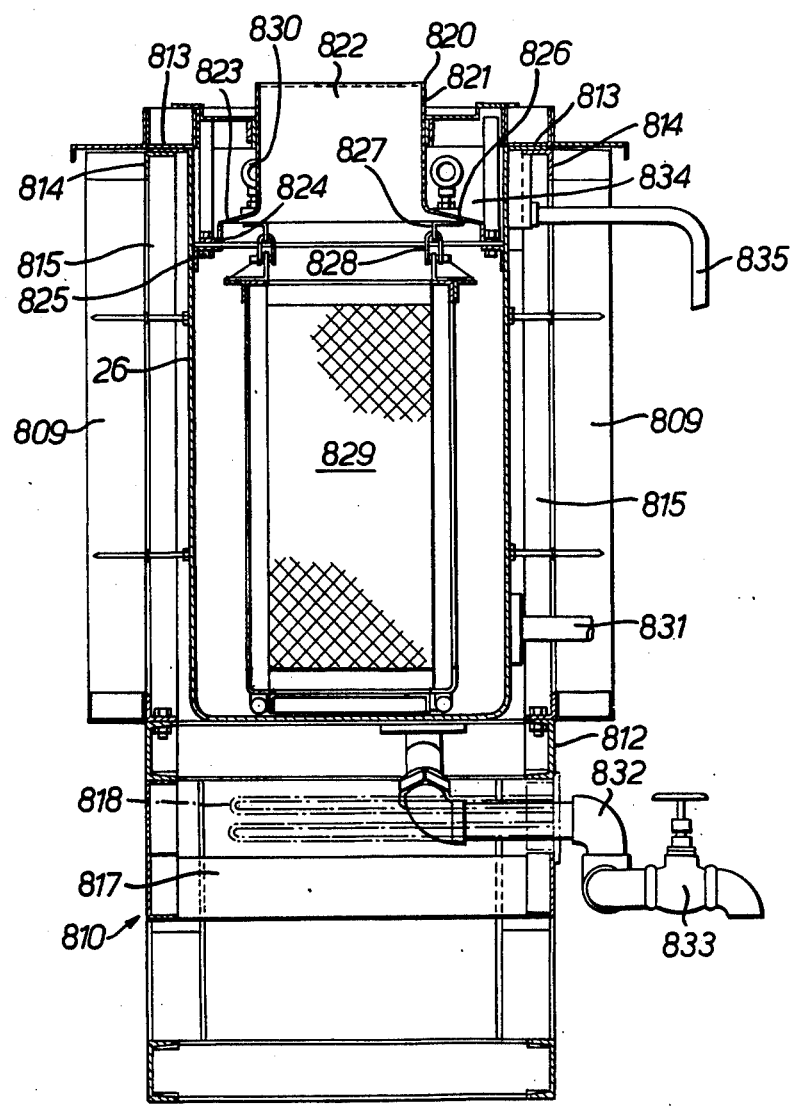
FIG. 48 illustrates the quench tank 47 of FIG. 47 in greater detail.

The quenching tank 26 is illustrated diagrammatically in FIG. 47 and in more detail in FIG. 48. The tank contains a body of chilling liquid maintained for example at 240°C, and is surrounded by thermal insulation 809. The tank 26 is seated on a table 810 which stands on the lifting platform 30 which is the upper platform of a scissors-lift table which comprises a lower platform 811 and scissor links between the two platforms as shown in FIG. 49. The table is operated hydraulically and lifts the quenching tank 26 at a time relative to the operation of the bending dies which ensures that the quench tank has been raised to a position just below the blowing boxes 28 before the glass sheet descends through the blowing boxes into the chilling liquid in the quench tank. Provision is made for the frame 806 with the shoes 807 to be fully immersed in the quenching liquid before the glass enters the tank.

The quench tank as shown in more detail in FIG. 48 and is an elongated tank long enough to accommodate the longest glass sheet being bent and toughened. The elongated rectangular quench tank 26 rests on a girder framework 812 which forms an upper part of the support table 810. A flange 813 around the upper edge of the tank 26 is fixed to upper girders 814 of a support structure including uprights 815. The thermal insulation 809 is also fixed to this support structure. An enclosed space is defined in the upper part of the support table 810 by sheets of thermal insulation 817 and an electric heater 818 is mounted in this enclosed space beneath the floor of the quench tank 26. This electric heater serves to heat the chilling liquid in the tank.

The exact location of the surface of the liquid in which the glass is quenched, relative to the bottom nozzles of the blowing boxes 28 is of importance in order to ensure a minimum decay of the centre-to-surface temperature gradients produced through the thickness of the glass by the pre-cooling stage, before the glass surfaces become severly quenched by contact with the chilling liquid. It is the temperature gradients existing through the glass thickness as the core of the glass cools through the strain point of the glass which influences generation of the desired surface compressive stress and central tensile stress in the glass by the time the glass has cooled to room temperature.

Accurate definition of the exact location of the surface of the chilling liquid, for example 2.5 cm below the bottom of the blowing boxes 28, is provided by causing chilling liquid to flow continuously over a weir in the upper part of the quench tank 26. The weir is llustrated in FIG. 48 and defines an elongated rectangular slot which opens upwardly towards the interspace between the blowing boxes 28. The weir, indicated at 820 is constituted by the upper edges of vertical side walls 821 and end walls, one of which is indicated at 822. The lower parts of the side walls 821 and of the end walls 822 are flared outwardly as indicated at 823 and terminate in bottom flanges 824 which are bolted to a weir support frame 825 which is welded to the inner wall of the tank 26 near to the top of the tank. Pads 826 are welded to the outwardly flared portions 823 of the side walls 821 of the weir. There are four such pads near the four corners of the tank. A bracket 827 is welded to the lower face of each of the pads and shackles 828 attached to the bracket 827 suspend a cullet basket 829 in the tank beneath the entrance mouth through the weir. The cullet basket comprises a rectangular frame work which rests on the floor of the tank and the sides of which are filled-in with expanded metal mesh. The basket is present to collect any broken glass resulting from shattering of glass which can result from quenching in the liquid. Lifting eyes 830 are bolted from above into the pads 826 to enable the weir construction and cullet basket to be lifted as a whole out of the quench tank when the flanges 824 are unbolted from the support frame 825.

Near the base of the quench tank 26 an inlet pipe 831 is provided for the supply of chilling liquid into the tank. A drain pipe 832 fitted with a tap 833 leads from the floor of the tank 26.

The side walls 821 and end walls 822 of the weir structure define a moat indicated generally at 834 in the upper part of the quench tank. This moat is defined between the side and end walls 821 and 822 of the weir and the walls of the tank 26. An outlet pipe 835 leads from the bottom of the moat and is connected to a pump, not shown, whose outlet is connected back to inlet pipe 831 so that there is a continuous circulation of chilling liquid upwardly through the tank overflowing over the edges 820 of the weir and falling into the moat 834 for recirculation. In the course of this recirculation the chilling liquid, for example, a mineral oil such as CYLREX F M (Registered Trade Mark) is replenished by the addition of fresh oil as necessary. A low boiling point additive may be employed in the chilling liquid, for example carbon tetrachloride or toluene, added to mineral oil in a small percentage of up to 4% by weight.

A vapour extraction mouth indicated at 836 extends right around the upper edge of the quench tank and is connected to a vertically telescopic duct 837 which is connected to a manifold leading to an extract fan 860 and a condensate removery unit.

The upper edges 820 of the walls 821 and 822 which define the weir are located above the top of the quench tank so as to present an accurately defined surface of chilling liquid to the glass as it is being lowered through the blowing boxes 28. When the quench tank is raised by the lift table this surface is accurately located relative to the blowing boxes so that the glass is immediately quenched in the chilling liquid as it leaves the ambience of the cooling air. In order to determine the location of the liquid surface at the weir 820 with accuracy, stop means are provided in the operating mechanism of the scissors-lift table accurately determining the upper position of the lifting platform 30 carrying the quench tank.

FIG. 49 shows the scissors-lift table in more detail. The lifting platform 30 on which the support table 810 for the quench tank 26 stands is supported from a rectangular base frame 811 by two pairs of scissors links 836 and 837 respectively at either side of the table. The links of each pair are pivoted centrally by a pivot pin 838. The upper ends of the links 836 are pivoted on fixed trunnions 839 carried on the sides of the platform 30 near one end of the platform. The upper ends of the links 837 carry rollers 840 which run in longitudinal trackways 841 carried by the platform 30. At their lower ends the links 837 are pivoted on trunnions 842 fixed to the bottom frame 811. The links 836 carry at their lower ends rollers 843 which run in trackways 844 extending along the side of the bottom frame 811.

A cross member 845 is fixed to and extends between the lower ends of the two links 837. Lugs 846 welded to the cross member 845 carry a pivot pin 847 to which is connected the outer end of an operating shaft 848 of an hydraulic cylinder 849. The other end of the cylinder 849 has a mounting rod 850 which is pivoted in trunnions 851 welded to the base frame 811. Extension of the operating shaft 848 from the cylinder 849 pivots the links 837 about their lower trunnions 842 and the platform 30 is lifted. The bottom rollers 843 on the links 836 run along the trackways 844 until they abut against stop bolts one of which is indicated at 852 which are fitted in stop plates 853 fixed to the bottom frame 811. Adjustment of the bolts 852 determines the height to which the platform 30 can be raised and therefore accurately determines the position of the surface of the chilling liquid flowing over the weir 820 relative to the lower nozzles 29 of the blowing boxes 28.

A limit switch 520 fixed to the bottom frame 811 is operated by a striker plate 855 which is fixed to the lower end of one of the links 836 as illustrated. This limit switch S20, as will be described is connected in the electric control circuit for controlling operation of the hydraulic cylinder 849.

At the appropriate time in the operation of the apparatus the cylinder 849 causes the platform 30 to lift to carry the quench tank 26 to its raised quench position ready to receive a hot glass sheet. The quench tank remains in position with the hot glass resting in the shoes 807 for a time, for example 20 seconds, to ensure that the whole of the glass has cooled to a temperature well below its strain point before the shaft 848 is retracted into the cylinder 849 to lower the platform 30 which thereby lowers the quench tank from around the supported bent glass sheet which is indicated at 856 in FIG. 47 and remaians seated on the shoes 807.

During quenching, as soon as the whole of the glass is immersed in the chilling liquid and the lower edge of the glass 856 is seated on the shoes 807 the tongs are opened by actuating means in the pit engaging the striker plates 655, FIG. 39, thereby tensioning the tong operating cables, and the tong bar 23 with the tongs 22 is then raised by operation of the hoist mechanism so that the tong bar is in position above the dies before the dies are closed onto the next glass sheet to be bent.

After the quench tank has been lowered the bent glass is removed manually to a degreasing tank and after degreasing the glass is cooled to room temperature.

When a series of bent annealed sheets of glass are to be produced the quench tank 26 remains in its lowered position, the boost heating section is switched off and the air supply to the precooling section is turned off.

In one embodiment the frame 806 is mounted in an annealing enclosure which is moved horizontally into position to receive each sheet in turn as it is lowered through the inoperative boost heating and precooling sections. The frame is spring loaded to accommodate the highest speed of the glass which will not have been damped by immersion of the glass in a chilling liquid. The shoes 807 of the frame are provided with greater thermal insulation.

Each sheet in turn rests on the shoes 807 in the annealing conditions within the enclosure so that when the glass is cooled only relatively small stresses are present, as represented for examply by a central tensile stress of 70 $MN/m^2$. When the sheet has cooled the annealing enclosure is moved away horizontally, the annealed sheet is removed from the frame, and the annealing enclosure is returned into position around the frame ready to receive the next sheet.

In some circumstances an annealed sheet is manufactured in succession to a toughened sheet, for example when those two sheets are to be laminated together to produce a laminated windscreen, and a modification of the apparatus for this purpose is described with reference to FIGS. 55 to 57.

TILTING BOX HYDRAULIC CONTROL CIRCUITS

Figure 50:
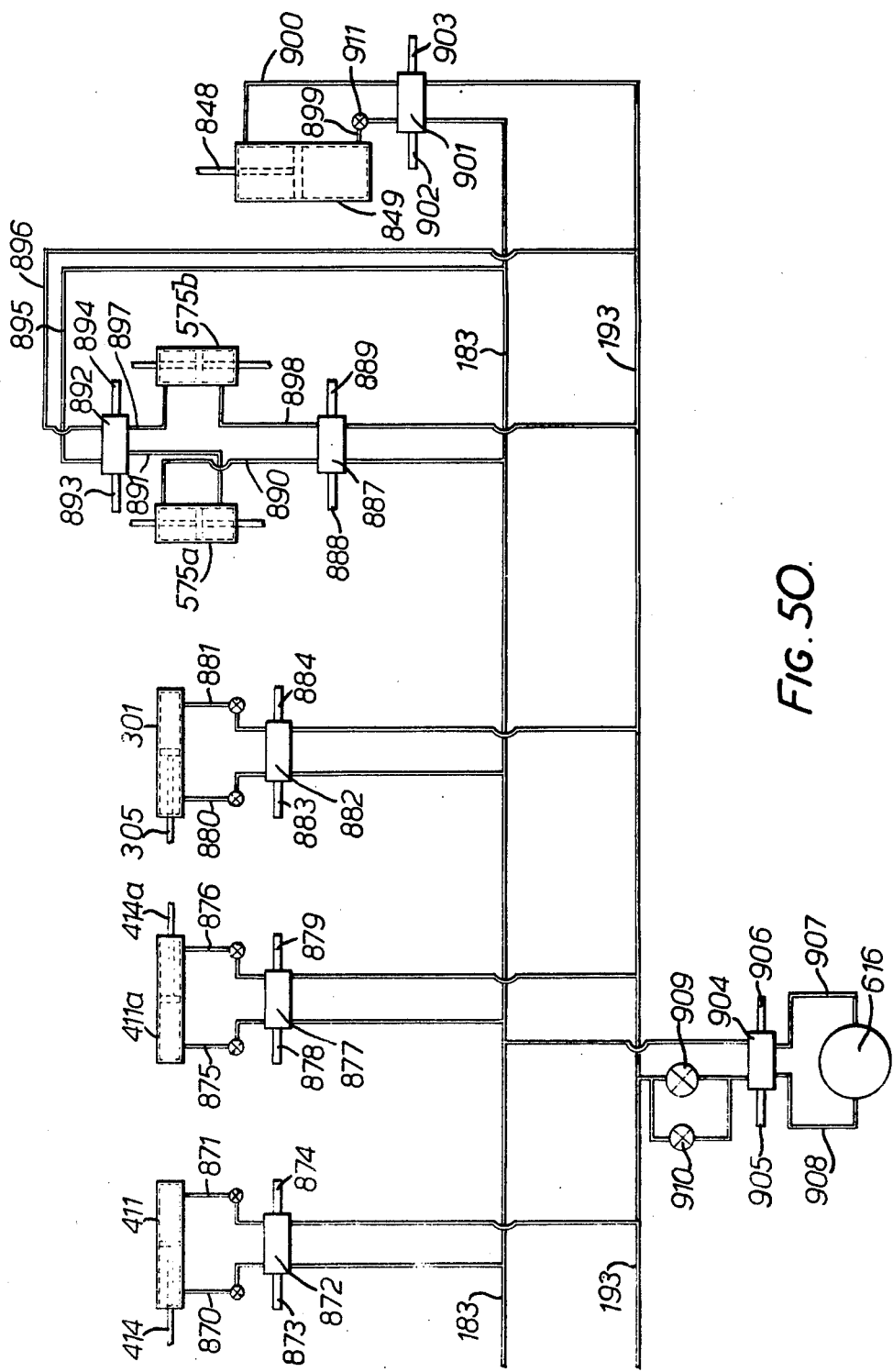
FIG. 50 is a diagrammatic hydraulic control circuit for the tilting box, the bending dies and the tong bar suspension system.

FIG. 50 illustrates diagrammatically the hydraulic circuits for operation of the female and male die actuating cylinders 411 and 411*a*, the rocking frame actuating cylinder 301, the cylinders 575*a* and 575*b* for raising and lowering the movable frames which carry the tong bar suspension system, and the cylinder 849 operating the scissors-lift table. The control of the motor 616 which operates the hoists from which the ends of the tong bar are suspended, is also shown.

The main supply line 183 of hydraulic fluid under pressure, see also FIG. 14, provides the supply of hydraulic fluid for these cylinders. The ends of the female die actuating cylinder 411 are connected by lines 870 and 871 to a solenoid operated spool valve 872 which is also of the "locked centre" type and has operating solenoids 873 and 874. When both the solenoids 873 and 874 are de-energised, the spool of the valve is locked in a central position blocking fluid flow and maintaining the cylinder under whatever conditions currently prevail in the cylinder. Inlets to the valve 872 are connected to the pressure line 183 and the return line 193.

The ends of the male die operating cylinder 411a are connected by lines 875 and 876 to a "locked centre" directional spool valve 877 having operating solenoids 878 and 879. The inlets to the valve 877 are connected to both the pressure line 183 and the return line 193.

The ends of the rocking frame cylinder 301 are connected by lines 880 and 881 to outlets from another "locked centre" directional spool valve 882 which has operating solenoids 883 and 884 and which is connected to both the pressure line 183 and the return line 193.

A further "locked centre" directional spool valve 887, having operating solenoids 888 and 889, an input line connected to the pressure line 183 and an exhaust line connected to the return line 193, has a line 890 connected to the upper end of the left hand vertical cylinder of the hoist mechanism of FIG. 37, designated 575a in FIG. 50. The lower end of the cylinder 585a is connected by a line 891 to a compensating spool valve 892 having operating solenoids 893 and 894 and a pressure line 895 connected to the pressure line 183 and an exhaust line 896 connected to the return line 193.

The upper end of the right-hand cylinder of the hoist mechanism, here designated 575b is connected by a line 897 to one input of the spool valve 892, which valve is operable to connect the lines 891 and 897 in series in circumstances to be described to ensure that both ends of the tong bar are brought down together. The lower end of the cylinder 575b is connected by a line 898 to the valve 887.

The ends of the scissors-lift table cylinder 849 are respectively connected by lines 899 and 900 to a further and similar spool valve 901 having operating solenoids 902 and 903, which valve is also connected to the pressure line 183 and the return line 193.

The hoist motor 616, FIG. 37, is connected to the pressure line 183 and the return line 193 by a directional spool valve 904 having operating solenoids 905 and 906. One output from the valve on line 907 is pressurized to drive the motor 616 in a direction to lower the tong bar. The other output from the valve 904 is connected by a line 908 to the other side of the motor, and when pressurised drives the hoist motor 616 in a direction to raise the tong bar. The speed of the motor is controlled by a shunt circuit connecting the valve 904 to the return line 193 and including a tappet-operated flow control valve 909 connected in parallel with a by-pass valve 910 which is operable to regulate creep speed of the motor.

Variation of the setting of the valve 909 to control the speed of the motor 616 is achieved pneumatically as described with reference to FIG. 51.

TILTING BOX PNEUMATIC CIRCUITS

Figure 51:
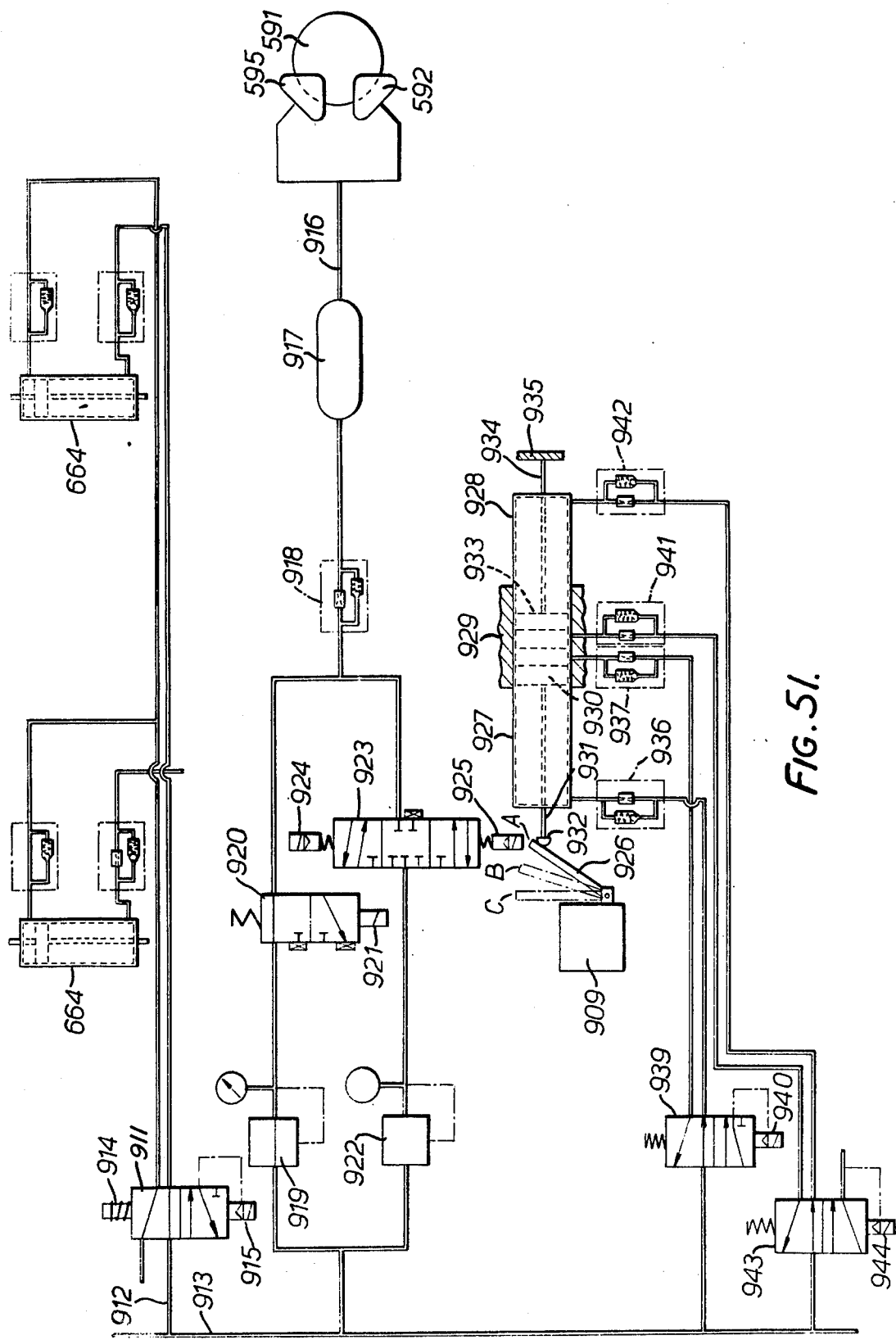
FIG. 51 is a diagrammatic pneumatic circuit for operating the tong opening mechanism, brakes on the hoist mechanism, and speed control of the hoist motor.

Pneumatic control circuits associated with the tilting box are illustrated diagrammatically in FIG. 51.

The upper and lower ends of the two cylinders 664, FIG. 37, which depress the pusher rods 662 to open the tongs, are connected in parallel to a solenoid operated spool valve 911 which has input connected by a line 912 to an air pressure line 913.

The valve 911 has operating solenoids 914 and 915. When air under pressure is switched the tops of both cylinders 664 the pusher rods 662 are depressed and the tong jaws open, and vice versa when pressure air is switched to the bottoms of the cylinders downward force is removed from the pusher and the tongs close.

FIG. 51 also shows one pneumatic circuit for operating the disc brake 591 associated with the hoist drum 590, FIG. 37. Pneumatically operated caliper arms 592 for engaging the brake disc 591 are connected by a line 916 to an air reservoir 917 which is supplied through a regulator 918 from parallel high pressure and low pressure circuits whose inputs are connected to the pressure line 913.

The high pressure circuit, whose function is to engage the brakes and hold the hoists in wound-up condition until the gripped glass is to be lowered from the bending dies, comprises a pressure regulator 919 and a spool valve 920 having an operating solenoid 921 energisation of which releases the brake.

The low pressure circuit is similar, having a low pressure regulator 922 and a solenoid-operated spool valve 923 having a solenoid 924 energised for a low pressure condition and a solenoid 925 energized for a zero pressure condition as will be described. The function of the low pressure circuit is to prevent "snatching" of the hoist winding gear when lowering a bent glass sheet.

The speed control hydraulic valve 909 for the hoist motor 616, FIG. 50, is operated by a lever arm 926 which can assume three positions, marked A, B and C in FIG. 51, each setting a motor speed, under control of a double acting cylinder assembly comprising two cylinders 927 and 928 which are joined end-to-end and slidable as a whole in a fixed housing 929.

The cylinder 927 has a piston 930 mounted on a piston rod 931 whose outer end carries a domed head 932 which engages the lever arm 926 of the speed control valve 909.

The cylinder 928 has a piston 933 on a piston rod 934 whose outer end is fixed to a fixed bracket 935.

The inner and outer ends of the cylinder 927 are respectively connected through flow control valves 936 and 937 to a solenoid operated spool valve 939 having a single operating solenoid 940 and connected to the pressure air line 913. Energisation of solenoid 940 sets the pneumatic circuit to determine a first motor speed. The inner and outer ends of the cylinder 928 are similarly connected by flow control valves 941 and 942 to a further spool valve 943 having a single operating solenoid 944. The valve 943 is also connected to the pressure line 913, and energisation of the solenoid 944 sets a second speed of the hoist motor 616 as will be described.

BENDING AND TOUGHENING OPERATION

Figure 54:
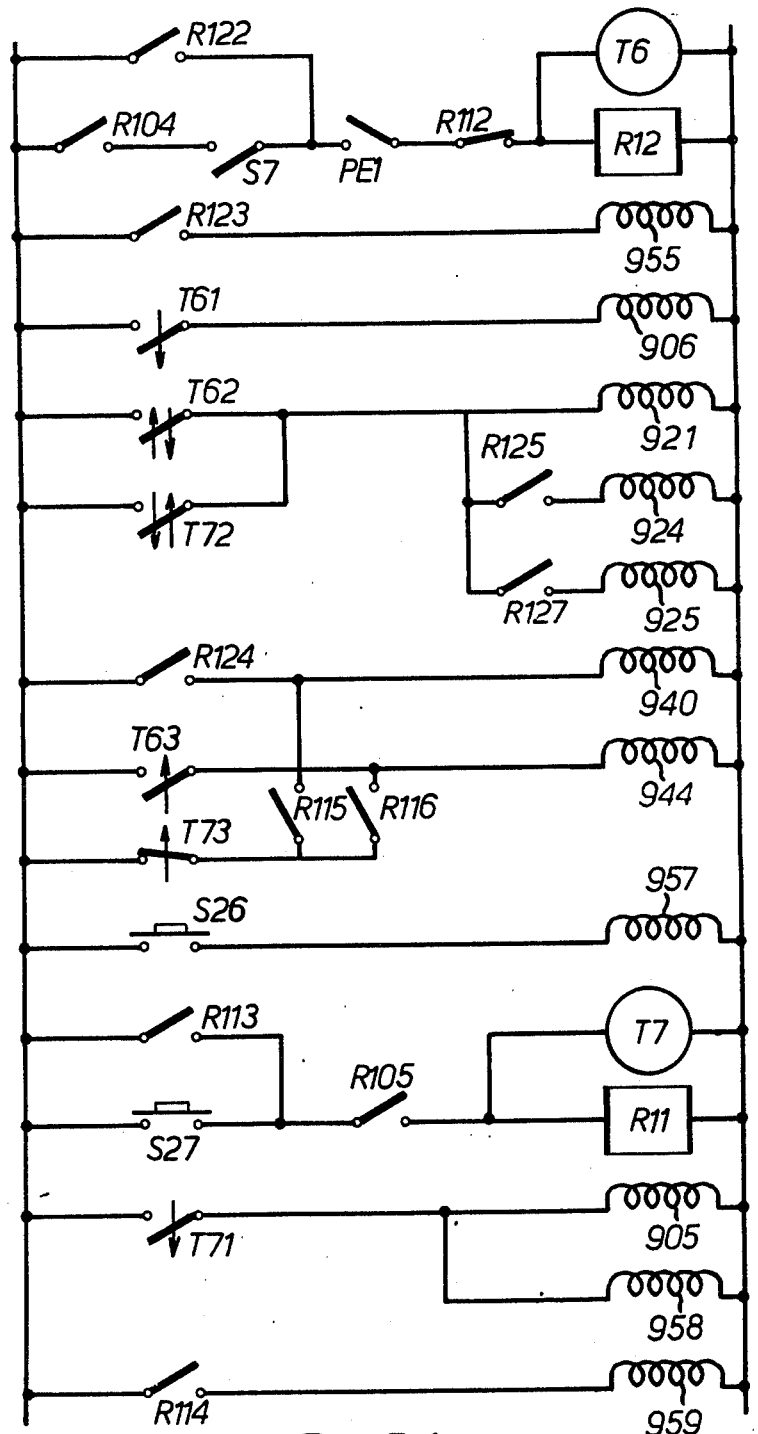

When a previous die bending operation has finished, the dies are fully withdrawn, the tilting box is in its inclined position to receive the next hot glass sheet, lowering of the glass has begun, and contacts R121, R122 and R123 of the hoist lower relay R12, FIG. 54, close. The contacts R121, FIG. 15, are connected in series with the now closed contacts R63 of relay R6 and with the relay R5 which has a holding contact R51 in parallel with the contacts R121. Relay contacts R53 in series with the cam limit switch S3 now close to energise solenoid 213 of the valve 207, FIG. 14, so that the piston rod 200 is retracted and the roller 194 moves from the cam surface 197 onto the high part 196 of the cam so that the motor and the rollers are accelerated to fast speed. The switch S3 is opened and the pressure fluid supplied to the motor 103 causes it to continue at fast speed. Previously energisation of the relay R12 operated a circuit including a solenoid which removes the carriage stop 242, and the carriage is accelerated out of the tilting box.

When the front of the carriage approaches the end of the exit section of the conveyor it opens switch S6, relay R6 is de-energised, which opens contacts R63 to reset relay R5. Relay contacts R53 open so that solenoid 213 is de-energised. The normally closed contacts R64 of relay R6 close again when the relay R6 is de-energised, to re-energise solenoid coil 214 of valve 207 to cause the piston rod 200 to extend out of the cylinder 202 so that the roller 194 of valve 192 runs back onto the cam surface 197 to return the roller driving motor 103 to creep speed.

All the rollers 8 and 13 in the furnace and in the tilting box are all now being driven at creep speed; and at the same time contacts R62 open to disengage the clutch driving the rollers of the exit conveyor which are then brought to rest so that the carriage is stationary on the exit section of the conveyor and can be removed and taken back to the inlet end for reloading. The reset push button switch is then closed to start up the whole operation for processing of the next sheet.

The initial condition of the apparatus is that both the male die and the female die are withdrawn, the tong bar is raised and the tilting box is inclined, e.g., at 5° angle.

Figure 52:
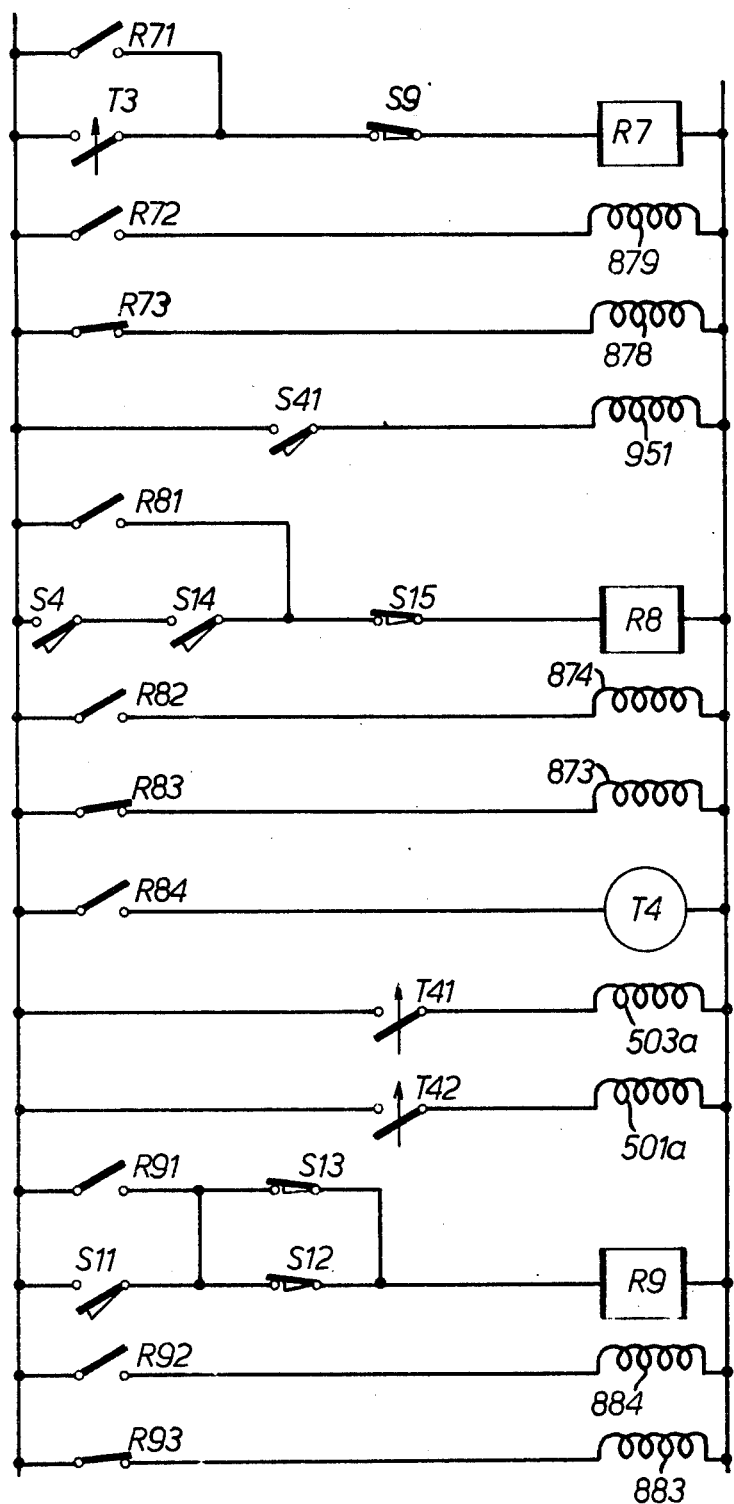
FIGS. 52, 53 and 54 are circuit diagrams of switching circuits for operating the hydraulic and pneumatic circuits of FIGS. 50 and 51.

The male die actuating cylinder 411a, FIG. 50, has been operated to retract the male die by energisation of solenoid 878 of the valve 877, FIGS. 50 and 52, through normally closed contact R73 of a male die relay R7 which also has holding contacts R71 and normally open contacts R72 in series with solenoid 879 of the valve 877. Energisation of solenoid 878 normally holds the male die out.

Similarly the female die actuating cylinder 411 is operated by female die relay R8 having holding contacts R81 normally open contacts R82 in series with the solenoid 874 of the valve 872, and normally closed contacts R83 in series with the coil 873 of valve 872. Energisation of solenoid 873 normally holds the female die out.

The tilting of the tilting die box is controlled by a roller vertical relay R9 having holding contacts R91 normally closed contacts R93 in series with solenoid 883 of the cylinder 301, and normally open contacts R92 in series with solenoid 884 of the valve 882. Normally the solenoid 883 is energised so that the cylinder 301 maintains the frame in its inclined position.

A tong bar relay R10 is in series with the hoist raised switches S16, FIG. 37, and rollers vertical switch S8, FIG. 19, and the female die in switch S10. The relay R10 has holding contacts R101, and normally closed contacts R102 in series with solenoid 889 of the valve 887, FIG. 50. In parallel with the solenoid 889 is the solenoid 893 of the compensating valve 892, which solenoid 893 is in series with two parallel hoist raised switches S16 which are respectively on the left-hand and right-hand hoist mechanisms of FIG. 37.

Relay R10 also has normally-open contacts R103 in series with solenoid 888 of the valve 887. In parallel with solenoid 888 is solenoid 894 of the compensating valve 892 which solenoid 894 is connected in series with two parallel hoist lowered switches S17.

With the tong bar rising in a mid-position coil 889 is energised and the hydraulic circuits for the two cylinders 575 are connected in series with pressure fluid fed on line 898 of valve 887 to the bottom of cylinder 575b. Fluid under pressure from the top of cylinder 575b passes on line 897 and through the compensating valve 893 on to line 891 connected to the bottom of cylinder 575a.

The two pistons in the cylinders 575a and 575b rise together but may not reach the top of their stroke together. Whichever hoist raised switch S16 closes first energises solenoid 893 of the compensating valve 892 which changes over to connect pressure fluid directly to the bottom of cylinder 575a thereby ensuring that both hoist frames are in their raised position as nearly as possible at the same time.

When the tong bar is being lowered, the gripper bar relay R10 is energised to open contacts R102 and close contacts R103 which energises coil 888. The compensating valve 892 is in position to connect the two cylinders 575 in series. Pressure fluid is fed on line 890 to the top of cylinder 575a and from the bottom of that cylinder on line 891 through the valve 892 to the top of the cylinder 575b. When one of the cylinders reaches the bottom of its stroke one of the hoist lowered switches S17 is closed to energise solenoid 894 to switch over the compensating valve 892 so that pressure fluid is free from line 895 to line 897 to the top of cylinder 575b and both the cylinders 575 are brought down together to bring the tong bar horizontally into position above the closed bending dies.

The male die timer T3, FIG. 15, which was actuated when the sheet was in the furnace now commences the actuation of the male die and after a delay, closes the contacts T31, FIG. 52 which are connected in series with the female die partly out switch S12 and the coil of the male die relay R7 whose holding contacts R71 are in parallel with the switch T31. Actuation of the relay R7 causes contacts R73 to open and contact R72 to close so that solenoid 878 of valve 877, FIG. 50, is deenergised and solenoid 879 is energised, and pressure fluid is fuel on line 876 to the cylinder 411a to cause inward movement of the male die.

When the male die is fully in, the male dies in switch S14 closes. While the male die is moving in, a carriage 12 carrying a glass sheet 9 is still moving and operates switch S4 before it comes to rest against the carriage stop 242. Operation of switch S4 initiates the inward movement of the female die, so that the lifting fingers lift the hot glass sheet 9 from the carriage 12 before the carriage is brought to rest against the carriage stop so that the impact of the carriage against carriage stop is not transmitted to the hot glass sheet.

With the male die in and the switch S4 closed as the carriage 12 approaches the carriage stop 242 the female die relay R8 is enegised through the closed reset switch S15, FIG. 36 on the lifting finger mechanism which switch is open when the actuating rod 555 slidable in the cylinder 550 is in the raised position. The cylinder 550 is pneumatically operated through a solenoid operated spool valve 950 having two operating solenoids 951 and 952 and supplied on a line 953 with air under pressure from the line 913, FIG. 51, and having an exhaust line 954. The valve is normally in the position such that the actuating rod 555 is raised.

When contacts S41, FIG. 52, of the limit switch S4 close the solenoid 951 of the pneumatic valve 950 is energised to apply air under pressure to the top of the cylinder 550 to force the rod 555 downwardly so that the cam roller 532 is maintained in contact with the cam surface 565 and the switch S15 is closed. The pneumatic valve 950 remains in the condition supplying pressure to the top of the cylinder 550 and effectively acts as a spring forcing the cam roller 532 downwardly on to the cam surface.

By this time the male die has moved in to bending position and the male die in switch S14 is closed so that when the switch S4 is closed as the carriage is conveyed into the tilting box the female die relay R8 is energised and is latched in by its holding contacts R81. The normally-closed contacts R83 open and normally-open contacts R82 close so that solenoid 874 of the female die actuating valve 872, FIG. 50 is energised and solenoid 873 is de-energised and inward movement of the female die begins. Contacts R84 on the female die relay R8 also close and start operation of the timer T4 which after a time delay closes contacts T41 which actuate the solenoid 503a of the valve 503, FIG. 31, to apply vacuum to the male die in order to assist bending by drawing the hot glass sheet against the male die surface 480.

The contacts T41 close to apply the vacuum at a time when the bending operation is almost complete and the female die is just reaching the end of its inward movement. At a later time after bending and when the female die is being retracted and the upper edge of the sheet has already been gripped by the tongs, contacts T41 open and contacts T42 of timer T4 close to energise operating solenoid 501a of the pressure valve 501 to supply air under pressure to the male die to assist in releasing the bent glass sheet from the male die surface.

As the female die moves in the lifting fingers pick up the hot glass sheet from the carriage and the sheet is engaged by the female die sections as they move through the rollers 8 in the tilting box. The hot sheet is then carried forwardly from the rollers 8 towards the male die. The female dies partly in switch S11 closes which switch is in series with the normally closed female die out switch S12 and with the coil of the rollers vertical relay R9 which is energised and closes holding contacts R91 to latch the relay through normally-closed male die part out switch S13. The normally closed contacts R93 open and the normally-open contacts R92 close so that solenoid 883 of valve 882, FIG. 50, is de-energised and solenoid 884 is energised and the cylinder 301 is operated to tilt the frame to its horizontal position which brings the rollers 8 in the tilting box vertical. It is during this tilting movement of the tilting box that the inward movement of the female die is completed to complete the bending of the glass between the dies, the bent glass is then being held on the lifting fingers between the closed dies.

Figure 53:
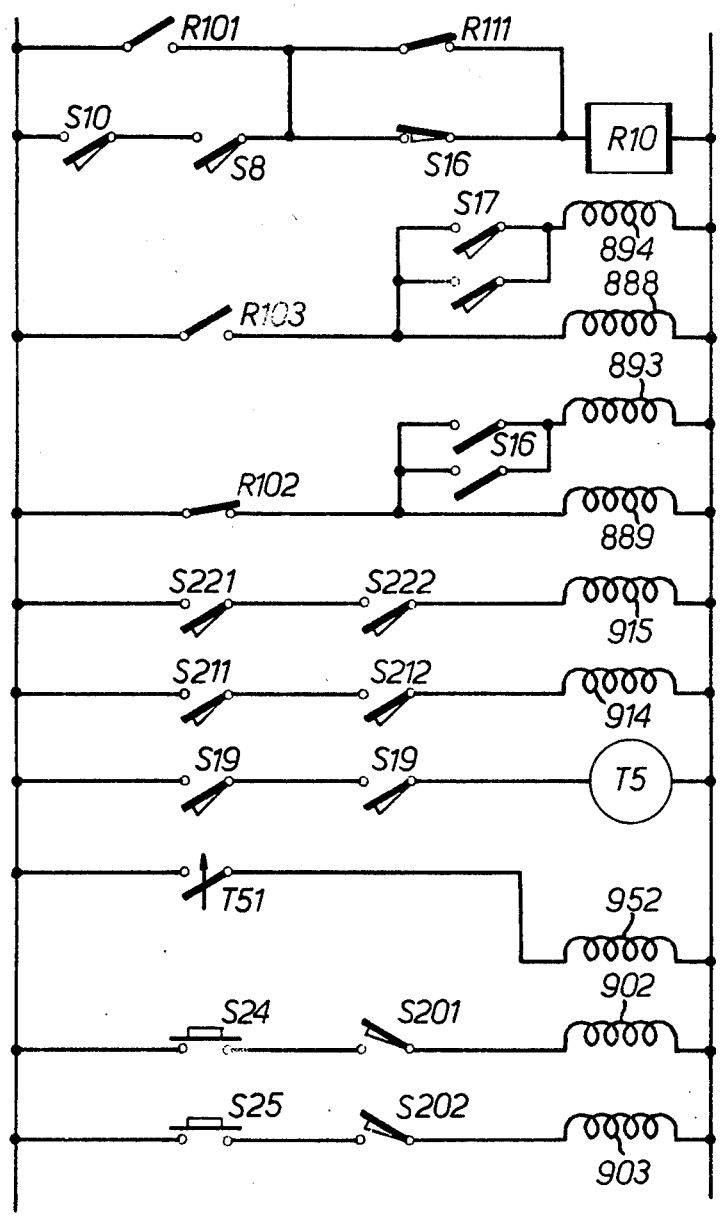

When the female die is fully in, the female die in switch S10 closes, FIG. 53. This switch S10 is in series with the rollers vertical switch S8, the hoist raised switches S16, which are closed in the condition in which the hoist frames 581 are raised, and with the coil of the tong bar relay R10. In parallel with the female die in switch S10 and the rollers vertical switch S8 is holding contact R101 of the relay R10, and a normally closed contact R111 of a hoist raised relay R11, FIG. 54 is in parallel with the hoist raised switches S16.

When the female die in switch S10 closes the relay R10 is actuated, contacts R102 open and contacts R103 close, the valves 887 and 892, FIG. 50, supply pressure fluid to the cylinder 575a and 575b and lowering of the hoist frames 581 begins, FIG. 37, to begin the lowering of the tong bar 23 towards the upper edge of the bent glass sheet held between the dies.

While the tong bar 23 is raised contacts S211 and S212 on tong bar raised switch S21 are closed and solenoid 914 of the pneumatic spool valve 911, FIG. 51, is energised to supply pressure air to the tops of the cylinders 664, FIG. 37, to be depressed so that the tong jaws open. As the tong bar is lowered the open tong jaws becomes positioned exactly above the upper edge of the glass sheet which is held between the bending dies the tong jaws having moved downwardly into the recesses formed in the upper edge of the male die and between the sections of the female die.

When the tong bar is lowered switch contacts S221 and S222 on a switch S22 close and the solenoid 915 of valve 911 is energised to cause the valve to change over so that the pusher rods 662 are retracted and the tong jaws close under the weight of their sliders, onto the upper edge of the glass sheet.

When the pusher rods 662 are retracted the two switches S19 close to actuate a timer T5 which is set to the shortest possible time delay, up to 5 seconds, to allow the tong points to grip into the upper edge of the glass sheet so that the sheet is securely suspended from the tongs when the dies open. Contacts T51 of the timer T5 then close to energise solenoid 952 of the pneumatic valve 950, FIG. 36, so that the actuating rod 550 is retracted to lift the cam roller 532 from the cam surface and to drop the lifting fingers. The striker plate 556 engages the switch S15 to open its normally-closed contacts and the female die relay R8 is de-energised. The contacts R82 open and the contacts R83 close, solenoid 874 of valve 872 is de-energised and solenoid 873 is energised and retraction of the female die begins. The time of closure of the dies to bend the glass sheet may be for example 8 seconds.

When the female die is partly out the female dies partly out switch S9 opens to de-energise the male die relay R7 so that contacts R72 open and contacts R73 close, solenoid 878 of valve 877 is energised and solenoid 879 is de-energised and retraction of the male die begins.

When the female die is fully out the female die out switch S12 opens, and at this time the male die is partly out and the male die partly out switch S13 opens and when both switches have been opened the rollers vertical relay R9 is de-energised contacts R92 open and contacts R93 close, and the solenoid 884 of valve 882 is de-energised and the solenoid 883 is energised so that pressure fluid is supplied to the bottom of the cylinder 301 to tilt the rocking frame back to its inclined position with the upright rollers 8 in the tilting box at their preset angle, e.g., 5°, to the vertical, ready for receiving the next glass sheet from the furnace. The retraction of the male die continues until it is fully out. The bent glass sheet is left freely suspended in the tongs between the open bending dies ready for lowering through the boost heat section and the pre-cooling section into the chilling liquid.

When the rocking frame is tilted to its inclined position the rollers tilted switch S7, FIG. 54, closes. This switch S7 is in series with closed contacts R104 of the tong bar relay R10, normally closed contacts PE1 of a photo electrically operated switch which is operated by the plates 668 on the hoist as will be described, normally closed contacts R112 of the hoist raise relay R11, and with the coil of a hoist lower relay R12 and with a hoist lower timer T6. The relay coil R12 and the timer T6 are connected in parallel.

Holding contacts R122 of the hoist lower relay R12 close to latch the relay. Contacts R123 close to energise a solenoid 955 which lowers the exit stop 242 to permit the carriage 12 to be conveyed out of the tilting box, and contacts R121, FIG. 15 close to energise the relay R5.

The hoist lower timer T6 immediately closes contacts T61 to energise the solenoid 906 of the valve 904 controlling supply of pressure fluid to the hoist motor 616. At the same time contacts R124 of the hoist lower relay R12 are closed to energise the solenoid 940 of valve 939, FIG. 51 to supply pressure air through the valve 937 to the cylinder 927 so that the piston 930 is extended and the lever arm 926 of valve 909 moves from position A corresponding to zero speed of the motor 616 to position B which determines a first speed of the hoist motor 616. At this time the drums of the hoists are held stationary by engagement of the disc brake, the slipping clutch of each drum permitting this although the motor is being driven.

After a set time delay, for example 2 seconds, the contacts T62 of the hoist lower timer T6 close to energise the brake release solenoid 921 of the valve 920 in the brake operating circuit, to take high pressure off the brake caliper arms and at the same time energises the lower pressure solenoid 924 of the valve 923 through contacts R125 of the hoist lower relay R12. After a further time delay, up to 20 seconds, the contacts T63 of the timer T6 close to energise the solenoid 944 of the pneumatic valve 943 which switches pressure air through the flow control valve 941 to the inner end of the cylinder 928 causing that cylinder to move in the housing 929, towards the right at shown in FIG. 51, and cause movement of the lever arm to position C to determine a second faster speed of the hoist motor 616.

Figure 46:
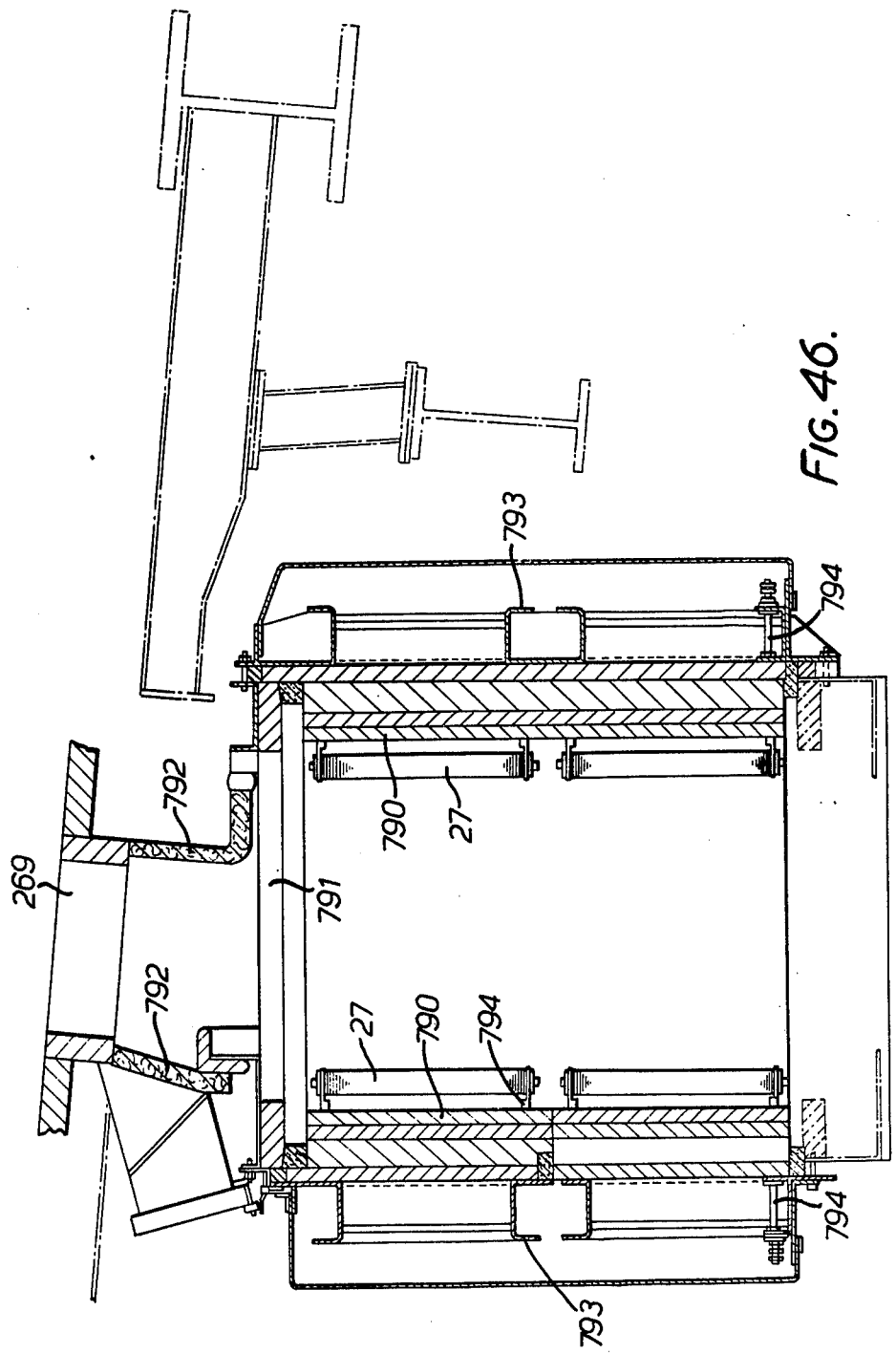
FIG. 46 is a vertical section through panels of boost heaters which are located beneath the tilting box and between which a bent glass sheet is lowered for heating prior to toughening.

This acceleration of the hoist motor 616 to a second speed takes place at the appropriate time when it is required to accelerate part of the glass sheet through the boost heat section to achieve a temperature gradient in the glass as described with reference to FIG. 46. The acceleration takes place for example when the lower edge of the glass sheet has just passed through the boost heater panels.

The plates 668 on the tong bar 23 now cut off light beams to photoelectric cells not shown, which are connected to switching circuits which open the contacts PE1 to de-energise the hoist lower relay R12 and the hoist lower timer T6 which instantaneously releases switches R124 and T63 to de-energise the solenoids 940 and 944, thereby retracting the double cylinder system 927, 928 and causing the lever arm 926 of valve 909 to return to position A so that the speed of the hoist motor returns to zero.

After a delay to permit deceleration of the hoist system the switch T62 opens and the brake release solenoid 921 is de-energised, this operates in the brake circuit to put the high pressure back on to the brake caliper arms to brake the hoist motor when the lower edge of the glass sheet is just reaching the shoes 807, FIG. 47, in which the glass rests. The contacts T61 open after a delay to de-energise the hoist lower solenoid 906, the motor 616 then being stationary.

When the glass is being heated in the furnace prior to entry into the tilting box for bending, a push button switch S24 is closed, and operates solenoid 902, FIG. 50, of the valve 901 operating the scissors lift table, through normally-closed contacts S201 of switch S20, FIG. 49, to supply pressure to the bottom of cylinder 849 to raise the table 30 carrying the quench tank 26 to the raised position ready to receive the hot bent glass. When the tank 26 reaches its raised position the contacts S201 of switch S20 open and the valve 901 maintains pressure on the cylinder to maintain the tank 26 in its raised position.

A few seconds after the hoist motor 616 has stopped and the glass is quenched in the tank, a push button switch S25 is operated to energise solenoid 903 of valve 901 through closed contacts S202 of the switch S20, which switches pressure fluid to the top of cylinder 849 to lower the scissors lift table which leaves the quenched glass 856 in the rack 807, 808 as the quench tank 26 moves downwardly. The contacts 202 open when the tank reaches its lowermost position and de-energises the solenoid 903.

The glass is now supported in the rack 807, 808 and is still gripped by the tongs. To open the tongs a tong release push button switch S26 is operated to energise a solenoid 957 which causes pusher members, not shown, in the pit, to engage the striker plates 655 on the arms 654 to tension the cables 661 and open all the tongs. The glass sheet then settles on to the rack, the tong points then being just clear of the upper edge of the sheet and the tongs can close again prior to being lifted by the hoist.

A further push button switch S27 is then pressed and energises through closed contacts R105 of the tong bar relay R10 the hoist raise relay R11 and the hoist raise timer T7.

The relay R11 is latched by its holding contacts R113 and instantaneously the timer T7 closes contacts T71 to energise the solenoid 905 of valve 904, and solenoid 958 of the by pass valve 910 in the hoist motor supply circuit.

At the same time contacts R114 of the hoist raise relay R11 close to energise a solenoid 959 which raises the carriage stop 242. The contacts R115 and R116 close to energise, through normally-closed contacts T73 of timer T7, the speed control solenoids 940 and 944 so that the lever arm 932 is moved to position C and the hoist motor 616 is accelerated up to top speed determined by fluid flow through the fully open valve 909 and the open by-pass valve 910 in parallel.

The tong bar is thus returned quickly before the next glass sheet moves between the dies and when near the top of its upward travel the contacts T73 of the hoist raise timer T7 open to de-energise the speed control solenoids 940 to 944. The motor 616 decelerates to a creep speed determined by the by-pass valve 910 and continues to raise the tong bar at creep speed.

The hoist raise timer T7 has further contacts T72 which close after a delay to energise the brake release solenoid 921 which causes the valve 920 to remove the high pressure from the brake calipers and at the same time through closed contacts R127 energises the zero pressure solenoid 925 of the brake circuit. The brake is right off the hoist motor 616 at this stage.

The normally closed contacts R111 of the hoist raise relay R11 open when that relay is energised and when the hoist raised switches S16 are all open the tong bar relay R10 is de-energised, switch R102 closes and switch R103 opens to raise the hoist frames 581 by actuation of the valves 887 and 892 to raise the pistons in the cylinders 575. Contacts R105 also open to de-energise the hoist raise relay R11 and the hoist raise timer T7. After a time delay to permit the motor 616 to wind up any slack and to ensure that the wires have all been raised together and to make sure that there is just enough tension on the slipping clutch on each drum to make sure that the wires are up together, the switch T71 opens to de-energise the solenoids 905 and 958 of the valves in the motor circuit, so that the hoist motor 616 is brought to rest. At the same time the contacts T72 open to put full pressure back onto the brake caliper arms.

When the tong bar is fully raised the switches S211 and S212 close to energise solenoid 914 and open the tongs.

The processing sequence then restarts for the next sheet to be bent and toughened.

Figure 55:
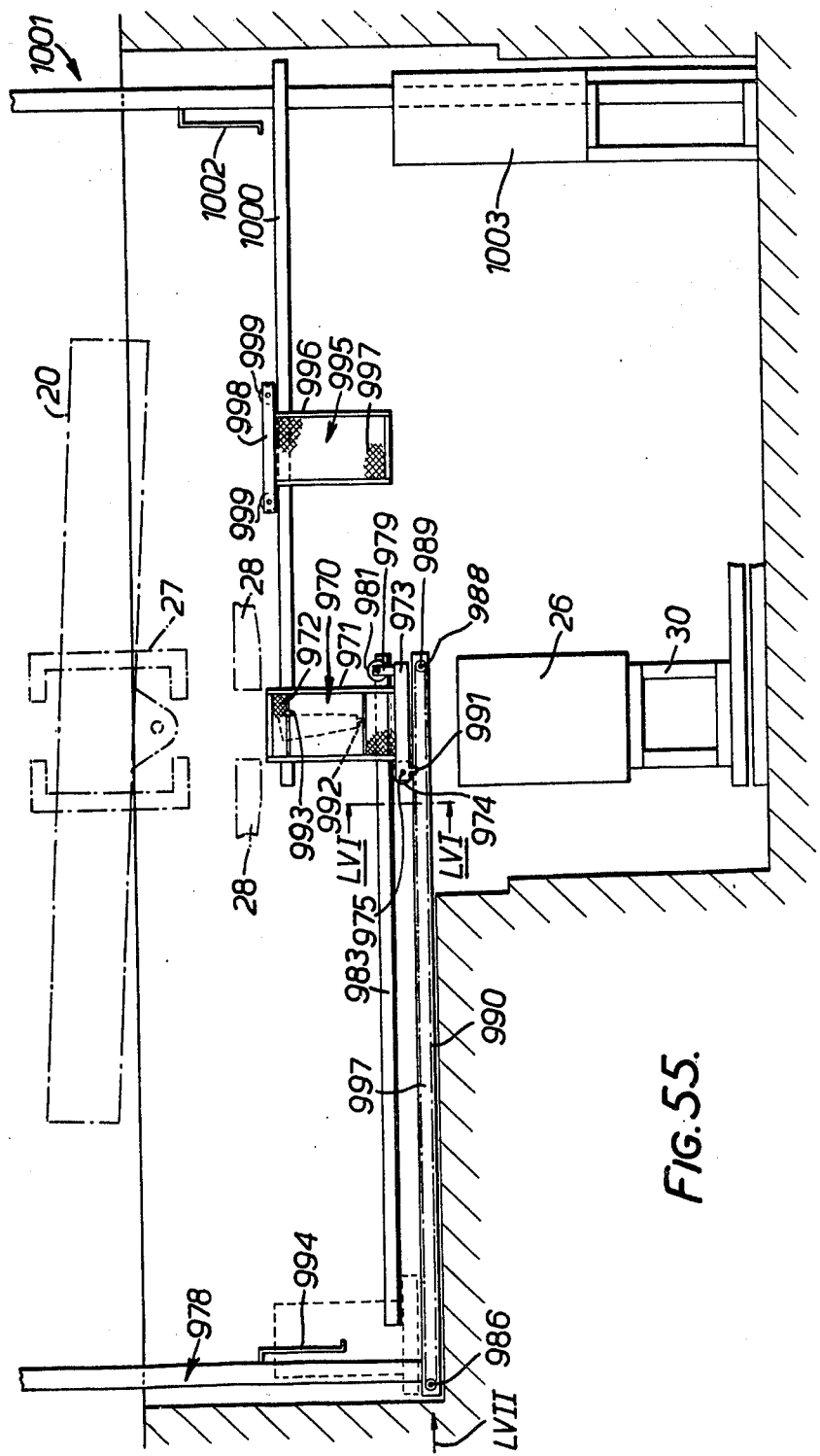
FIG. 55 is a view similar to FIG. 47 of the lower part of the pit showing apparatus for producing alternately a toughened and an annealed glass sheet.
Figure 56:
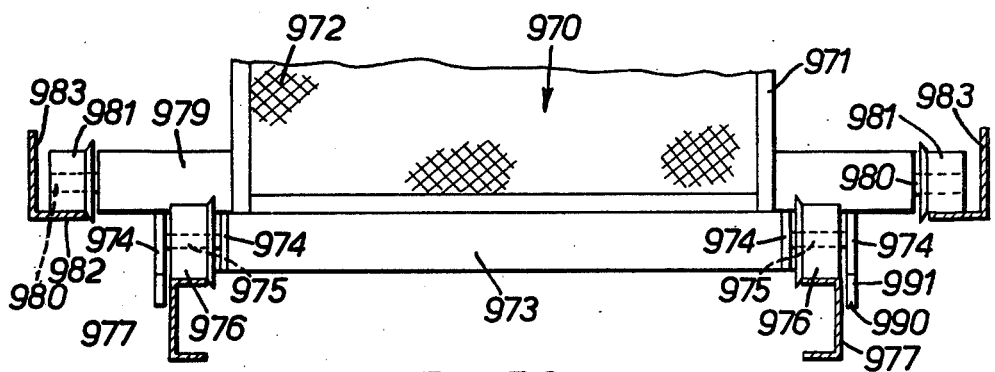
FIG. 56 is a section on line LVI—LVI of FIG. 55.
Figure 57:
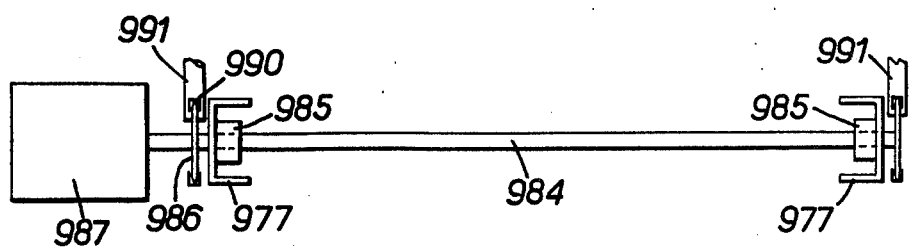
FIG. 57 is an end view of part of the apparatus of FIG. 55, in the direction of arrow LVII.

For the manufacture of an annealed sheet and a toughened sheet in succession when those sheets are to be laminated together to produce a laminated windscreen, a modification of the apparatus may be employed as illustrated in FIGS. 55 to 57.

The main criterion is that the overall deformation index of the annealed sheet should not be greater than the deformation index of the toughened sheet. Usually matching values of deformation index are achieved but satisfactory production is also achieved with the annealed sheet having a deformation index less than that of the toughened sheet. Up to the time at which the bending dies open both sheets have indentical thermal histories and the bent shapes of the sheets which at that stage match for lamination are preserved during subsequent thermal processing.

In FIG. 55 the pit below the rocking frame 20 for the tilting box is illustrated. The boost heaters of FIG. 46 are indicated at 27 and the location of the two blowing boxes 28 is also indicated.

Two baskets are provided for receiving the hot bent glass sheet as it is lowered and in FIG. 55 a basket 970 for receiving a bent glass sheet which is to be annealed is shown in position beneath the blowing boxes 28. The basket 970 has a girder framework 971 the sides and bottom of which are covered by expanded metal mesh 972, and the basket is mounted on a wheeled carriage 973.

The carriage 973 is in the form of a rectangular frame of U-section girders. Flanges 974 extend rearwardly from the rear corners of the carriage and carry stub shafts 975 each of which extends between a pair of flanges 974 as illustrated in FIG. 56. On each stub shaft 975 there is carried a wheel 976 which wheels 976 run on the upper faces of a lower pair of parallel girders 977 which extend across the pit from a position beneath the boost heaters 27 and the blowing boxes 28 to a glass elevator 978 which is mounted at one end of the pit.

A cross girder 979 forming part of the carriage 973 carries stub shafts 980 at either end on which are mounted wheels 981 which run on horizontal flanges 982 of an upper pair of girders 983 which also extend from beneath the blowing boxes 28 to a position near to the elevator 978. The carriage 973 carrying the basket 970 thus runs on track ways formed by the two parallel pairs of girders 977 and 983.

As shown in detail in FIG. 57 a shaft 984 extends between the ends of the girders 977 adjacent the glass elevator 978. The shaft 984 is mounted in bearing blocks 985 carried by the girders 977 and a sprocket wheel 986 is mounted on each end of the shaft 984. The shaft 984 is driven by an electric motor 987.

A similar shaft 988 with two sprocket wheels 989 is mounted between the innermost ends of the girders 977 beneath the blowing boxes 28. Drive chains 990 extend between the sprocket 986 and 989 and lugs 991 on the flanges 974 at the rear of the carriage 973 connect with the drive chains 990.

When the bent glass sheet is to be annealed the basket 970 is positioned below the boost heaters 27 and the blowing boxes 28 and the bent hot glass sheet is lowered into the basket 970 and comes to rest on spring loaded supports 992 in the basket. Additional spring loaded supports 993 engage the sheet near its top edge to steady the sheet in the basket. The tongs are then released and the electric motor 987 is operated to move the carriage and withdraw the basket 970 to the outer end of the track way formed by the girders 977 and 983 adjacent the glass elevator 978 which has lifting hooks 994 which are lowered into the basket to pick up the glass by its lower edge from the basket 970 and to raise the glass to floor level at which the glass can be removed manually from the elevator 978. Throughout its movement across the pit and in the elevator the glass is cooling to an annealed condition. When the basket 970 for receiving a glass sheet to be annealed has been withdrawn from beneath the blowing boxes 28 a second basket 995 is moved into position beneath the blowing boxes 28 for receiving a hot bent glass sheet which is to be quenched.

The basket 995 is of similar construction to the basket 970 being formed by a girder framework 996 the sides and bottom of which are covered by expanded metal mesh 997. The basket 995 is shaped so that it can become immersed in the chilling liquid in the quench tank 26 when the tank is raised for receiving the bent glass sheet to be quenched. The basket 995 is suspended from a wheeled carriage 998 whose wheels 999 run on a pair of parallel girders 1000 which extend from a location just below the blowing boxes 28 parallel to and in opposite direction to the track way formed by the girders 977 and 983 to the other end of the pit where there is a second glass elevator 1001. A chain drive system similar to that for moving the carriage 973 which supports the basket 970 is employed for moving the carriage 998 from which the basket 995 is suspended but this drive system is omitted for clarity.

When the basket 995 is in position just beneath the blowing boxes 28 the quench tank 26 is raised by the scissors lift table 30 so that the top of the quench tank is just below the blowing boxes as already described and the basket 995 is completely immersed.

The next hot bent glass sheet in the succession of sheets is lowered through the boost heaters 27 and the blowing boxes 28 into the chilling liquid in the quench tank and the glass becomes supported on spring loaded supports 992 and 993 in the basket 995 which are similar to those already described in the basket 970. When the quenched glass sheet is so supported the tongs are released. The quench tank 26 is lowered away from the basket 995 which is moved on its carriage 998 along the pit to a position adjacent the glass elevator 1001 which has lifting hooks 1002 which are lowered into the basket 995 to pick up the toughened glass sheet. The lifting hooks 1002 are raised lifting the sheet from the basket 995 which is then moved forwardly along the girders by a short distance to clear the glass for lowering into a degreasing tank 1003 mounted on the floor of the pit.

The elevator 1001 raises the degreased glass from the tank 1003 to floor level for manual removal from the lifting hooks 1002.

While these operations are being carried out on the quenched glass sheet, the basket 970 for receiving the next glass sheet for annealing is moved into position below the blowing boxes 28.

The boost heaters 27 and the blowing boxes 28 of the pre-cooling section remain operative throughout the production of the succession of alternatively annealed and toughened bent glass sheets.

Preservation of the matching shapes of the sheets is important and it is considered that matching shapes are preserved if steps are taken to ensure that the overall deformation index reached by an annealed glass sheet is less than or at most equal to that of a toughened sheet.

Up to the time at which the bending dies open every sheet in the succession has an indentical thermal history and will have reached the same deformation index. The bent shapes of the sheets match for lamination and these matching bent shapes must be preserved during subsequent processing.

For example when bending sheets of glass 2.2 mm thick which are to be used as laminates for automobile windscreens, with a bending temperature of 603°C for example the deformation index reached by every sheet is about $2 \times 10^{-11}$ at the time when the bending dies open. This value is small compared with the further increase in the deformation index which occurs during the passage of the sheets between the boost heaters 27 and the blowing boxes 28.

There is an increment in the deformation index of each sheet as it passes from the bending dies to the boost heaters but this is very small and can effectively be ignored. Therefore it is the increment of the deformation index of the sheets as they pass between the boost heaters 27 and the blowing boxes 28 which is significant and has to be taken into consideration. For matching of the overall deformation index of the annealed and the quenched sheets it is therefore arranged that the increment in the deformation index of a sheet to be annealed when that sheet is passing through the boost heaters 27 and the blowing boxes 28, is less than the increment in the deformation index of a sheet which is to be quenched, by an amount equal to the further increment in the deformation index of an annealed sheet which will occur during the final slow cooling of the annealed sheet. This is illustrated in Table XIII which compares the temperature/time histories of a toughened and an annealed sheet which are both of soda-lime-silica glass 2.2 mm thick for use as laminates in the manufacture of an automobile windscreen. The glass bending temperature was 603°C and the temperature of the boost heaters was 950°C.

TABLE XIII

|  | Toughened Sheet | Annealed Sheet 1 | Annealed Sheet 2 |
|---|---|---|---|
| Boost Heat Time | 4.3 sec. | 3.9 sec. | 3.44 sec. |
| Glass temperature on leaving boost heaters | 642°C | 639°C | 635°C |
| Time between boost heaters and pre-cooling | 0.5 sec. | 0.45 sec. | 0.4 sec. |
| Glass temperature on entering pre-cooling | 640°C | 637°C | 637°C |
| Pre-cooling time | 0.5 sec. | 0.45 sec. | 0.4 sec. |
| Average temperature through glass thickness after pre-cooling | 624°C | 622°C | 620°C |
| Time between pre-cooling and quench | 0.1 sec. | — | — |
| Deformation Index Increment - boost heat to instant of quench | $4.6 \times 10^{-10}$ | — | — |
| - boost heat and pre-cool | — | $3.45 \times 10^{-10}$ | $2.45 \times 10^{-10}$ |
| - final slow cooling after pre-cool | — | $1.13 \times 10^{-10}$ | $0.97 \times 10^{-10}$ |

This Table shows that the total increment in the deformation index of the sheet being annealed from the point of entry of the sheet between the boost heaters 27 until the sheet has been finally cooled to a temperature corresponding to the strain point of the glass is $3.45 \times 10^{-10} + 1.13 \times 10^{-10} = 4.58 \times 10^{-10}$.

Within the limits of operational error this value is equal to the increment in the deformation index of the sheet being toughened from the point of entry of that sheet between the boost heaters 27 until the instant of quenching upon entry of the sheet into the chilling liquid, which increment is $4.6 \times 10^{-10}$.

Equalisation of the values of deformation index for a toughened sheet and an annealed sheet in this way, which sheets are produced in succession, ensures retention of their matching shapes.

The overall deformation index of a toughened and an annealed sheet is similarly matched when the sheets are processed so as to have a top to bottom temperature gradient, by taking into consideration the deformation index reached by the top edge of each sheet. This ensures physical matching of the top edges of the sheets which is the most critical region in the lamination process.

As already stated it is found that the matching shapes of the toughened and annealed sheets are retained so long as the annealed sheet is brought to an overall deformation index not greater than that of the toughened sheet and the third column of Table XIII illustrates the production of an annealed sheet having a total increment in deformation index from the point of entry of the sheet between the boost heaters 27 until finally annealed which is $3.42 \times 10^{-10}$. This is less than the increment in the deformation index of $4.6 \times 10^{-10}$ for the toughened sheet given in the first column of Table XIII and the annealed sheet having the lower increment of deformation index retained its shape matching a toughened sheet and successively produced toughened and annealed sheets matched accurately in the subsequent lamination process.

We claim:

1. A method of processing a hot glass sheet comprising supporting a sheet of glass on its lower edge, providing near-vertical support for one face of the sheet so that the sheet is disposed at a small angle to the vertical, advancing the sheet while so supported through a heating furnace to a shaping station, closing shaping dies, oriented complementarily to the sheet disposed at a small angle to the vertical, on to the sheet at the shaping station, tilting the dies through an angle to orient them vertically and bring the shaped sheet at the shaping station to a vertical position, then opening the dies and vertically removing the vertically oriented shaped sheet from the shaping station of subsequent thermal treatment.

2. A method of producing a bent sheet of glass comprising supporting a sheet of glass to be bent on its lower edge, providing near-vertical support for one face of the sheet so that the sheet is disposed at a small angle to the vertical, advancing the sheet while so supported through a heating furnace to a bending station, closing bending dies, oriented complementarily to the sheet disposed at a small angle to the vertical, on to the hot sheet at the bending station and tilting the dies through an angle to orient them vertically and bring the bent sheet at the bending station to a vertical position, then opening the dies and vertically removing the vertically oriented bent sheet from the bending station for subsequent thermal treatment.

3. A method of producing a bent sheet of glass comprising supporting a sheet of glass to be bent on its lower edge, providing near-vertical support for one face of the sheet so that the sheet is disposed at a small angle to the vertical, advancing the sheet while so supported through a heating furnace to a bending station, closing bending dies on to the hot sheet at the bending station by moving a male die having a convex surface into bending position and supporting the hot glass sheet against the female die which carries the sheet against the male die to bend the sheet, tilting the dies through an angle to bring the sheet to a vertical position, gripping the upper edge of the bent sheet when it is vertically disposed, opening the dies so that the bent sheet is suspended and then removing the suspended bent sheet vertically for subsequent thermal processing.

4. A method according to claim 3, comprising initiating tilting of the dies when the hot glass sheet first contacts the male die.

5. A method according to claim 3, comprising advancing the sheet of glass to be bent along a horizontally disposed path through the heating furnace to the bending station, providing transient support for the sheet at the bending station by leaning the glass against spaced-apart near-vertical support rollers, initially driving those rollers at a rate such that their linear surface speed is the same as the speed of advance of the glass into the bending station and then slowing the rotation of those rollers as the advance of a hot glass sheet into the bending station is slowed between the bending dies, moving female bending die sections through said support rollers to disengage the sheet from the rollers and simultaneously picking up the lower edge of the sheet so that the female die carries the sheet against the male die.

6. A method according to claim 5, comprising providing transient support for the glass sheet during its travel through the furnace by leaning the sheet at a near-vertical angle against spaced apart, near-vertical support rollers, driving those rollers at a rate such that their linear surface speed is the same as the speed of advance of the glass sheet transiently supported by the rollers, and setting thermal conditions in the furnace and setting the time the sheet is within the furnace in dependence on the glass thickness so as to achieve a predetermined temperature condition in the glass prior to bending, the thermal and time settings being such as to permit the supported glass to relax as it is heated by an amount less than the maximum deformation of the sheet which is acceptable prior to bending.

7. A method according to claim 2, wherein the bending dies are heated to a temperature condition matching that of a glass sheet to be bent presented between the dies.

8. A method according to claim 7, wherein the bending dies are heated to a surface temperature distribution such that at all points of contact with a glass sheet presented between the dies the surface temperature of the dies is substantially equal to that of the glass.

9. A method according to claim 7, comprising heating the glass sheet to have a predetermined substantially uniform surface temperature prior to bending, and maintaining the surface temperature of the bending dies at substantially that predetermined temperature.

10. A method according to claim 9, comprising enclosing the bending dies and maintaining the enclosure at said predetermined temperature.

11. A method according to claim 2, comprising removing the bent sheet for quenching to toughen the sheet.

12. A method according to claim 11, comprising toughening the sheet by contacting the sheet with a chilling liquid.

13. A method according to claim 12, comprising toughening the sheet by lowering it into a body of chilling liquid.

14. A method according to claim 13, wherein the sheet is subjected to cooling gas streams flowing uniformly over both faces of the sheet, just before the sheet enters the chilling liquid to produce centre-to-surface temperature gradients through the thickness of the sheet without substantially cooling the central core of the sheet thickness.

15. A method according to claim 14, including determining the location of the surface of the chilling liquid relative to sources of the cooling gas flows by causing the chilling liquid to spill continuously over a weir, and locating the upper edge of the weir at a predetermined distance below said cooling gas flow sources.

16. A method of producing a succession of bent glass sheets comprising supporting a sheet of glass to be bent on its lower edge, providing near-vertical support for one face of the sheet so that the sheet is disposed at a small angle to the vertical, advancing the sheet while so supported through a heating furnace to a bending station, closing bending dies on to the hot sheet at the bending station and tilting the dies from an inclined disposition through an angle to bring the sheet to a vertical position, then opening the dies and removing the bent sheet vertically by lowering it for subsequent thermal treatment, and after lowering of the bent sheet has begun, tilting the dies, as they are opening, back to an inclined disposition to receive between them the next near-vertical sheet for bending.

17. A method according to claim 2, for producing a matching pair of curved glass sheets for subsequent lamination together to produce a laminated window unit, comprising passing each sheet through the heating furnace to a bending station, heating each sheet to the same thermal condition during its advance through the heating furnace, bending each sheet to the same desired curvature between said bending dies, maintaining constant conditions while both sheets are heated and bent, and subsequent to bending rapidly chilling one of the sheets to induce predetermined toughening stresses therein and annealing the other sheet.

18. A method according to claim 16, for producing a succession of matching pairs of bent glass sheets, comprising advancing glass sheets in succession through the heating station, bending the sheets in succession, alternately toughening and annealing the bent sheets as they are removed from the bending station, and selecting for subsequent lamination a toughened sheet and an annealed sheet successively produced.

19. Apparatus for processing a glass sheet, comprising a tilting enclosure movable between a first position and a second position and containing means for supporting a hot glass sheet at a near-vertical angle, which enclosure is formed with access means permitting a hot glass sheet, in said first position of said tilting enclosure, to be received on the support means at said near-vertical angle, and, in said second position of said tilting enclosure, to be removed vertically from the enclosure, cooperating glass-engaging dies mounted in the enclosure one of which dies is constructed to advance from behind and through said support means as the dies close on to the glass sheet, means for tilting said enclosure and said dies mounted in said enclosure from said first position to said second position and responsively orienting the glass sheet vertically for removal from said enclosure, and means for engaging the glass sheet when it is between the closed dies and for removing the sheet vertically from the enclosure when the dies open.

20. Apparatus for processing a glass sheet comprising a heating furnace through which glass sheets are to be conveyed in upright disposition, a conveyor for the sheets extending through the furnace and including a movable support for the lower edge of the sheet and a plurality of spaced-apart near-vertical rollers defining an inclined support against which a sheet can relax as it is heated, a tilting structure mounted adjacent the end of the furnace and having an entrance in an end wall contiguous to the furnace and an exit mouth positioned for removal of a sheet vertically from the structure, a plurality of spaced-apart near-vertical rollers in the structure defining when the structure is tilted an inclined support for a hot glass sheet co-extensive with that provided by the furnace rollers and against which a hot glass sheet can lean when it is brought to rest between the bending dies, co-operating glass-engaging dies mounted in the structure one of which dies is constructed to advance from behind and through said rollers, means for tilting the structure between its tilted position and a position in which the glass sheet between the dies, when closed, is vertical, means for engaging the glass sheet when between the dies and removing the sheet vertically through the exit mouth when the dies open, and thermal treatment means mounted vertically in line with the exit mouth for thermally treating the glass sheet.

21. Apparatus according to claim 20 wherein said tilting structure comprises a tilting enclosure in which said plurality of spaced-apart near-vertical rollers are mounted, which enclosure is formed with said entrance permitting a hot glass sheet to be received on said near-vertical rollers at said angle and to be removed vertically from the enclosure through said exit mouth, and means for tilting the enclosure between a position in which a glass sheet at said angle is received on the near-vertical rollers and a position in which the glass sheet is disposed for removal vertically through said exit mouth.

22. Apparatus according to claim 21, wherein the tilting enclosure is a tilting box having an entrance in an end wall and an exit mouth in the floor for removal of a sheet vertically from the box, and the glass-engaging dies are co-operating male and female bending dies mounted in the box one of which dies is constructed to pass from behind and through said near-vertical rollers as the dies close on to the glass sheet.

23. Apparatus according to claim 22, comprising means for heating the interior of the box, and sequence control means connected to actuating means for the dies, the means for tilting the box and the glass engaging means to control them according to a predetermined sequence for bending and lowering the glass sheet for subsequent thermal treatment.

24. Apparatus according to claim 22, wherein the tilting means comprises a pivoted frame on which the box is mounted, and actuating means connected to the frame and operable to pivot the frame between a tilted position and a horizontal position.

25. Apparatus according to claim 24, including male and female die actuating means supported on said pivoted frame, and each die includes a backing frame which is connected to the actuating means for that die.

26. Apparatus according to claim 24, wherein the means for heating the interior of the box comprises gas combustion apparatus supported by the pivoted frame and communicating with the box to direct hot gas into the box, and temperature control means responsive to a temperature within the box to regulate the gas combustion apparatus so as to maintain the bending dies at the same temperature as that of a hot glass sheet entering the box.

27. Apparatus according to claim 22, comprising bottom rollers which project through the spaces between the near-vertical rollers and at an acute angle thereto to define a track for a movable carriage on which the lower edge of a glass sheet is supported as it is advanced into the tilting box through an entrance slot which is formed in one end wall of the box in alignment with the near-vertical rollers.

28. Apparatus according to claim 25, wherein the female bending die is a ring frame die shaped to co-operate with the male die and made up of die sections shaped to pass from behind and through said near-vertical rollers to disengage the hot glass sheet from said rollers.

29. Apparatus according to claim 28, wherein the female die sections are mounted on the backing frame which is connected to the female die actuating means.

30. Apparatus according to claim 25, wherein the male die has a continuous bending surface for engagement by a hot glass sheet to be bent, which surface is perforated and is backed by a chamber which is selectively connectable to a vacuum line and an air pressure line through valves operable to cause suction or pressure build up between a glass sheet and said perforated bending surface.

31. Apparatus according to claim 30, wherein the continuous bending surface and chamber of the male die are mounted on the backing frame which is connected to the male die actuating means.

32. Apparatus according to cliam 25, including, for supporting each die actuating means in the tilting box, two parallel main support beams located on the pivoted frame in the direction of movement of the dies, which main support beams have upper surfaces providing tracks on which bearings on the die actuating means run during inward and outward movement of the dies.

33. Apparatus according to claim 32, wherein each die actuating means comprises an adjustable die mounting assembly on its inward end for mounting the associated die.

34. Apparatus according to claim 32, comprising for each die actuating means an actuating cylinder fixed relative to the main support beams and having a piston connected to the die actuating means, a guide roller on the die actuating means running in a guide track fixed relative to the main support beams and parallel to the tracks provided by the upper surfaces of those beams, and stop means determining the extent of inward and outward movement of the die actuating means relative to the main support beams.

35. Apparatus according to claim 34, wherein each guide track is a central guide channel formed in a U-section guide member which is fixed between the main support beams, and the guide roller is mounted on a spindle extending downwardly from the die actuating means into said guide channel.

36. Apparatus according to claim 35, wherein the inward end of the U-section guide member is pivotally connected to a base plate which is fixed between the main support beams, the rear end of the guide member is engaged by adjusters mounted on the main support beams and operable to adjust the alignment of the guide member angularly about the pivotal connection with the base plate, and clamping means on the base plate engages the guide member for clamping the guide member in position relative to the main support beams when it is correctly aligned.

37. Apparatus according to claim 33, wherein the backing frame for each die is an open frame of rectangular form, each frame carries at least one upper and a lower horizontal locating bars, and the adjustable die mounting assembly includes at least one clamping hook in which said at least one upper locating bar engages to suspend the backing frame from the hook, and a lower clamp assembly engaging the lower locating bar, which lower clamp assembly is adjustable at right angles to the lower locating bar to adjust the angle of the backing frame and of the die carried thereby about an axis defined by said at least one upper locating bar, prior to clamping of the locating bars in position when the desired angular position of the die is achieved.

38. Apparatus according to claim 37, wherein each frame carries two upper horizontal locating bars which are spaced apart symmetrically towards either side of the upper part of each frame, the adjustable die mounting assembly includes two clamping hooks in which the two upper locating bars engage, and the lower horizontal locating bar is carried centrally on the lower part of the frame.

39. Apparatus according to claim 37, including a rearwardly projecting locating pin fixed to a central strut of the backing frame, which pin is freely engaged in a locating slot formed in a plate fixed to the die support unit which embodies said adjustable die mounting assembly.

40. Apparatus according to claim 37, wherein a rear end plate of the die support unit abuts a front end plate of the associated die actuating means, a boss at the centre of one end plate engages in a co-operating central recess in the other end plate, lugs at the side edges of one of said plates are engaged by adjustment means on the other of said plates, adjustment of which adjustment means rotates the die support unit relative to the die actuating means about the axis of the boss, and locking means is provided on said plates for locking the two plates together when adjusted to the desired angular position.

41. Apparatus according to claim 22, wherein the means for engaging the bent glass sheet includes a plurality of tongs suspended from a normally raised tong bar in rotatable gates pivotally mounted on the tong bar, the tongs being spaced apart along the tong bar so that when the tong bar is lowered the tong jaws pass downwardly between sections of the female die and into recesses in the upper edge of the male die which recesses face interspaces between the female die sections.

42. Apparatus according to claim 41, including tong guide means mounted along the top of both the male die and the female die for engagement by pusher members on the tong gates to rotate the tong gates as the tong bar is lowered to cause the open jaws of the tongs to straddle the upper edge of the bent glass sheet held between the closed dies.

43. Apparatus according to claim 42, wherein the ends of the tong bar are attached to lifting cables which are wound around winding means of hoists mounted above the roof of the tilting box, the hoist for each end of the tong bar includes a fixed head frame mounted on a fixed support above the tilting box, a movable frame mounted on the fixed frame and including guides for the lifting cables which guides extend through the roof of the tilting box and are engaged by the tong bar when the lifting cables are wound up on the winding means, and hydraulic means connecting the movable frame to the fixed frame and operable to effect upward and downward movement of the movable frame relative to the fixed frame, the downward movement of which movable frame lowers the tong bar within the tilting box to a position in which the open tong jaws straddle the upper edge of the glass sheet.

44. Apparatus according to claim 43, including a centre frame mounted on the movable frame, and means for adjustment of the vertical position of the centre frame relative to the movable frame, and wherein said guides for the lifting cables are carried by the centre frame.

45. Apparatus according to claim 44, including two lifting cables at each end of the tong bar respectively attached to the front and back of the tong bar at each end thereof, and wherein said guides include two guide tubes mounted in each of said centre frames, through which guide tubes the lifting cables are threaded, the lower ends of the guide tubes are adapted for engagement by the tong bar when the lifting cables are wound up, and the guide tubes are mounted within the centre frames by means adjustable to determine the extent of projection of the guide tubes into the tilting box to bring the tong bar and open tongs to a required level dependent on the height of the glass sheet being bent, when the movable frame is lowered relative to the fixed frame.

46. Apparatus according to claim 43, including vertical guide wires extending downwardly from the hoists through the tilting box below the tilting box and terminating at tensioning means for the guide wires mounted below the tilting box, and guiding means on the ends of the tong bar engaging said guide wires, whereby the tong bar is constrained to upward and downward vertical movement.

47. Apparatus according to claim 22, including a quench tank of chilling liquid mounted beneath the tilting box to receive a glass sheet lowered from the tilting box.

48. Apparatus according to claim 47, including blowing boxes mounted above the quench tank to direct streams of cooling gas against the faces of a bent glass sheet as it is lowered into the quench tank.

49. Apparatus according to claim 48, wherein the quench tank is mounted on a table of lifting mechanism, and control means for the lifting mechanism is operable to raise the quench tank to its position below the blowing boxes just before a glass sheet is lowered through the blowing boxes.

50. Apparatus according to claim 49, including a support frame for receiving a bent glass sheet mounted below the tilting box in a position to become immersed in the chilling liquid when the quench tank is raised, and means for actuating said glass engaging means when a glass sheet is engaged in said frame to release the sheet into the frame.

51. Apparatus according to claim 49, including a weir defined in the quench tank by the upper edges of walls of an elongated rectangular slot which opens upwardly towards the interspace between the blowing boxes, the walls of which slot define a moat at the top of the quench tank around said slot, and means for circulating chilling liquid upwardly through said slot to flow over the weir into the moat thereby accurately defining the location of the upper surface of the chilling liquid close to the bottom of the blowing frames.

52. Apparatus according to claim 20, wherein said thermal treatment means comprises an annealing enclosure mounted for positioning below said exit mouth for receiving a hot glass sheet to be annealed.

53. Apparatus according to claim 52, wherein the annealing enclosure is mounted on a horizontal track for movement horizontally into position below the exit mouth.

54. Apparatus for bending a hot glass sheet comprising:
 a tilting box having an entrance in an end wall and an exit mouth in the floor for removal of a sheet vertically from the box;
 support means in the box against which a hot glass sheet which is supported on its lower edge leans at a near-vertical angle;
 means for heating the interior of the box;
 co-operating male and female bending dies mounted in the box one of which dies is constructed to pass from behind and through said support means as the dies close on to the glass sheet;
 means for tilting the box between a position in which a glass sheet at said angle is received through the entrance on to the support means and a position in which the glass sheet bent between the dies is disposed for lowering vertically through the exit mouth;
 means for engaging the bent glass sheet and for lowering the sheet through the exit mouth when the dies are opened; and
 sequence control means connected to actuating means for the dies, the means for tilting the box and the glass engaging means to control them according to a predetermined sequence for bending and lowering the glass sheet for subsequent thermal treatment.

55. A method of processing a hot glass sheet comprising supporting a sheet of glass so that the sheet is disposed at a small angle to the vertical, advancing the sheet while so supported at a small angle to the vertical through a heating furnace to a press shaping station including press means, shaping the sheet with the press means of the shaping station oriented complementarily to the sheet disposed at a small angle to the vertical, vertically orienting the press means to bring the shaped sheet at the shaping station to a vertical position, and vertically lowering the sheet from the press means to a thermal treatment station.

56. Apparatus for processing a glass sheet comprising: a heating furnace, support means for supporting a sheet of glass so that the sheet is disposed at a small angle to the vertical, a shaping station including press means, oriented complementarily to the sheet disposed at a small angle to the vertical, for shaping the glass sheet at the shaping station, conveying means for advancing the sheet while so supported at a small angle to the vertical through said heating furnace to said shaping station, means for vertically orienting said press means to bring the shaped glass sheet at said shaping station to a vertical position, and means for vertically lowering the sheet from the press means to a thermal treatment station.

57. Apparatus for processing a glass sheet, comprising an enclosure containing a plurality of spaced apart inclined roller means for supporting a hot glass sheet at a near-vertical angle, which enclosure is formed with access means, means for conveying a hot glass sheet through said access means to a position received on said inclined roller means at said near-vertical angle, cooperating glass-engaging dies, oriented complementarily to the sheet disposed at said near-vertical angle, mounted in the enclosure, one of which dies is constructed to advance from behind and through said roller means as the dies close on to the glass sheet, said dies being operable to vertically orient the glass sheet, and means for engaging the glass sheet when it is between the closed dies and for removing the sheet vertically from the enclosure when the dies open.

* * * * *